(12) United States Patent
Ishii et al.

(10) Patent No.: US 7,621,353 B2
(45) Date of Patent: Nov. 24, 2009

(54) VEHICLE TRANSMISSION

(75) Inventors: Norihiro Ishii, Hyogo (JP); Ryota Ohashi, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 1006 days.

(21) Appl. No.: 10/831,307

(22) Filed: Apr. 26, 2004

(65) Prior Publication Data
US 2005/0016304 A1   Jan. 27, 2005

(30) Foreign Application Priority Data

Apr. 24, 2003 (JP) .............................. 2003-119876
Apr. 24, 2003 (JP) .............................. 2003-120075
May 14, 2003 (JP) .............................. 2003-135969

(51) Int. Cl.
*B62D 6/00* (2006.01)
(52) U.S. Cl. ..................... 180/6.2; 180/6.48; 180/305; 180/307
(58) Field of Classification Search ................. 180/6.2, 180/6.48, 305, 307
See application file for complete search history.

(56) References Cited

U.S. PATENT DOCUMENTS

| 5,139,465 | A  | * | 8/1992  | Sato ............................ 475/24 |
| 6,199,380 | B1 | * | 3/2001  | Ishii ............................ 60/485 |
| 6,260,641 | B1 | * | 7/2001  | Hidaka ...................... 180/6.44 |
| 6,325,166 | B1 | * | 12/2001 | Shimada et al. ............ 180/6.48 |
| 6,913,103 | B2 | * | 7/2005  | Kitasaka et al. ............. 180/306 |
| 2003/0062212 | A1 | * | 4/2003 | Samejima et al. ........... 180/305 |
| 2007/0157750 | A1 |   | 7/2007 | Ishii et al. |

FOREIGN PATENT DOCUMENTS

| JP | 7323739    | 12/1995 |
| JP | 11208301   | 8/1999  |
| JP | 2000-71790 | 3/2000  |
| JP | 2000071790 | 3/2000  |
| JP | 2002238324 | 8/2002  |
| JP | 2002337757 | 11/2002 |

* cited by examiner

*Primary Examiner*—Lesley D Morris
*Assistant Examiner*—Maurice Williams
(74) *Attorney, Agent, or Firm*—Sterne, Kessler, Goldstein & Fox P.L.L.C.

(57) ABSTRACT

A vehicle transmission having a pair of left and right HSTs for driving respective axles is applicable for a riding lawn mower. The transmission comprises a center casing incorporating a distributing drive train. In the fore-and-aft direction, an input shaft of the distributing drive train projects from the center casing toward a prime mover, and a PTO shaft for driving a mower unit projects from the center casing opposite to the prime mover. A pair of left and right deceleration drive train casings for incorporating respective deceleration gear trains and supporting the respective axles are disposed on respective left and right sides of the center casing. A pair of left and right stepless transmission mechanisms, each of which is drivingly interposed between the distributing drive train and each of the deceleration gear trains in the deceleration gear train casings, are mounted on left and right side portions of the center casing opposite to the prime mover in the fore-and-aft direction.

23 Claims, 36 Drawing Sheets

VEHICLE TRANSMISSION

BACKGROUND OF THE INVENTION

1. Field of the Invention

The present invention relates generally to a transmission of a vehicle, such as a riding mower and more specifically relates to a transmission distributing power between left and right stepless transmission mechanisms for respective left and right drive axles.

2. Related Art

As disclosed in Japanese Laid-Open Gazette No. 2000-71790, there is a well-known conventional vehicle transmission for a working vehicle such as a riding lawn mower, which has a pair of HSTs for driving respective drive axles and a PTO shaft for driving a working machine attached to the vehicle. The transmission is provided with a pair of left and right HSTs for respective left and right drive axles, a center casing disposed between HSTs, and a pair of left and right deceleration gear casings supporting the respective left and right drive axles and incorporating the respective deceleration gear trains.

An input shaft projects (rearwardly) outward from the laterally middle (rear) end of the center casing toward a horizontal crankshaft engine in the fore-and-aft direction so as to be drivingly coupled to the engine via a universal joint coupling. A PTO shaft for driving a mower unit projects (forwardly) outward from the center casing opposite to the engine in the fore-and-aft direction. The center casing incorporates a power train including a PTO clutch between the input shaft and the PTO shaft. The power train distributes power between the left and right HSTs on the upstream of the PTO clutch.

Each of the HSTs is disposed in a casing sandwiched between the left or right end of the center casing and each of the left and right deceleration gear casings. In other words, the HST casings are extended laterally outward from the left and right side ends of the center casing, and the deceleration gear casings are mounted onto the laterally distal end of the respective HST casings. Each of the HSTs includes an oil duct plate, and hydraulic pump and motor mounted onto the oil duct plate so as to be fluidly connected to each other via the oil duct plate. The hydraulic pump and motor have respective axial pump shaft and motor shaft extended laterally in parallel to the corresponding drive axle (perpendicular to the input shaft and PTO shaft). Each of the deceleration casings is extended perpendicular to the lateral motor shaft and axle so as to incorporate the deceleration gear train between the corresponding motor shat and axle.

If the HST (for example, its oil duct plate) must undergo repair or maintenance, the deceleration gear casing must be removed from the HST casing incorporating the troubled HST, thereby complicating its repair or maintenance.

Moreover, the transmission is laterally expanded because of the HSTs having lateral pump and motor shafts. Furthermore, each of the deceleration gear casings must be extended in the fore-and-aft direction or vertically so as to incorporate the deceleration gear train interposed between the corresponding lateral motor shaft and axle, thereby distributing the compactness of the transmission.

Another problem of the transmission is that the universal joint coupling is extended between the (rear) end of the center casing and the engine in the fore-and-aft direction. If the heights of the horizontal output shaft of the engine and the horizontal input shaft of the transmission are considerably different from each other and the distance therebetween in the fore-and-aft direction is restricted, the universal joint coupling must be considerably vertically angled (steep) to be interposed between the shafts so as to disturb the efficiency of power transmission, to cause noise and vibration, and to reduce the durability of universal joints.

On the contrary, if the universal joint coupling is extended sufficiently long in the fore-and-aft direction, the above-mentioned problems are solved. However, such a long distance between the transmission and the engine in the fore-and-aft direction shifts the engine toward a front and rear end apart from the transmission so as to unbalance the vehicle (riding lawn mower) in the fore-and-aft direction. Even if the engine is disposed at a position for balancing the vehicle well, the transmission is unexpectedly shifted on the PTO shaft side thereof opposite to the engine in the fore-and-aft direction, thereby restricting the space for the working machine (mower unit).

Furthermore, even if the universal joint coupling is short and disposed almost horizontally, another problem arises that the input shaft of the transmission and the output shaft of the engine must have a short difference of height therebetween so as to reduce the allowed vertically movable range of the mower unit.

Thus, a transmission to be drivingly coupled to a horizontal crankshaft engine via a universal joint coupling is conflictingly requested to have a sufficient space, in which the universal joint coupling can be disposed with its vertical angle reduced as much as possible, and to approach the engine in the fore-and-aft direction.

BRIEF SUMMARY OF THE INVENTION

An object of the present invention is to provide a vehicle transmission for a working vehicle such as a riding lawn mower, wherein a pair of transmission devices, such as HSTs, for driving respective axles can be disposed compactly and so as to be easily detached, and wherein the transmission can be disposed between a prime mover (engine) and a working machine (mower unit) so as to optimally balance the vehicle.

More specifically, the object of the invention is to provide the vehicle transmission shortened in the fore-and-aft direction and laterally as much as possible by minimizing left and right deceleration gear casings so that each deceleration gear casing is disposed in a rim of drive wheel, whereby the transmission can be compactly below the riding lawn mower between the engine and the mower unit.

To achieve the object, in a first aspect of the present invention, a vehicle transmission comprises a center casing incorporating a distributing drive train, a pair of left and right lateral axles, and a pair of left and right deceleration drive train casings incorporating respective deceleration gear trains and supporting the respective axles. The deceleration drive train casings are disposed on respective left and right sides of the center casing. An input shaft of the distributing drive train in the center casing projects from the center casing toward a prime mover in the fore-and-aft direction of the vehicle. A PTO shaft for taking off power from the distributing drive train in the center casing projects from the center casing opposite to the prime mover in the fore-and-aft direction of the vehicle. A pair of left and right stepless transmission mechanisms, each of which is drivingly interposed between the distributing drive train in the center casing and each of the deceleration gear trains in the deceleration gear train casings, are mounted on left and right side portions of the center casing opposite to the prime mover in the fore-and-aft direction of the vehicle.

Each of the deceleration gear casings does not have to be removed when each of the stepless transmission mechanisms is going to be removed. Therefore, the transmission facilitates for easy detachment of the stepless transmission mechanisms.

Preferably, a PTO casing supporting PTO shaft and incorporating a PTO clutch drivingly interposed between the distributing drive train and the PTO shaft is mounted onto the center casing between the stepless transmission mechanisms. The PTO shaft and the stepless transmission mechanisms can be overlapped so as to shorten the transmission in the fore-and-aft direction. The common center casing can be used for housing the stepless transmission mechanisms and the PTO shaft drive system.

Preferably, a pair of HSTs serve as the respective stepless transmission mechanisms and have an oil duct plate attached onto the center casing. A pair of oil duct plates may be provided for the respective HSTs. The HSTs can be easily detached as mentioned above.

Preferably, the HSTs have respective movable swash plates provided with respective laterally distally projecting trunnion shafts serving as pivots so as to be simply linked to a speed controlling and steering operation device like a lever on the vehicle.

Preferably, a pair of mechanical parking brakes, each of which is economically constituted by a frictional brake disk and a cam for braking the brake disk are located, in the respective deceleration drive train casings so as to be simply linked to a parking brake operation device like a lever disposed beside a driver's seat on the vehicle.

In a second aspect of the present invention, a vehicle transmission comprises a transmission casing incorporates a distributing drive train, a pair of left and right lateral axles, and a pair of left and right HSTs. Each of the HSTs is drivingly interposed between the distributing drive train in the transmission casing and each of the axles. An input shaft of the distributing drive train in the transmission casing is disposed in the substantially laterally middle portion of the transmission casing so as to project from the transmission casing toward a prime mover in the fore-and-aft direction of the vehicle. A PTO shaft for taking off power from the distributing drive train is disposed in a substantially lateral middle portion of the transmission casing and projects from the transmission casing opposite to the prime mover in the fore-and-aft direction of the vehicle. Each of the HSTs includes a hydraulic pump having an axial pump shaft, a hydraulic motor having an axial motor shaft perpendicular to the pump shaft, and an oil duct plate disposed in the transmission casing. The hydraulic pump and motor are mounted onto the oil duct plate to be fluidly connected to each other.

In the transmission casing, the PTO drive system and the left and right HSTs can be compactly disposed so as to shorten the length of the transmission in the fore-and-aft direction, and to ensure a space in which a universal joint coupling for drivingly coupling a working machine such as a mower unit to the PTO shaft is sufficiently lengthened, thereby ensuring a sufficient range for vertical movement of the mower unit.

Preferably, a PTO clutch drivingly interposed between the distributing drive train and the PTO shaft is disposed in a portion of the transmission casing opposite to the prime mover in the fore-and-aft direction of the prime mover. The PTO clutch can be economically supplied with oil from a charge pump for the HSTs attached onto the transmission casing.

Preferably, a pair of motor casings incorporating the respective hydraulic motors are mounted on respective left and right sides of the transmission casing. Each of the motor casings can be easily detached from the transmission casing so as to facilitate for easy maintenance of the HST.

Preferably, the motor shafts are supported by the respective motor casings so as to be disposed coaxially to the respective axles, thereby reducing the radial sizes of the left and right portions of the transmission housing the motor shafts and the axles.

Preferably, a pair of deceleration drive trains is drivingly interposed between the corresponding motor shaft and the corresponding axle, and each drive train has a pinion coaxial to the corresponding motor shaft. The deceleration drive trains other than the pinions can be disposed in respective deceleration gear casings so as to serve as assemblies easily attached or detached to and from the respective motor casings. In this configuration, the motor shafts may be supported by the respective motor casings so as to be disposed coaxially to the respective axles so that each of the pinions is disposed between the corresponding motor shaft and the corresponding axle. Therefore, the transmission can be compacted as mentioned above.

Preferably, the transmission casing is constituted by a front casing part and a rear casing part joined to each other. The oil duct plate and others can be easily disposed or removed in and from the transmission casing. The PTO drive system including a PTO clutch may be disposed in one of the front and rear casing parts and the HSTs in the other, whereby they are easily detached with the corresponding casing part from the other casing part.

Preferably, the hydraulic pumps are mounted onto vertical surfaces of laterally extended portions of the oil duct plate so as to extend the pump shafts in the fore-and-aft direction, and the hydraulic motors are mounted onto laterally outward vertical surfaces of portions of the oil duct plate extended in the fore-and-aft direction so as to extend the motor shafts laterally outward. Lateral motor shafts can receive power from the pump shafts extended in the fore-and-aft direction so as to transmit power to the lateral axles without expensive bevel gears.

In a third aspect of the present invention, a vehicle transmission comprises a transmission casing, a pair of left and right lateral axles, and a pair of left and right HSTs for the respective axles. The transmission casing incorporates a distributing drive train, and includes a pair of left and right divisional front or rear first casing parts, a rear or front second casing part, and a center plate sandwiched between the pair of first casing part and said second part. Each of the HSTs is disposed in each of the first casing parts so as to be drivingly interposed between the distributing drive train in the transmission casing and each of the axles. An input shaft of the distributing drive train in the transmission casing is disposed between the first casing parts, and projects from the transmission casing toward a prime mover in the fore-and-aft direction of the vehicle. A PTO shaft is disposed in a substantially lateral middle portion of the second casing part so as to take off power from the distributing drive train in the transmission casing, and projects from the second casing part opposite to the prime mover in the fore-and-aft direction of the vehicle. Each of HSTs includes a hydraulic pump having an axial pump shaft, and a hydraulic motor having an axial motor shaft. The hydraulic pump and the hydraulic motor in each of the HSTs are fluidly connected to each other and supported by the center plate.

The HSTs can be easily assembled into the transmission, and easily exposed by detaching the respective first casing parts from the center plate so as to facilitate for their maintenance. Due to the location of the input shaft between the first casing parts, the engine and the transmission can approach each other toward the axles so as to lower the center of gravity in the vehicle, thereby stabilizing the traveling vehicle, and thereby expanding the space for arranging a working machine on the PTO shaft side. If the working machine is a vertically movably suspended mower unit, a sufficient range of vertical movement of the mower unit is ensured.

A driving coupling device interposed between the input shaft and the prime mover may be also disposed in the space between the first casing parts so as to further shorten the distance between the transmission and the prime mover.

Preferably, the pump shafts of the left and right HSTs are extended in the fore-and-aft direction of the vehicle in parallel to the input shaft and the PTO shaft. The pump shafts of the left and right HSTs are extended in the fore-and-aft direction of the vehicle in parallel to said input shaft and said PTO shaft. This arrangement of pump shafts contributes to shifting the hydraulic pumps in front or rear of the center plate so as to save the lateral width of the transmission. Further, the hydraulic pump having the pump shafts can be extended in the fore-and-aft direction so as to ensure a space therebetween for arranging the input shaft and a driving coupling device interposed between the input shaft and the prime mover.

Further preferably, the pump shafts penetrate the center plate into the second casing part so as to be provided thereon with the respective pump gears, and a distributing gear is provided on the input shaft disposed between the left and right pump shafts in the second casing part so as to mesh with both the pump gears, thereby serving as the distributing gear train.

The center plate functions as a partition between a chamber for the distributing gear train and chambers for the HST. The distributing gear train can be assembled or dissembled into and from the transmission casing separately from the HSTs.

Further preferably, the input shaft penetrates the center plate into said second casing part. The center plate saves the count of parts for supporting the input shaft.

Preferably, the PTO shaft is disposed below the input shaft in the second casing part so as to be drivingly connected to the input shaft by a part of the distributing gear train. A PTO clutch may be disposed in the second casing part to be drivingly interposed between the PTO shaft and the input shaft. The second casing part can compactly incorporate such a PTO drive system from the distributing gear train.

Preferably, the motor shafts of the left and right HSTs are disposed laterally perpendicular to the respective pump shafts. Consequently, each deceleration gear train interposed between the motor shaft and the axle, which may be disposed coaxially or in parallel, can be compacted, so that the vehicle transmission is minimized at its left and right end portions.

Preferably, the motor shafts of the left and right HSTs are disposed in the fore-and-aft direction of the vehicle in parallel to the respective pump shafts so that the hydraulic pump and motor in each of the HSTS are aligned vertically. Consequently, the hydraulic motors are not disposed on left and right sides near the drive wheels but disposed in front or rear of the center plate, thereby shortening the-lateral width of the transmission. Also, a vertically and laterally wide space is ensured between the HSTs so as to facilitate for arranging the input shaft and the drive coupling device interposed between the input shaft and the prime mover.

Preferably, the input shaft penetrates the substantially laterally and vertically middle portion of said center plate, wherein said pump shafts of said left and right HSTs disposed on left and right sides of said input shaft, and wherein said PTO shaft is disposed below said input shaft. The PTO shaft is lowered so as to be drivingly connected to a working machine such as a mower unit via a universal joint coupling which can be disposed almost horizontally (with a small vertical angle) so as to ensure sufficient efficiency of its power transmission.

Further preferably, a PTO clutch is disposed on the input shaft before or behind the center plate in the second casing part, and a charge pump is disposed on the front or rear end of said second casing part or on the center plate. If the PTO clutch is a hydraulic clutch, it can be supplied with oil from the charge pump. The charge pump can be easily attached or-detached onto and from the transmission casing.

When the charge pump is provided on the input shaft, and an oil duct plate serves as the center plate, the charge pump supplies oil to the PTO clutch and to the HSTs via the oil duct plate.

Preferably, a pair of left and right deceleration casings are extended from front or rear end portions of the respective first casing parts and to the laterally outward portions of the respective first casing parts. This arrangement also facilitates shortening the distance between the prime mover and the transmission so as to improve the balance of the vehicle in the fore-and-aft direction.

In a fourth aspect of the present invention, a vehicle transmission comprises a transmission casing, a pair of left and right lateral axles, and a pair of left and right HSTs for driving the respective axles. The transmission casing incorporates a distributing drive train. An input shaft of the distributing drive train is disposed in the substantially laterally middle portion of the transmission casing so as to project from the transmission casing toward a prime mover in the fore-and-aft direction of the vehicle. A PTO shaft for taking off power from the distributing drive train is disposed in a substantially lateral middle portion of the transmission casing and projects from the transmission casing opposite to the prime mover in the fore-and-aft direction of the vehicle. Each of the HSTs is drivingly interposed between the distributing drive train in the transmission casing and each of the axles. Each of HSTs includes a hydraulic pump having an axial pump shaft extended in the fore-and-aft direction, a hydraulic motor having an axial motor shaft extended laterally perpendicularly to the pump shaft, and a vertical oil duct plate disposed in the transmission casing. The oil duct plate is extended laterally and bent at left and right end portions thereof in the fore-and-aft direction. The hydraulic pumps of the left and right HSTs are mounted onto the laterally extended portion of the oil duct plate, and the hydraulic motors of the left and right HSTs are mounted onto laterally outward surfaces of the respective left and right end portions of the oil duct plate.

Consequently, in the transmission, the left and right hydraulic motors can be disposed so as to extend laterally outward from the respective hydraulic pumps. Such a transmission is shortened vertically and in the fore-and-aft direction.

Preferably, each of left and right deceleration gear trains is disposed between each of the axles and each of the motor shafts. The motor shafts are disposed laterally in parallel or coaxially to the axle, whereby the deceleration gear trains can be compacted.

Further preferably, the deceleration gear trains are constituted by planetary gears. Each of the planetary deceleration gear trains, while ensuring a sufficiently large deceleration ratio, can be finely compactly disposed between the motor shaft and the axle so that the deceleration gear casing incorporating it can be disposed in a rim of a drive wheel connected to the axle.

Preferably, the transmission casing is dividable into first and second casing parts in the fore-and-aft direction. The first casing part incorporates a PTO clutch and supports the PTO shaft. The second casing part incorporates the oil duct plate, the left and right hydraulic pumps and motors, a distributing gear serving as a part of the distributing gear train, and a pair of pump gears provided on the respective pump shafts to mesh with the distributing gear.

The PTO assembly in the first casing part and the HST assembly in the second casing part can be compacted, and easily dissembled separately from each other.

Preferably, a pair of left and right motor casings are extended from left and right ends of the second casing part. Each of the hydraulic motors projects into the corresponding motor casing through the corresponding left or right side end portion of the second casing part. The motor casings can be easily detached from the second casing part so as to facilitate for maintenance the respective HSTs.

In a fifth aspect of the present invention, a vehicle transmission comprises a transmission casing, a pair of left and right lateral axles, and a pair of left and right transmission mechanisms for driving the respective axles. The transmission casing incorporates a distributing drive train. The transmission casing is recessed at the laterally middle portion thereof in the fore-and-aft direction. An input shaft of the distributing drive train in the transmission casing is disposed in the substantially laterally middle portion of the transmission casing so as to project from the transmission casing toward a prime mover in the fore-and-aft direction of the vehicle. The projecting portion of the input shaft and a driving coupling device interposed between the input shaft and the prime mover are disposed in a space ensured by the recessed laterally middle portion of the transmission casing. A PTO shaft for taking off power from the distributing drive train is disposed in a substantially lateral middle portion of the transmission casing and projects from the transmission casing opposite to the prime mover in the fore-and-aft direction of the vehicle. Each of the left and right transmission mechanisms is interposed between the distributing drive train in the transmission casing and each of the axles.

Consequently, the distance between the transmission and the prime mover can be decreased so as to improve the balance of the vehicle in the fore-and-aft direction.

These, other and further objects, features and advantages will appear more fully from the following detailed description with reference to the accompanying drawings.

BRIEF DESCRIPTION OF THE DRAWINGS/FIGURES

DETAILED DESCRIPTION OF THE INVENTION

Figure 1:
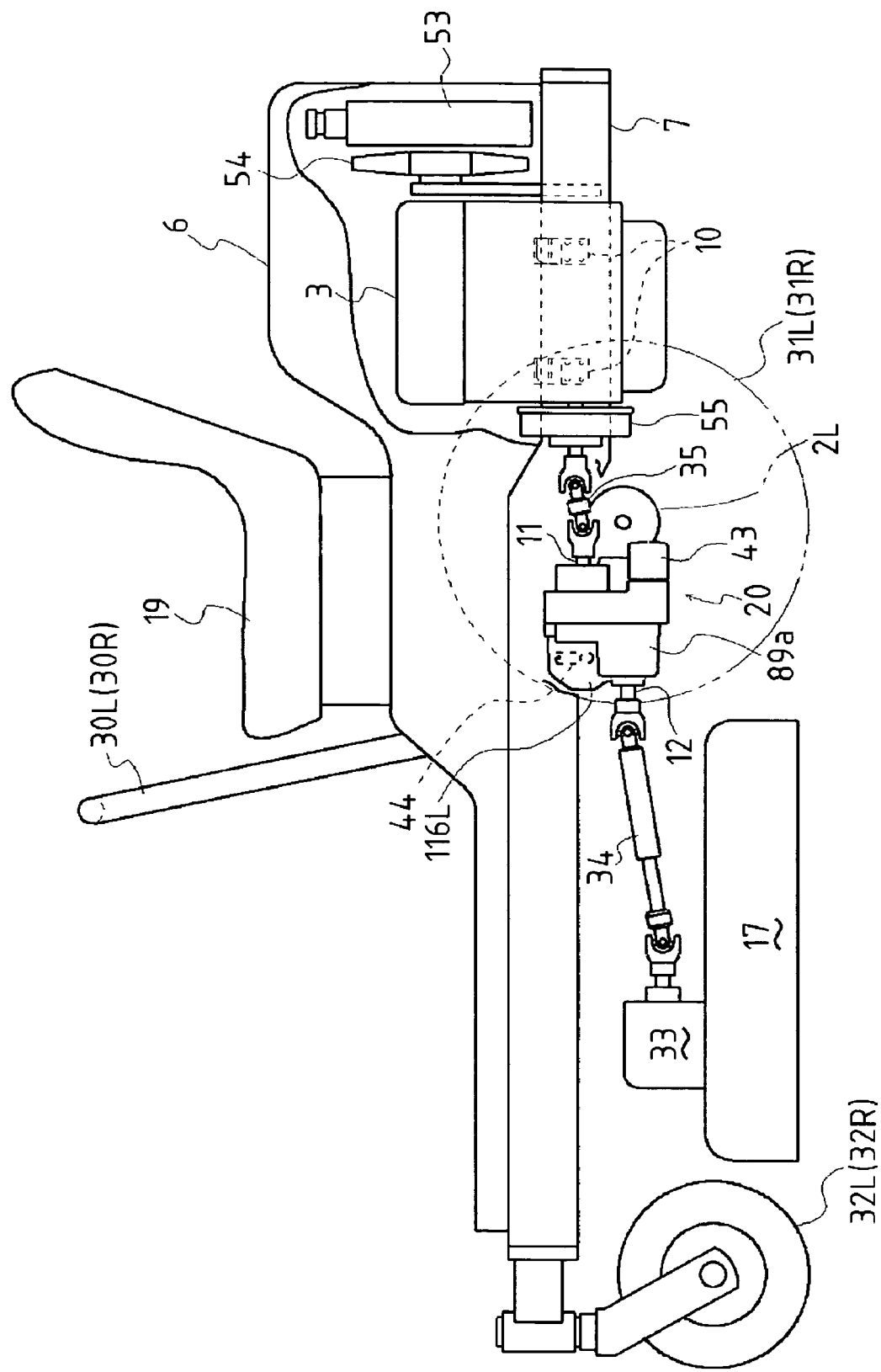
FIG. 1 is a side view of a riding lawn mower equipped with a transmission according to a first embodiment of the present invention.

A general configuration of a riding lawn mower shown in FIG. 1, equipped with a transmission 20 according to a first embodiment of the invention, will be described. A vehicle frame 7 is extended between the front and rear ends of the riding lawn mower. Left and right front casters 32L and 32R are supported at the front end of vehicle frame 7. The riding lawn mower is provided at its lateral middle portion with a mower unit 17 vertically movably suspended below vehicle frame 7 behind casters 32L and 32R. An input gearbox 33 is mounted on the top of mower unit 17. Transmission 20 having a forwardly projecting PTO shaft 12 is disposed behind mower unit 17 so as to transmit power from PTO shaft 12 to gearbox 33 via a universal joint coupling 34, thereby a rotary blade in mower unit 17.

A horizontal crankshaft engine 3 is disposed behind transmission 20 and is elastically supported by frame 7 via vibro-isolating rubbers 10. Engine 3 is provided with a radiator fan 54 and a radiator 53 therebehind. An output terminal of the crankshaft projects forward from engine 3 and is provided thereon with a flywheel 55. Transmission 20 has a rearwardly projecting input shaft 11 drivingly connected to the output terminal of engine 3 via a universal joint coupling 35. An engine cover 6 encloses transmission 20, engine 3, radiator fan 54 and radiator 53. A driver's seat 19 is mounted on the top of engine cover 3 just above transmission 20.

Left and right rear drive wheels 31L and 31R are disposed so as to have transmission 20 therebetween. To drive wheels 31L and 31R, transmission 20 has a pair of left and right steplessly variable transmissions, i.e., later-discussed HSTs 90L and 90R. The rotational force of input shaft 11 is shared between mower unit 17 and the pair of HSTs 90L and 90R. A pair of left and right steering levers 30L and 30R for operating the respective HSTs 90L and 90R are pivoted on the left and right sides of seat 19. Each of the HSTs 90L and 90R circulates oil and has a movable swash plate, which is rotated for changing the amount and direction of circulated oil by each of trunnion shafts 13L and 13R. Trunnion shafts 13L and 13R project laterally outward to be fixedly provided thereon with respective speed control arms 44L and 44R.

Steering levers 30L and 30R are adapted for manipulation by an operator sitting on seat 19. Both levers 30L and 30R are pushed forward together for forward traveling of the vehicle, and pulled rearward together for rearward traveling of the vehicle. Levers 30L and 30R are differentially operated to turn the vehicle. If only one of levers 30L and 30R is operated while the other is set in the neutral position, the vehicle performs zero turn. If levers 30L and 30R are rotated oppositely to each other, the vehicle spins.

When the vehicle turns by differential rotation of drive wheels 31L and 31R, casters 32L and 32R move laterally so as to smooth the turning of the vehicle.

Transmission 20 according to the first embodiment shown in FIGS. 2 to 7 will be described. Transmission 20 comprises a center casing 16 and a pair of left and right deceleration gear casings 2L and 2R. In transmission 20, the pair of left and right HSTs 90L and 90R are mounted onto left and right front ends of center casing 16 (project forward from center casing 16) oppositely to engine 3 in the fore-and-aft direction of the vehicle. A PTO device 89 is mounted onto the lateral middle front end of center casing 16 (projects forward from center casing 16) between HSTs 90L and 90R. A charge pump 68 is mounted onto the lateral middle rear end of center casing 16 (projects rearward from center casing 16) toward engine 3 in the fore-and-aft direction of the vehicle.

Center casing 16 is dividable into a front casing part 5 and a rear casing part 4 joined to each other through a vertical lateral joint surface. Charge pump 68 has a charge pump casing 117 fixed to the rear end surface of rear casing part 4 so as to be disposed on the engine side of center casing 16. Charge pump casing 117 encloses a charge pump gear 18 fixed on input shaft 11 and rotatably fitted along the rear surface of rear casing part 4.

A pair of left and right oil duct plates 14L and 14R are fixed onto the respective left and right front end surfaces of center casing 16 (front casing part 5). Left and right HST casings 116L and 116R are fixed onto the respective front end surfaces of oil duct plates 14L and 14R. Alternatively, HST casings 116L and 116R may be fixed to or integrated with front center casing 16 (front casing part 5) so as to enclose oil duct plates 14L and 14R. In left HST casing 116L, an upper hydraulic pump 27L and a lower hydraulic motor 26L are vertically aligned and slidably rotatably fitted onto the front end surface of oil duct plate so as to constitute left HST 90L. Similarly, an upper hydraulic pump 27R and a lower hydraulic motor 26R are disposed in right HST casing 116R and fitted onto oil duct plate 14R so as to constitute right HST 90R. Variable displacement hydraulic pumps 27 have respective lateral trunnion shafts 13L and 13R serving as pivots of the respective swash plate. Trunnion shafts 13L and 13R project laterally outward from respective HST casings 116L and 116R so as to be linked to respective steering levers 30L and 30R.

Figure 2:
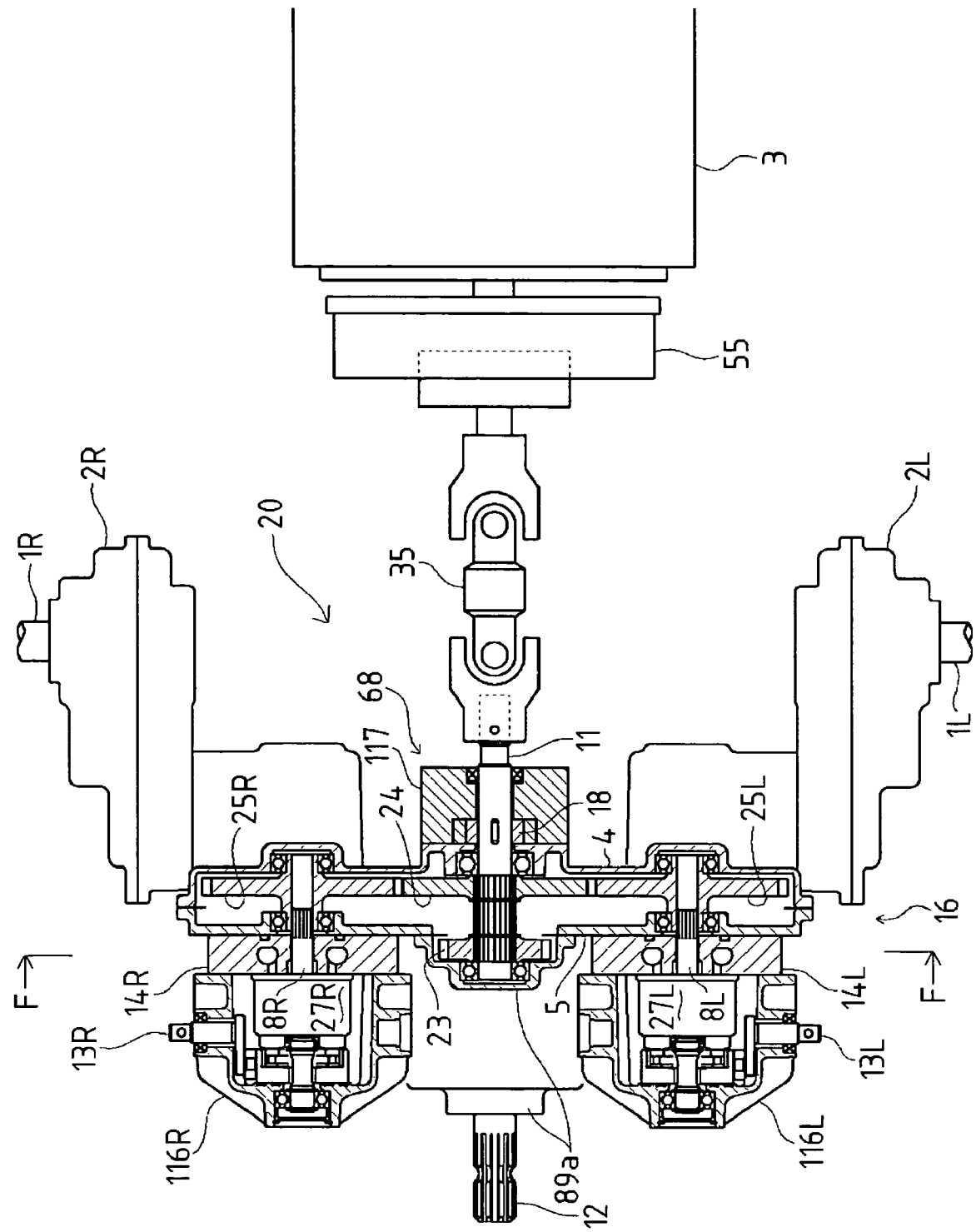
FIG. 2 is a cross-sectional view taken in B-B line of FIG. 4.

As shown in FIG. 2, input shaft 11 extended in the fore-and-aft direction of the vehicle rotatably penetrates charge pump casing 117 and center casing 16. Input shaft 11 is disposed in the lateral middle portion of center casing 16, and is journalled at its intermediate portion by the rear end of center casing 16 (rear casing part 4) via a bearing. The front end of input shaft 11 is journalled by a bearing in a PTO casing 89a of PTO device 89 fixed onto the lateral middle front end of center casing 16 (front casing part 5).

As shown in FIG. 2, input shaft 11 is fixedly provided thereon with a distributing gear 24 in center casing 16, and with a PTO counter gear 23 in PTO casing 89a. Left and right hydraulic pumps 27L and 27R have respective horizontally axial pump shafts 8L and 8R extended rearward from respective oil duct plates 14L and 14R into center casing 16. Laterally opposite pump input gears 25L and 25R are fixed on respective pump shafts 8L and 8R in center casing 16 and mesh with distributing gear 24 therebetween. In this way, the rotational force of input shaft 11 is shared between left and right hydraulic pumps 27L and 27R.

Figure 3:
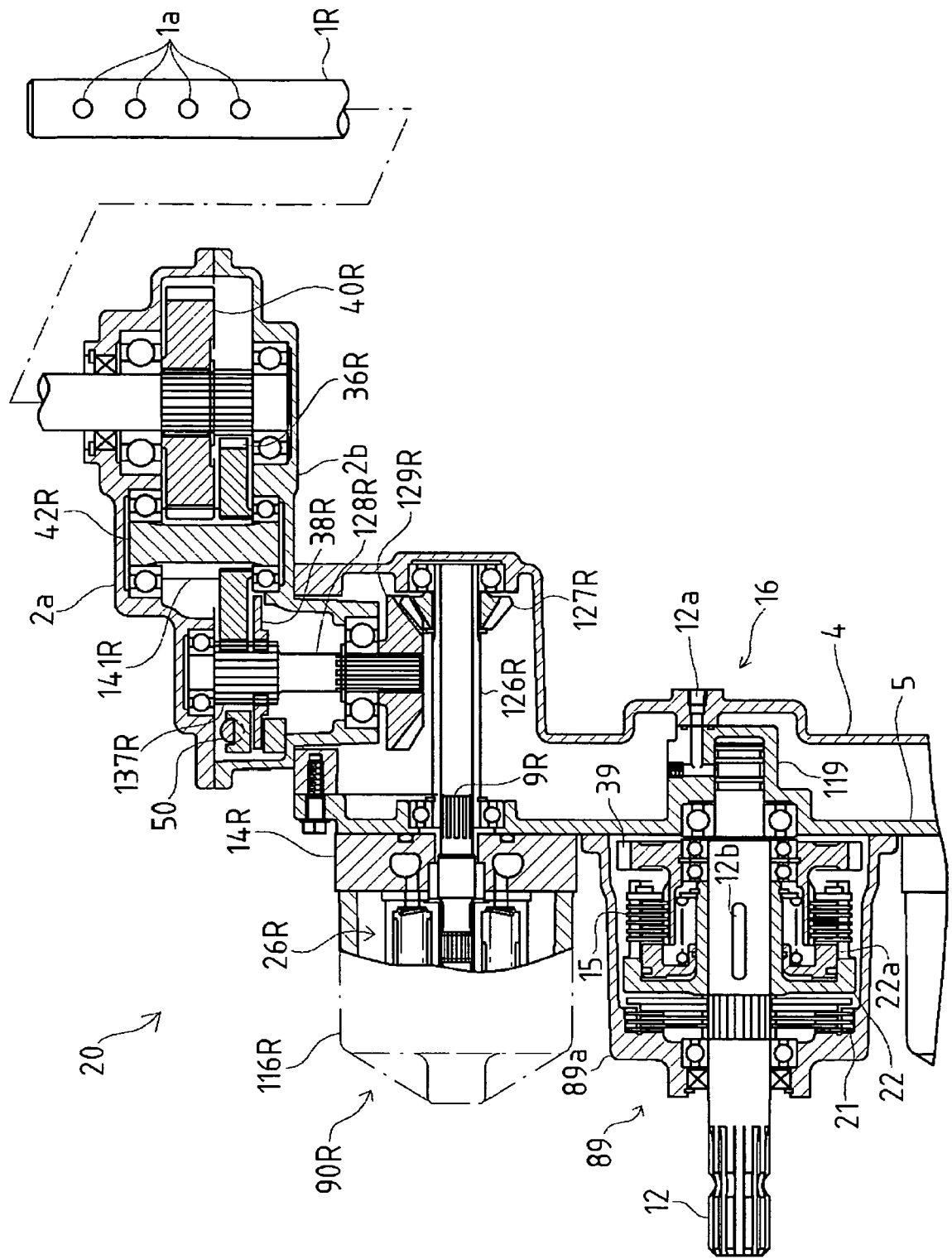
FIG. 3 is a cross-sectional view taken in C-C line of FIG. 4.

Each of oil duct plates 14L and 14R is formed therein with oil ducts (constituting a closed fluid circuit) in which oil delivered from corresponding pump 27L or 27R is circulated so as to rotate corresponding motor 26L or 26R. As best shown in FIG. 3, hydraulic motors 26L and 26R have respective horizontally axial motor shafts 9L and 9R extending rearward from respective oil duct plates 14L and 14R into center casing 16. In center casing 16, left and right driving sleeves 126L and 126R are journalled at their front and rear ends by front and rear casing parts 4 and 5 via bearings. Motor shafts 9L and 9R are integrally rotatably fitted into respective driving sleeves 126L and 126R. Bevel gears 127L and 127R are fixed onto the rear end portion of respective driving sleeves 126L and 126R in center casing 16.

Left and right deceleration gear casings 2L and 2R are fixedly fitted at their front end portions onto the respective left and right side ends of center casing 16. Deceleration gear casings 2L and 2R journal first deceleration shafts 128L and 128R in their front portions, respectively. First deceleration shafts 128L and 128R are extended laterally (perpendicular to motor shafts 9L and 9R) and project into center casing 16 so as to be disposed at their proximal ends adjacent to respective driving sleeves 128L and 128R (motor shafts 9L and 9R). Bevel gears 129L and 129R are fixed on the respective proximal ends of first deceleration shafts 128L and 128R and mesh with respective bevel gears 127L and 127R.

Deceleration gear casings 2L and 2R journal respective left and right lateral axles 1L and 1R in their rear end portions, and journal lateral second deceleration shaft 42L between first deceleration shaft 128L and axle 1L, and lateral second deceleration shaft 42R between first deceleration shaft 128R and axle 1R, respectively. Second deceleration shafts 42L and 42R are formed on their peripheral surfaces with respective gears 141L and 141R, and fixedly provided thereon with respective gears 36L and 36R fitted on gears 141L and 141R. In deceleration gear casings 2L and 2R, gears 137L and 137R diametrically smaller than bevel gears 129L and 129R are formed on respective first deceleration shaft 128L and 128R, and mesh with respective gears 36L and 36R diametrically larger than gears 137L and 137R. In deceleration gear casing 2L and 2R, gears 40L and 40R diametrically larger than gears 141L and 141R are fixed on respective axles 1L and 1R and mesh with respective gears 141L and 141R out of respective gears 36L and 36R. In this way, deceleration gear trains for driving respective axles 1L and 1R are configured in respective deceleration gear casings 2L and 2R.

Each of axles 1L and 1R is provided with a plurality of axially aligned diametric pinholes 1a at its portion projecting laterally outward from each of deceleration gear casings 2L and 2R so as to have an unshown pin for fastening each wheel 31L or 31R to each axle 1L or 1R inserted therein. In each of axles 1L and 1R, one of pinholes 1a, into which the pin is fitted, is selected so as to adjust the position of each of wheels 31L and 31R in the axial direction of axle 1L or 1R, thereby adjusting the distance between left and right wheels 31L and 31R. Alternatively, a washer may be disposed between center casing 16 and each of deceleration gear casings 2L and 2R so as to adjust the distance between left and right wheels 31L and 31R.

Figure 4:
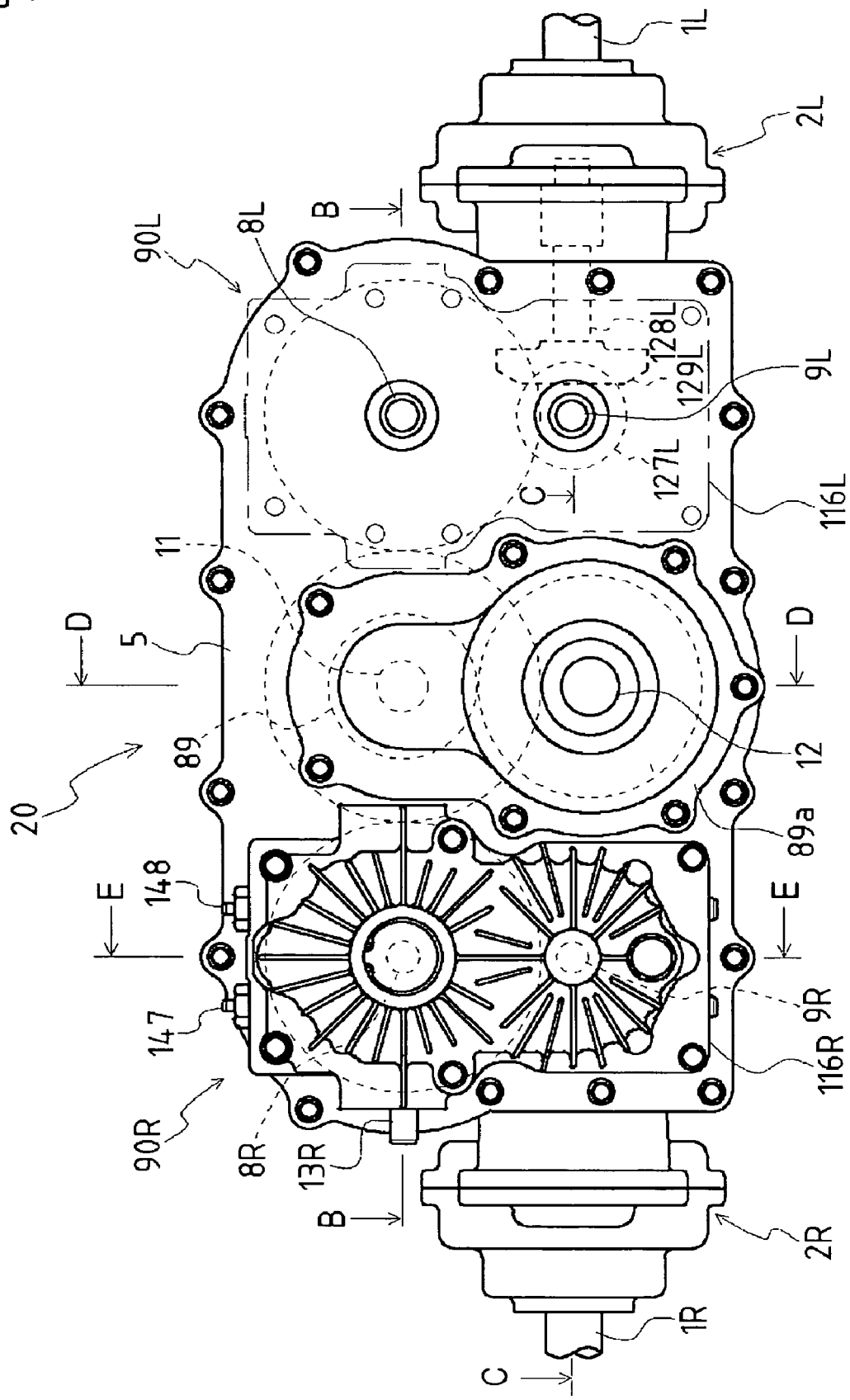
FIG. 4 is a front view of the transmission according to the first embodiment.

In this way, left HST 90L, deceleration gear casing 2L and axle 1L and right HST 90R, deceleration gear casing 2R and axle 1R are configured and arranged laterally symmetrically with respect to input shaft 11, as shown in FIG. 4 and others.

Figure 5:
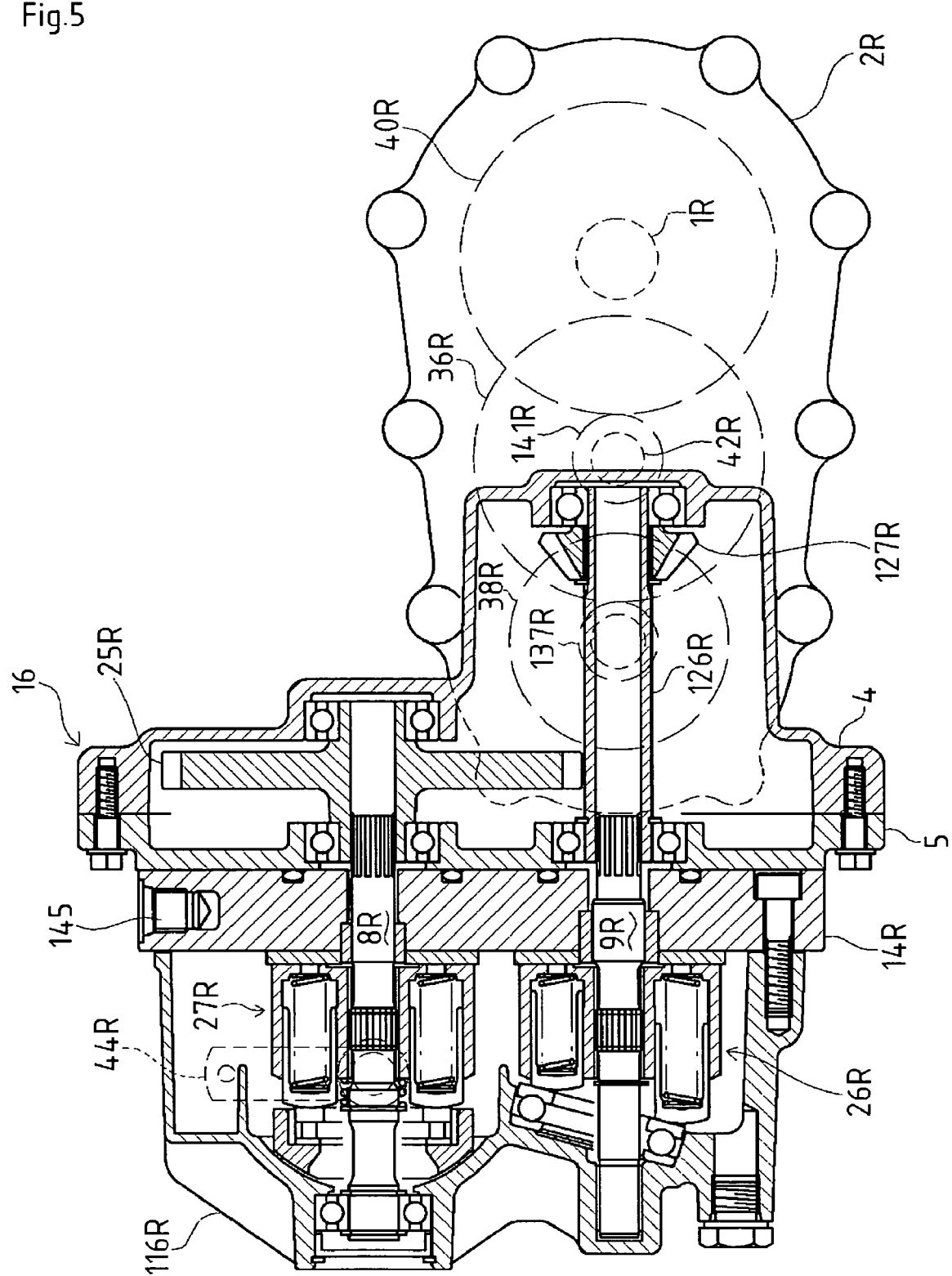
FIG. 5 is a cross-sectional view taken in E-E line of FIG. 4.

Each of deceleration gear casings 2L and 2R is constituted by laterally outside casing part 2a and inside casing part 2b joined to each other through a vertical surface extended in the fore-and-aft direction of the vehicle. The front end portion of inside casing part 2a housing each of first deceleration shafts 128L and 128R projects laterally proximally into center casing 16 through each of left and right side ends of rear casing part 4. Each of deceleration gear casings 2L and 2R may be rotated around the front end portion thereof fitted into center casing 16, i.e., around each of first deceleration shafts 128L and 128R so as to adjust the height of corresponding axle 1L or 1R relative to first deceleration shaft 128L or 128R. FIG. 5 illustrates second deceleration shaft 42R and axle 1R typically aligned horizontally with first deceleration shaft 128R.

In deceleration gear casings 2L and 2R, frictional brake disks 38L and 38R are axially slidably fitted on respective gears 137L and 137R. A brake cam 50 is disposed adjacent to each of frictional brake disks 38L and 38R and linked to a parking brake manipulator (such as a lever) provided on the riding lawn mower. When the parking brake manipulator is operated for braking, cams 50 are rotated to press brake disks 38L and 38R against respective deceleration gear casings 2L and 2R through brake pads so as to brake axles 1L and 1R.

Figure 6:
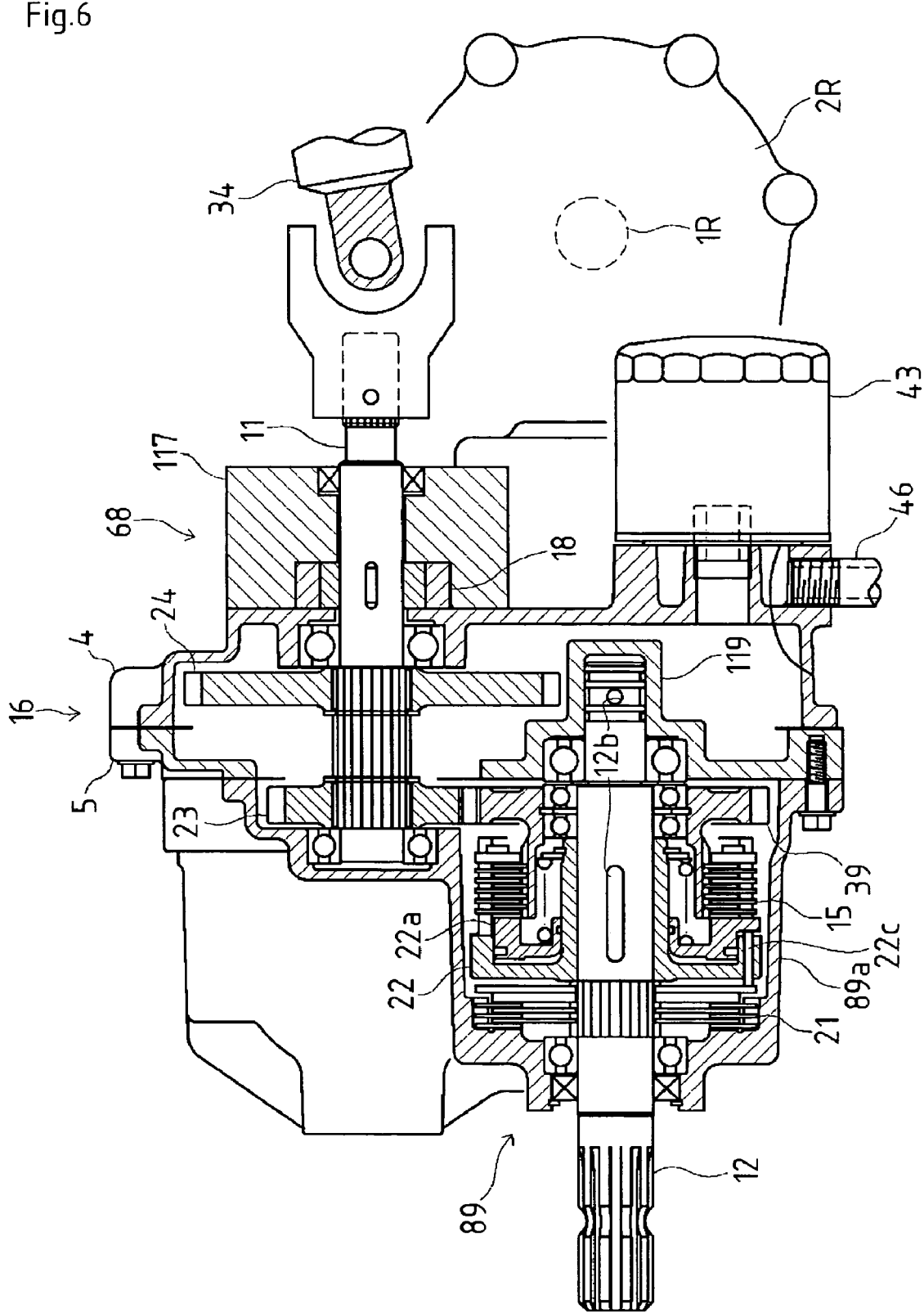
FIG. 6 is a cross-sectional view taken in D-D line of FIG. 4.

PTO device 89 will be described with reference to FIGS. 3 and 6. PTO device 89 comprises a hydraulic PTO clutch 15 and a PTO brake 21 disposed in PTO casing 89a. PTO casing 89a may be integrated with center casing 16, (front casing part 5). PTO shaft 12 projecting forward from PTO casing 89a is journalled at its intermediate portion by the front end portion of PTO casing 89a, and at its rear end portion by a cylindrical oil duct portion 119 formed of front casing part 5 via respective bearings. Oil dust portion 119 of front casing part 5 is extended rearward along the rear end portion of PTO shaft 12 and is in contact with the rear surface of rear casing part 4. Rear casing part 4 and oil duct portion 119 are penetrated by an oil port 12a, which is open at one end thereof rearwardly outward from rear casing part 4, and at the other end thereof into the cylindrical hole of oil duct portion 119 fitting the rear end of PTO shaft 12 therein. PTO shaft 12 is formed therein with an oil duct 12b, which is open at its rear end into the cylindrical hole of oil duct portion 119, and at its front end into PTO casing 89a. Oil port 12a receives oil supplied from charge pump 68 and supplies the oil into PTO casing 89a via oil duct 12b in PTO shaft 12 so as to move a clutch piston 22a.

In PTO casing 89a, a clutch casing 22 is fixed on PTO shaft 12, and clutch piston 22a is axially slidably fitted in clutch casing 22 around PTO shaft 12. A clutch gear 39 is relatively rotatably provided around PTO shaft 12 via bearings behind clutch casing 22, and extends forward into clutch casing 22. Clutch gear 39 meshes at its top end with PTO input gear 23 fixed on input shaft 11 in the upper portion of PTO casing 89a, as best shown in FIG. 6. Primary friction disks slidably and integrally rotatably fitted to clutch gear 39 and secondary friction disks slidably and integrally rotatably fitted to clutch casing 22 are alternately aligned behind clutch piston 22a. A spring is disposed in clutch casing 22 so as to bias clutch piston 22a forward. The front end opening of oil duct 12b in PTO shaft 12 is open to a chamber between the front end of clutch casing 22 and the front end of clutch piston 22a. In this way, wet multi-disk type PTO clutch 15 is configured in PTO casing 89a. Oil supplied into the chamber from oil duct 12b in PTO shaft 12 pushes clutch piston 22a rearward against the spring so as to press the secondary friction disks against the primary friction disks, i.e., engage PTO clutch 15, thereby drivingly coupling PTO shaft 12 to input shaft 11.

Multi-disk type PTO brake 21 is provided on PTO shaft 12 between the front end of PTO casing 89 and the front end of clutch casing 22. A pushpin 22c penetrates clutch casing 22 between clutch piston 22a and PTO brake 21. When oil is released from the chamber between clutch casing 22 and clutch piston 22a, clutch piston 22a returns forward by the spring so as to separate the secondary friction disks from primary friction disks, i.e., disengage PTO clutch 15, thereby separating PTO shaft 12 from input shaft 11. Simultaneously, pushpin 22c is pushed forward by returning clutch piston 22a so as to press brake disks of PTO brake 21, whereby PTO shaft 12 is surely braked against its inertial rotation.

Figure 7:
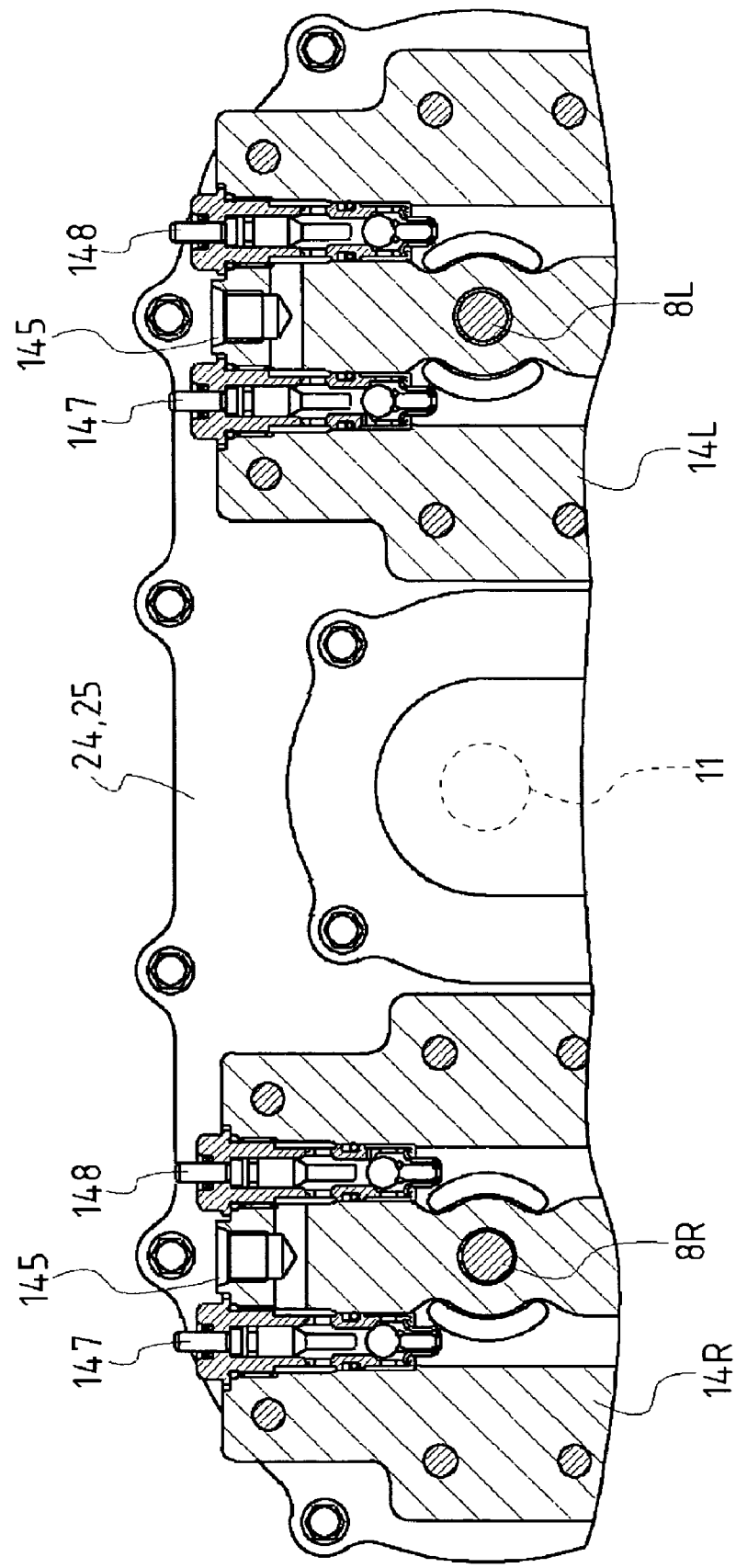
FIG. 7 is a cross-sectional view taken in F-F line of FIG. 4.

Oil supplied from charge pump 68 serves as hydraulic oil for PTO clutch 15 and HSTs 90L and 90R, and also serves as lube for interior gears and other parts of transmission 20. An oil filter 43 is screwed into the rear end surface of rear casing part 4 below charge pump 68 and mounted rearward from center casing 16, as shown in FIG. 6. An oil suction pipe 46 is extended from oil filter 43 to charge pump 68, so that oil in the interior oil sump of center casing 16 is filtered by oil filter 43 and absorbed into charge pump 68 via oil suction pipe 46. Oil pipes for supplying oil to respective HSTs 90L and 90R are extended from charge pump 68 outside center casings 16 to respective charge ports 145 open at the tops of oil duct plates 14L and 14R as shown in FIG. 7. Additionally, charge pump 68 supplies hydraulic oil for a hydraulic actuator for lifting mower unit 17 as discussed later.

Figure 8:
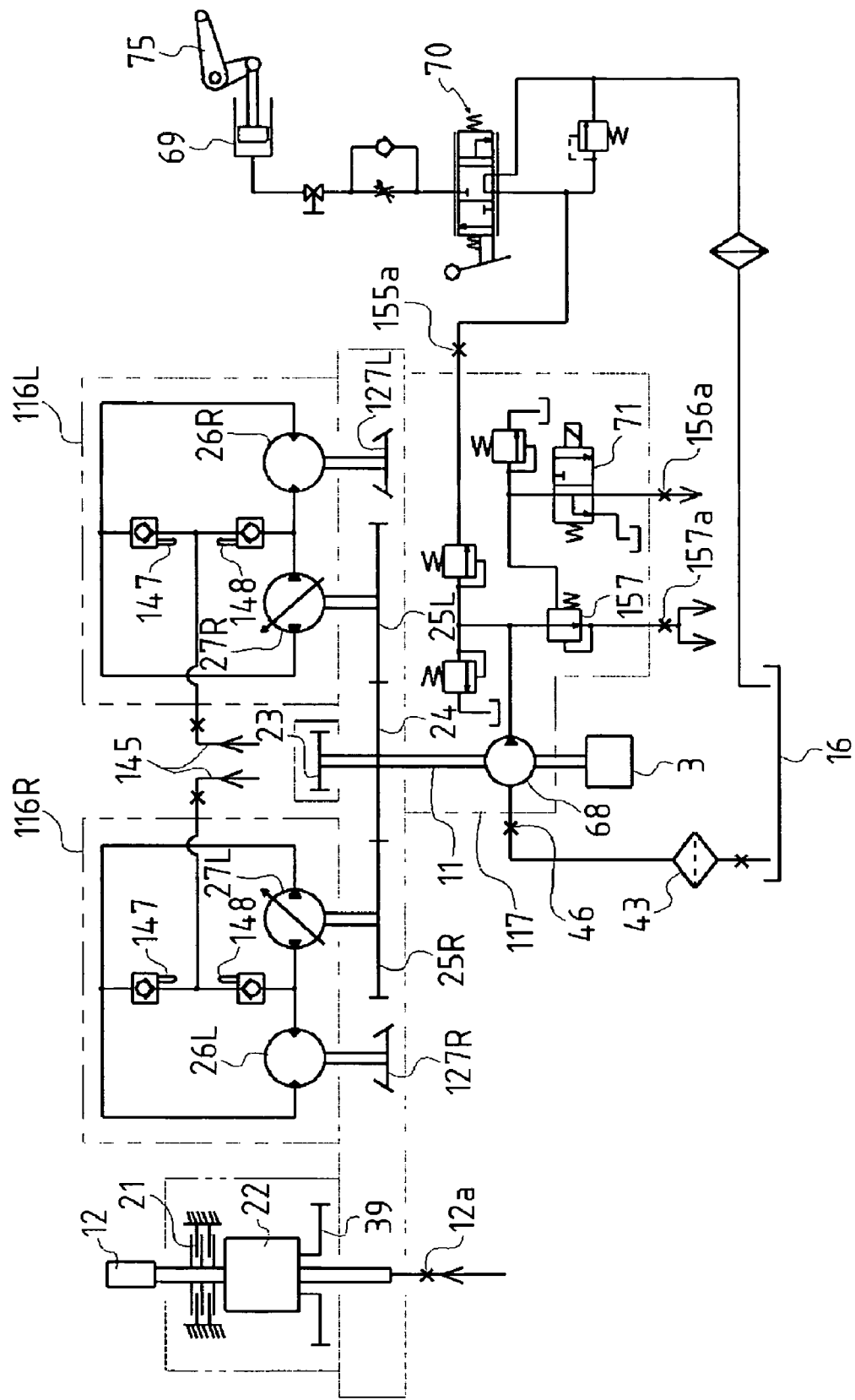
FIG. 8 is a hydraulic circuit diagram of the transmission according to the first embodiment.

A hydraulic oil circuit provided in transmission 20 of the first embodiment will now be described with reference to FIG. 8. Charge pump 68 absorbs oil from the interior oil sump of center casing 16 via oil filter 43 and oil suction pipe 46, as mentioned above. More specifically, pump gear 18 in charge pump casing 117 is rotated together with input shaft 11 so as to absorb oil from oil filter 43, and delivers the oil to a charge pressure reducing valve 157 disposed within charge valve casing 117. Valve 157 adjusts the pressure of oil and sends the oil outward from charge valve casing 117 to a distributing port 157*a*, which bifurcates the oil line between charge ports 145 of respective HSTs 90L and 90R. As mentioned above, FIG. 7 illustrates charge ports 145 open at the tops of oil duct plates 14L and 14R (outward from center casing 16) adapted to receive oil pipes extended from charge valve casing 117 outside center casing 16, however, alternative charge ports open into center may be formed in oil duct plates 14L and 14R so as to receive bifurcated oil lines from charge pump casing 117 disposed in center casing 16. In this case, the oil lines may be formed within the wall of center casing 16.

To supply PTO clutch 15 with hydraulic oil, a PTO clutch switching valve 71 is disposed within charge valve casing 117 so as to receive excessive oil drained from charge pressure reducing valve 157. An oil pipe is extended from a port 156*a* of charge valve casing 117 to oil port 2*a* open at rear casing part 4. When valve 71 is set at its clutch on position, valve 71 sends pressured oil outward from charge valve casing 117 via port 156*a* and supplies it into clutch casing 22 in PTO casing 89*a* via oil port 2*a* and oil duct 12*b* so as to engage PTO clutch 15.

High-pressure oil on the upstream side of charge pressure reducing valve 157 is taken out from charge valve casing 117 via a resistance valve and a port 155*a* and supplied to a lift cylinder control valve 70 through an oil pipe. Lift cylinder control valve 70 selectively supplies or releases oil into and from a lift cylinder 69 so as to telescope a piston rod of lift cylinder 69. The piston rod of lift cylinder 69 is coupled to a lift arm 75 lifting mower unit 17 or another working machine. Due to this configuration, mower unit 17 or another working machine suspended by the riding lawn mower is vertically moved.

Each of oil duct plates 14L and 14R forms therein a pair of oil ducts interposed between the corresponding hydraulic pump and motor. As show in FIGS. 4 and 7, a pair of check valves are disposed in an upper portion of each of oil duct plates 14L and 14R. Each check valve allows oil from charge port 145 to be charged into the corresponding oil duct in oil dust plate 14L or 14R, and prevents oil from leaking out from the corresponding oil duct. However, a pair of pushpins 147 and 148 are provided to the respective check valves in each of oil duct plates 14L and 14R, and project upward from each oil duct plate 14L or 14R so as to be manipulated. If the riding lawn mower must be hauled, pushpins 147 and 148 are pushed down so as to forcibly open the check valves, thereby releasing out oil from the oil ducts in oil duct plate 14L or 14R and letting the hydraulic pump and motor fluidly free from each other. In this situation, the riding lawn mower can be smoothly moved while freely rotating drive wheels 31L and 31R and preventing hydraulic pumps 27L and 27R from being unexpectedly rotated by rotating hydraulic motors 26L and 26R drivingly connected to drive wheels 31L and 31R. Pushpins 147 and 148 may be pushed to open the check valves so as to reduce the hydraulic resistance of HSTs 90L and 90R when engine 3 is going to be started.

Figure 9:
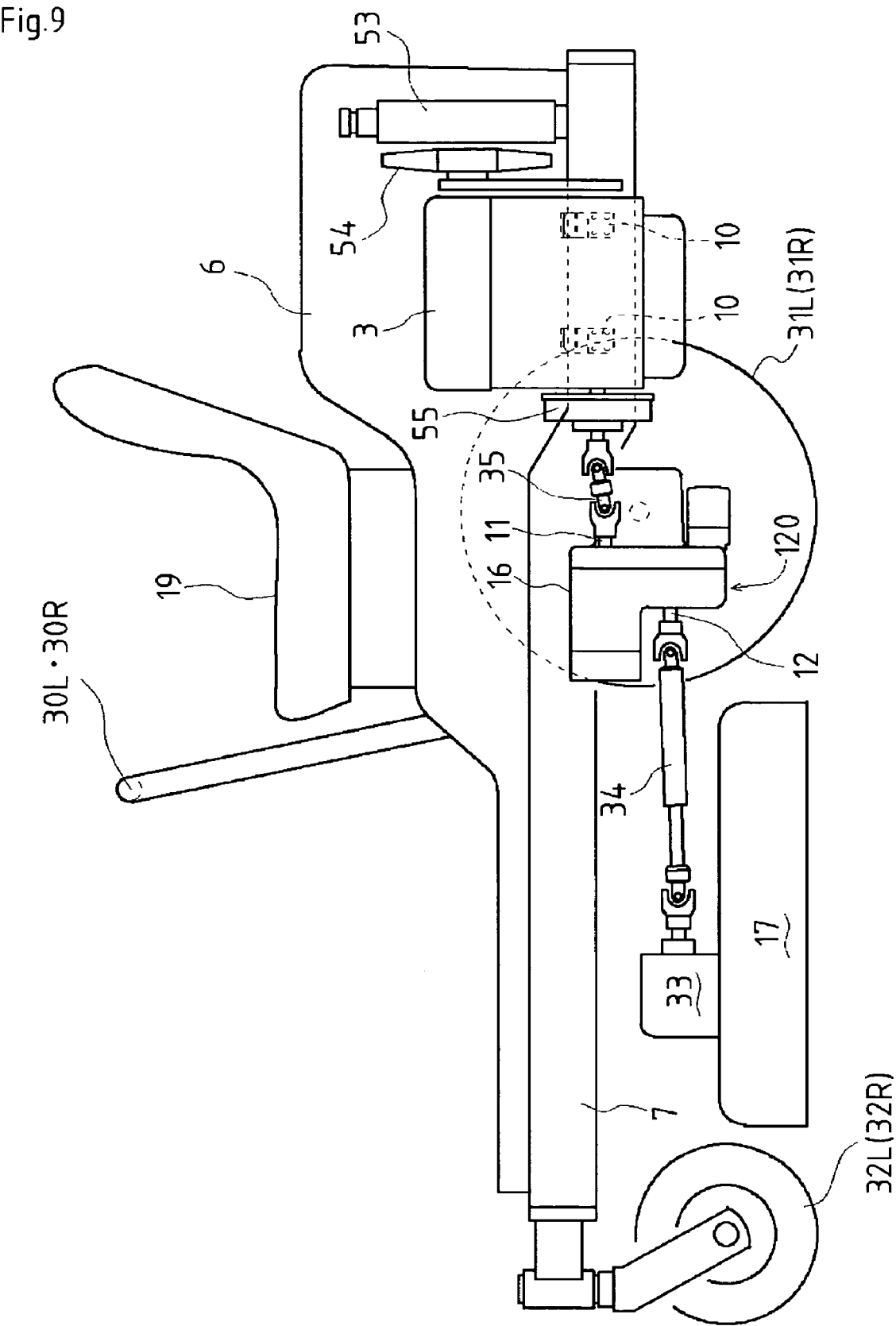
FIG. 9 is a side view of a riding lawn mower equipped with a transmission according to a second embodiment of the present invention.

FIG. 9 illustrates a riding lawn mower equipped with a transmission 120 according to a second embodiment. The riding lawn mower is the same as that of FIG. 1 except for transmission 120. A configuration of transmission 120 will now be described with reference to FIGS. 9 to 13.

Transmission 120 of the present embodiment is provided with center casing 16 constituted by front and rear casing parts 5 and 4 joined to each other through a vertical lateral joint surface. Center casing 16 of transmission 120 serves as center casing 16 of transmission 20 reshaped to be integrated with the upper pump housing portions of HST casings 116L and 116R. Left and right motor casings 103L and 103R are mounted onto left and right side ends of center casing 16 so as to be extended oppositely laterally outward from center casing 16. Deceleration gear casings 2L and 2R of transmission 120 are mounted onto outer sides of respective motor casings 103L and 103R so as to extend oppositely laterally outward from motor casings 103L and 103R. Rear wheels 31L and 31R are disposed laterally outward of respective deceleration gear casings 2L and 2R.

Figure 10:
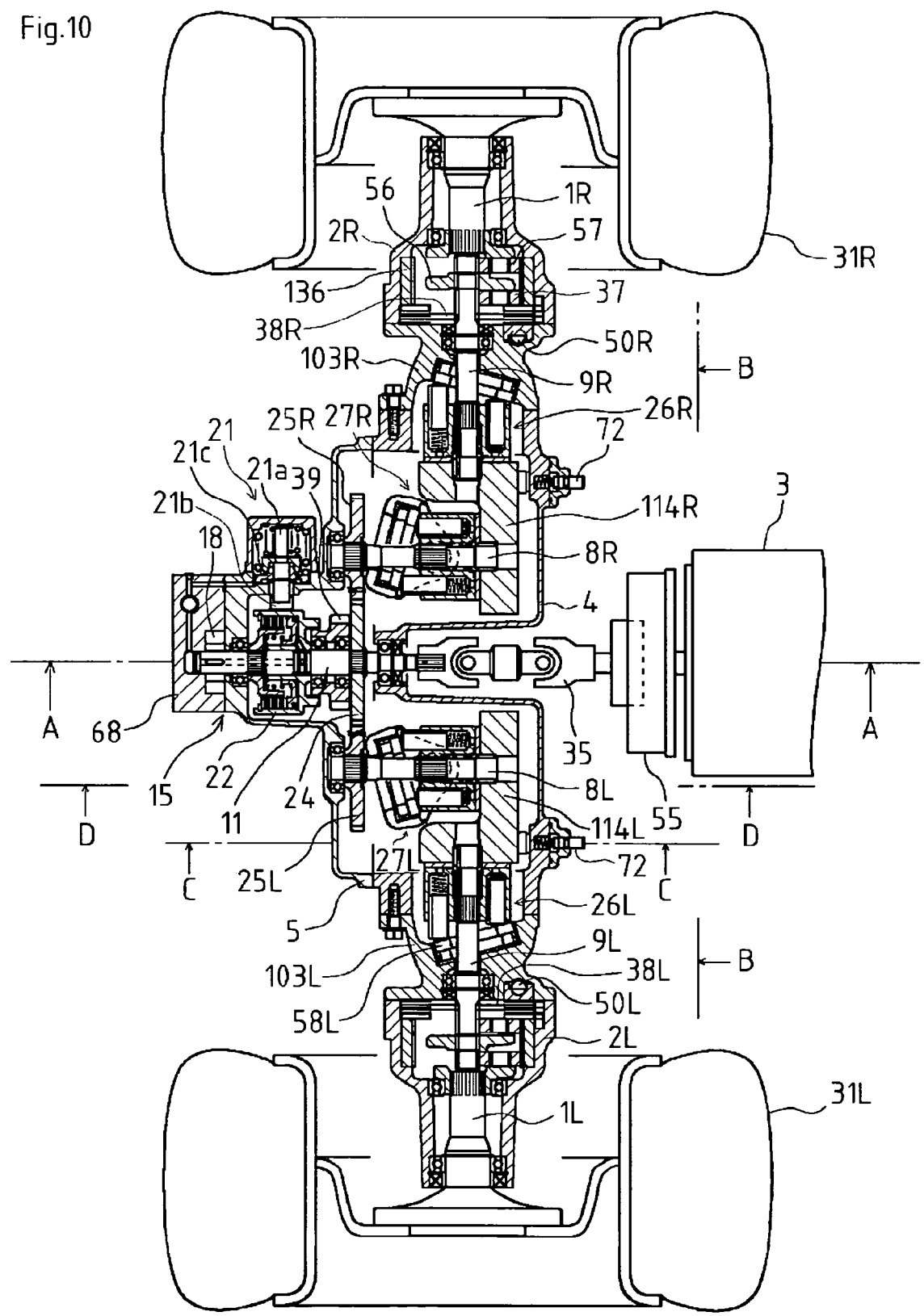
FIG. 10 is a sectional plan view of the transmission according to the second embodiment.

Charge pump 68 is mounted onto the lateral middle front end of center casing 16 incorporating charge pump gear 18 so as to project forward from center casing 16, as shown in FIG. 10.

As shown in FIG. 10, left and right oil duct plate 114L and 114R are disposed in left and right rear portions of center casing 16, respectively. Both of oil duct plates 114L and 114R are fastened to the rear end surface of rear casing part 4 via bolts 114*a*. Alternatively, oil duct plates 114L and 114R may be integrated with each other so as to form a monoblock shared between left and right HSTs 90L and 90R.

When viewed in plan, oil duct plates 114L and 114R are symmetrically L-like shaped. Hydraulic pumps 27L and 27R are mounted onto the front surfaces of laterally extended portions of oil duct plates 114L and 114R so as to be extended forward in parallel from oil duct plates 114L and 114R, respectively. Hydraulic motors 26L and 26R are mounted onto the left and right side surfaces of portions of oil duct plates 114L and 114R extended in the fore-and-aft direction of transmission 120 so as to be extended oppositely laterally outward from oil duct plates 114L and 114R, respectively. A closed oil circuit is formed within each of oil duct plates 114L and 114R so as to fluidly connect its corresponding pump and motor 27L and 26L or 27R and 26R, thereby constituting each of HSTs 90L and 90R.

As shown in FIG. 10, horizontal input shaft 11 is disposed in the lateral middle portion of center casing 16 and extends rearward from center casing 16 between the left and right HST housing portions of center casing 16. Horizontal crankshaft engine 3 having the forwardly projecting output terminal provided thereon with flywheel 55 is disposed behind transmission 120, and universal joint coupling 35 is interposed between the output terminal of engine 3 and input shaft 11.

As shown in FIG. 10, in center casing 16, distributing gear 24 fixed on input shaft 11 and left and right pump gears 25 meshing with distributing gear 24 therebetween are disposed in front of hydraulic pumps 27L and 27R. PTO clutch gear 39 is relatively rotatably provided via bearings on input shaft 11 in front of distributing gear 24. PTO clutch casing 22 is provided around input shaft 11 in front of PTO clutch gear 39. The front end of input shaft 11 is inserted into charge pump 68 fitted onto the front end of center casing 16 so as to serve as the driving shaft of charge pump gear 18.

Figure 11:
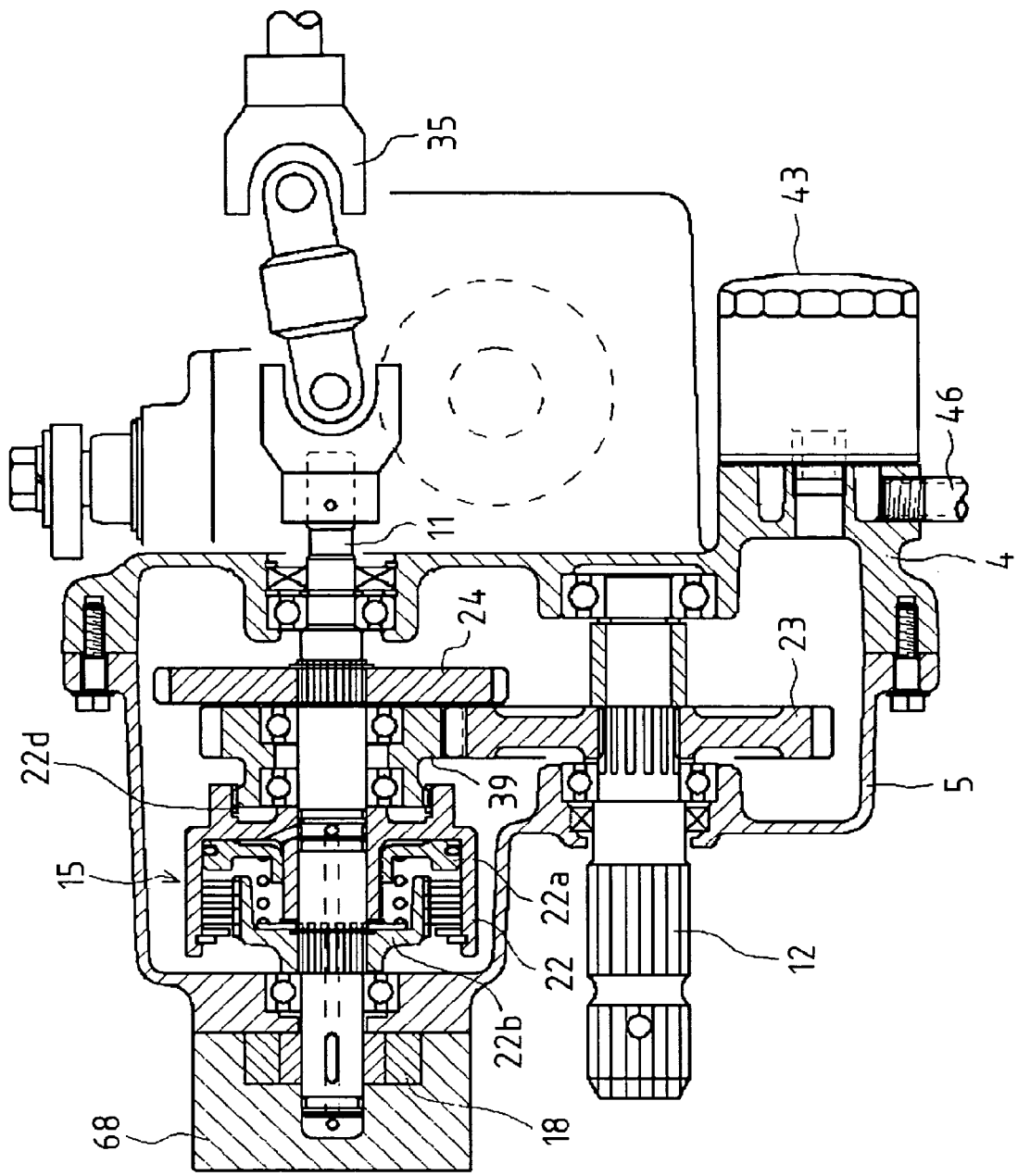
FIG. 11 is a cross-sectional view taken in A-A line of FIG. 10.

FIG. 11 illustrates PTO clutch 15 disposed in center casing 16. PTO clutch casing 22 is relatively rotatably provided on input shaft 11 and integrally rotatably fitted at its toothed rear end 22*d* to PTO clutch gear 39. A friction disk retainer 22*b* is fixed on input shaft 11 in clutch casing 22. Clutch piston 22*a* is axially slidably disposed in clutch casing 22 around input shaft 11. Primary friction disks slidably and integrally rotatably fitted to retainer 22*b* and secondary friction disks slidably and integrally rotatably fitted to clutch casing 22 are alternately aligned in front of clutch piston 22*a*. A spring is disposed in clutch casing 22 so as to bias clutch piston 22*a* rearward.

Horizontal PTO shaft 12 is journalled in the lateral middle portion of center casing 16 just below input shaft 11 and projects forward from center casing 16. PTO driving gear 23 is fixed on PTO shaft 12 in center casing 16 and meshes with PTO clutch gear 39 thereabove.

Input shaft 11 is formed therein with an oil duct for fluidal communication between charge pump 68 and the oil chamber in clutch casing 22 behind clutch piston 22a, similarly to oil duct 12b formed in PTO shaft 12 of transmission 20. Oil charged into the oil chamber in clutch casing 22 pushes clutch piston 22a forward against the spring so as to press the primary friction disks against the secondary oil disks, thereby engaging PTO clutch 15 for fixing input shaft 11 to clutch casing 22 and clutch gear 39, that is, drivingly coupling PTO shaft 12 to input shaft 11.

As shown in FIG. 10, the PTO clutch housing portion of front casing part 5 is expanded laterally on one of left and right sides of PTO clutch 15 so as to form a chamber in which PTO brake 21 is disposed. PTO brake 21 of transmission 120 comprises a thrust pin 21a disposed perpendicularly to input shaft 11 and biased toward PTO clutch casing 22 by springs. A soft pad 21b is provided on its tip with thrust pin 21a toward clutch casing 22. Thrust pin 21a is fixedly provided thereon with a brake piston 21c so as to be hydraulically biased against the spring by oil supplied into the chamber from charge pump 68. The same PTO brake 21 of a transmission 220 according to a third embodiment will be detailed in the later-description of transmission 220.

When input shaft 11 is rotated, charge pump 68 supplies oil to both the chamber in clutch casing 22 and the chamber of PTO brake 21 so as to engage PTO clutch 15 and hold thrust pin 21a apart from clutch casing 22. If input shaft 11 is stopped or almost stationary, oil is released from both of the chambers so that PTO clutch 15 is disengaged so as to separate clutch casing 22 from input shaft 11, and that thrust pin 21a is pressed against clutch casing 22 through pad 21b by the spring, thereby braking clutch casing 22 together with PTO shaft 12 against their inertial rotation.

The lateral middle portion of rear casing part 4 is forwardly recessed between the left and right HST housing portions thereof. Input shaft 11 projects rearward from the forwardly recessed lateral middle portion of rear casing part 4, as mentioned above, and oil filter is mounted rearward onto the outer rear surface of the lateral middle portion of rear casing part 4 below input shaft 11. Lube in transmission 120 is filtered by oil filter 43 and absorbed to charge pump 68 via oil suction pipe 46 extended from rear casing part 4.

Figure 14:
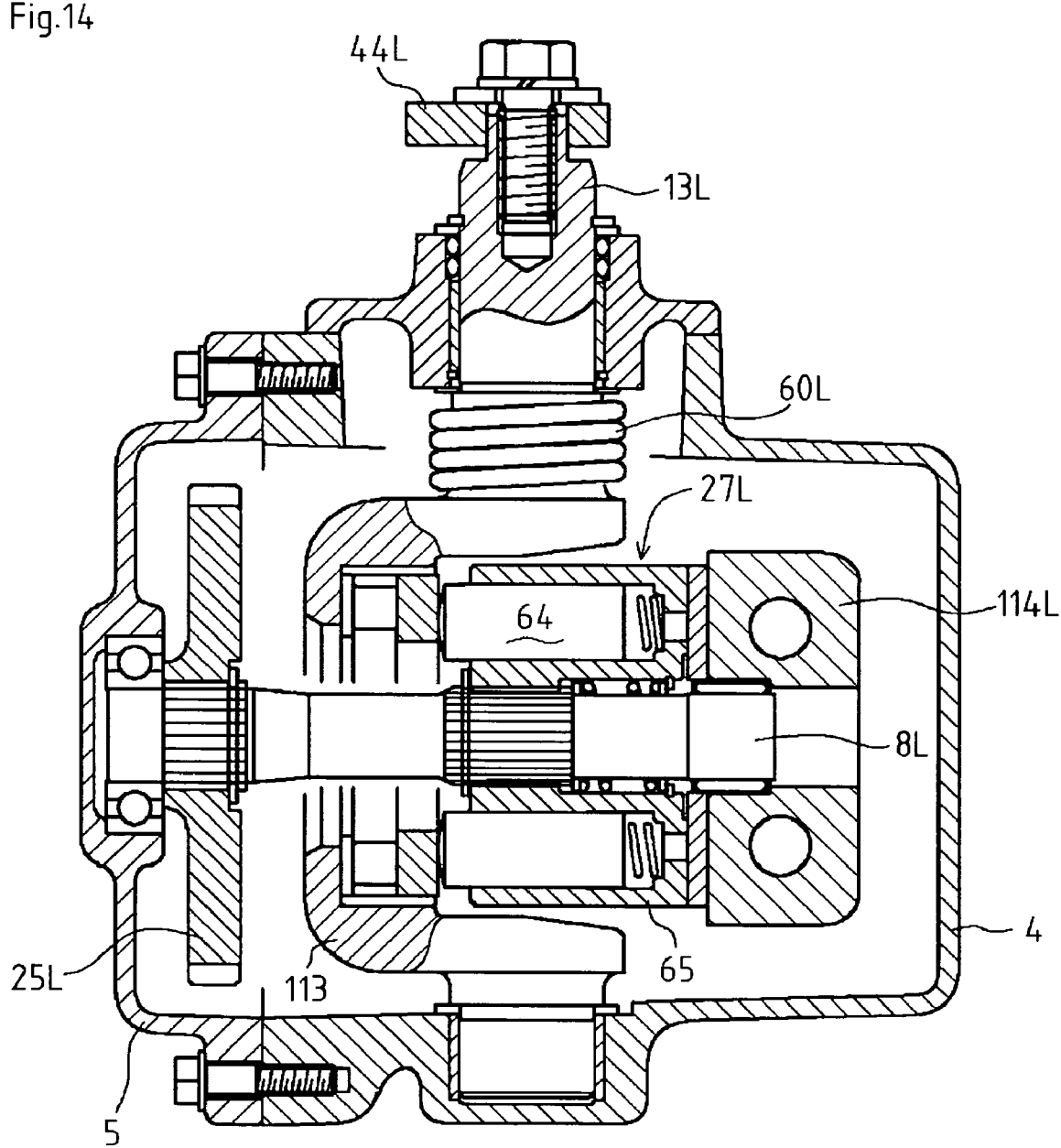
FIG. 14 is a cross-sectional view taken in D-D line of FIG. 10.

Description will be given of hydraulic pumps 27L and 27R with reference to FIGS. 10, 12 and 14. FIG. 14 illustrates left hydraulic pump 27L representing left and right symmetrical hydraulic pumps 27L and 27R. Above-mentioned pump gears 25L and 25R are fixed on respective axial pump shafts 8L and 8R of pumps 27L and 27R, which are extended in parallel in the fore-and-aft direction of transmission 120, and journalled at their front ends by front casing part 5 via bearings and at the rear ends by respective oil duct plates 114L and 114R. Each of hydraulic pumps 27L and 27R has a cylinder block 65 fixed on corresponding axial pump shaft 8L or 8R behind corresponding pump gear 25L or 25R and is slidably rotatably fitted via a valve plate onto the front surface of laterally extended portion of corresponding oil duct plate 114L or 114R. Movable swash plate 113 is freely disposed around each of motor shafts 8L and 8R between corresponding pump gear 25L or 25R and cylinder block 65. Pistons 64 are axially reciprocally fitted in each cylinder block 65 around each of pump shafts 8L and 8R and abut against swash plate 113.

Figure 12:
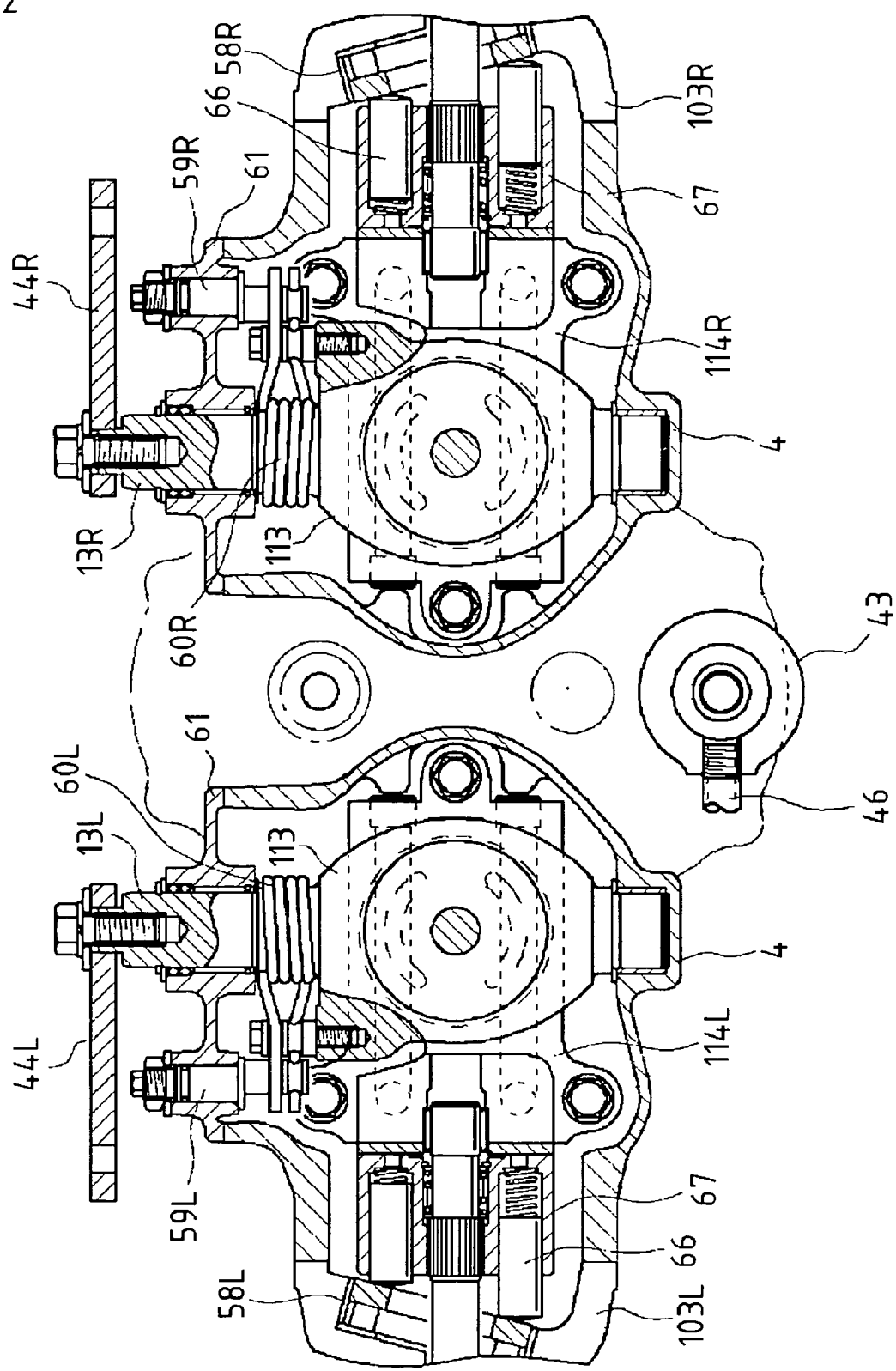
FIG. 12 is a cross-sectional view taken in B-B line of FIG. 10.

Referring to FIGS. 12 and 14, variable displacement hydraulic pumps 27L and 27R are provided with respective movable swash plates 113, which have respective vertical trunnion shafts 13L and 13R as their pivots. The left and right pump housing portions of center casing 16 have respective upward openings covered with respective lids 61. Trunnion shafts 13L and 13R project upward from center casing 16 through lids 61 so as to be fixedly provided thereon with respective speed control arms 44L and 44R. In center casing 16 just below lids 61, springs 60L and 60R are wound around respective trunnion shafts 13L and 13R so as to bias respective swash plates 113 toward the neutral positions. Bolts 59L and 59R for adjusting the neutral positions of swash plates 113 are also planted upward in lids 61, respectively. Alternatively, cradle type swash plates may be provided to hydraulic pumps 27L and 27R.

Figure 13:
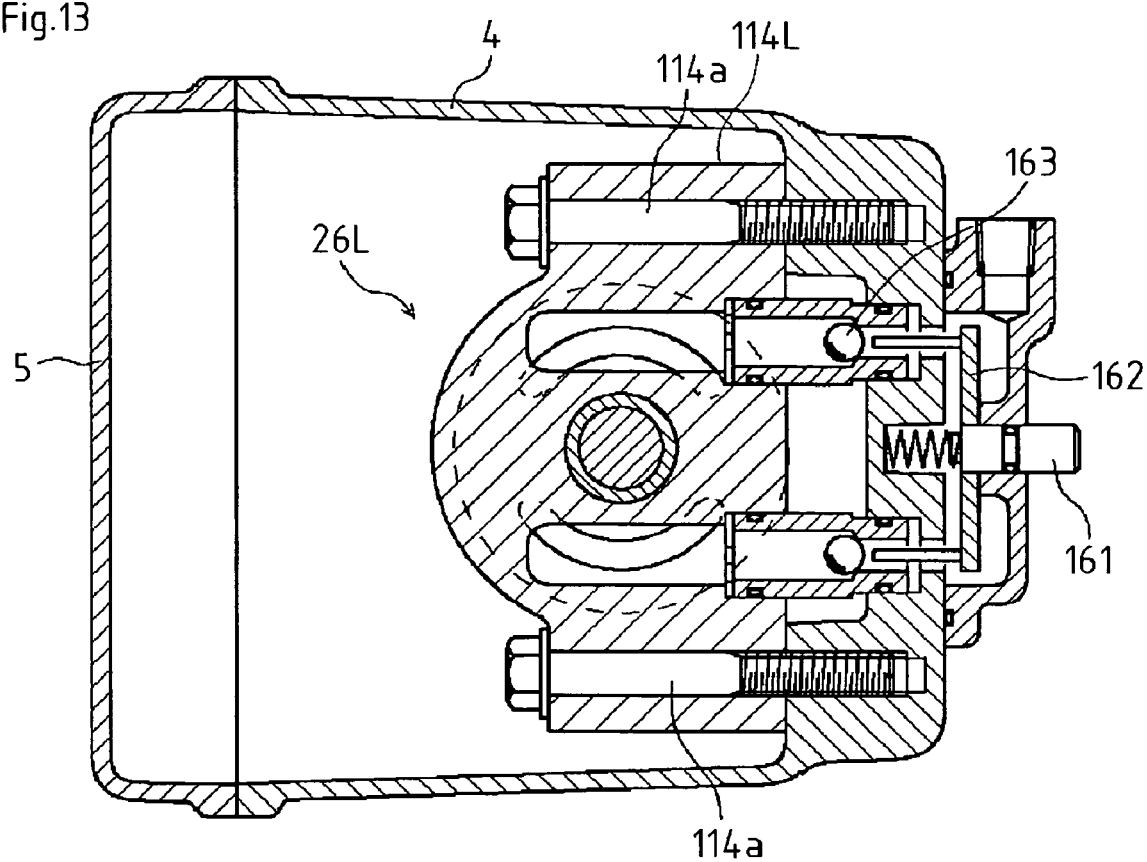
FIG. 13 is a cross-sectional view taken in C-C line of FIG. 10.

Description will be given of hydraulic motors 26L and 26R with reference to FIGS. 10, 12 and 13. FIG. 13 illustrates left hydraulic motor 26L representing left and right symmetrical hydraulic motors 26L and 26R. Axial motor shafts 9L and 9R of respective hydraulic motors 26L and 26R are extended oppositely laterally and are journalled at their proximal ends by respective oil duct plates 114L and 114R and at their distal portions by the left and right ends of motor casings 103L and 103R via bearings. Swash plates 58L and 58R of motors 26L and 26R are fixedly fitted in respective motor casings 103L and 103R and are freely disposed around respective motor shafts 9L and 9R. Cylinder blocks 67 of pumps 26L and 26R are disposed between oil duct plate 114L and swash plate 58L and between oil duct plate 114R and swash plate 58R, and are slidably rotatably fitted to the left and right distal end surfaces of respective oil duct plates 114L and 114R via valve plates. Pistons 66 are axially reciprocally fitted in each cylinder block 67 around each of motor shafts 9L and 9R and are abut against each of swash plates 58L and 58R.

As shown in FIG. 13, a pair of check valves 163 are fitted within rear walls of rear casing part 4 for respective oil ducts in each of oil duct plates 114L and 114R. Check valve 163 allows oil to be charged into the corresponding oil duct in oil duct plate 114L or 114R and prevents oil from leaking out from the oil duct. As shown in FIG. 10, charge oil pipes 72 are extended from charge pump 68 and are connected to respective oil port housings mounted on the rear end surfaces of rear casing part 4 so as to supply oil to HSTs 90L and 90R via check valves 163.

Each of motors 26L and 26R is provided with a bypass valve 162 for forcibly opening check valves 163 so as to drain oil from corresponding oil duct plate 114L or 114R (or to bypass the oil ducts between the corresponding hydraulic pump and motor). Bypass valve 162 is disposed in each of the above-mentioned oil port housings mounted onto the rear wall of rear casing part 4. Bypass valve 162 is provided with a pushpin 161 projecting rearwardly outward from the valve housing. If each of HST 90L and 90R is going to drain oil therefrom for hauling the vehicle or starting the engine, pushpin 161 is pushed forward against its biasing force so as to operate bypass valve 162 to open both check valves 163, thereby reducing the hydraulic resistance of HST 90L and 90R against rotation of each wheel 31L or 31R.

Figure 15:
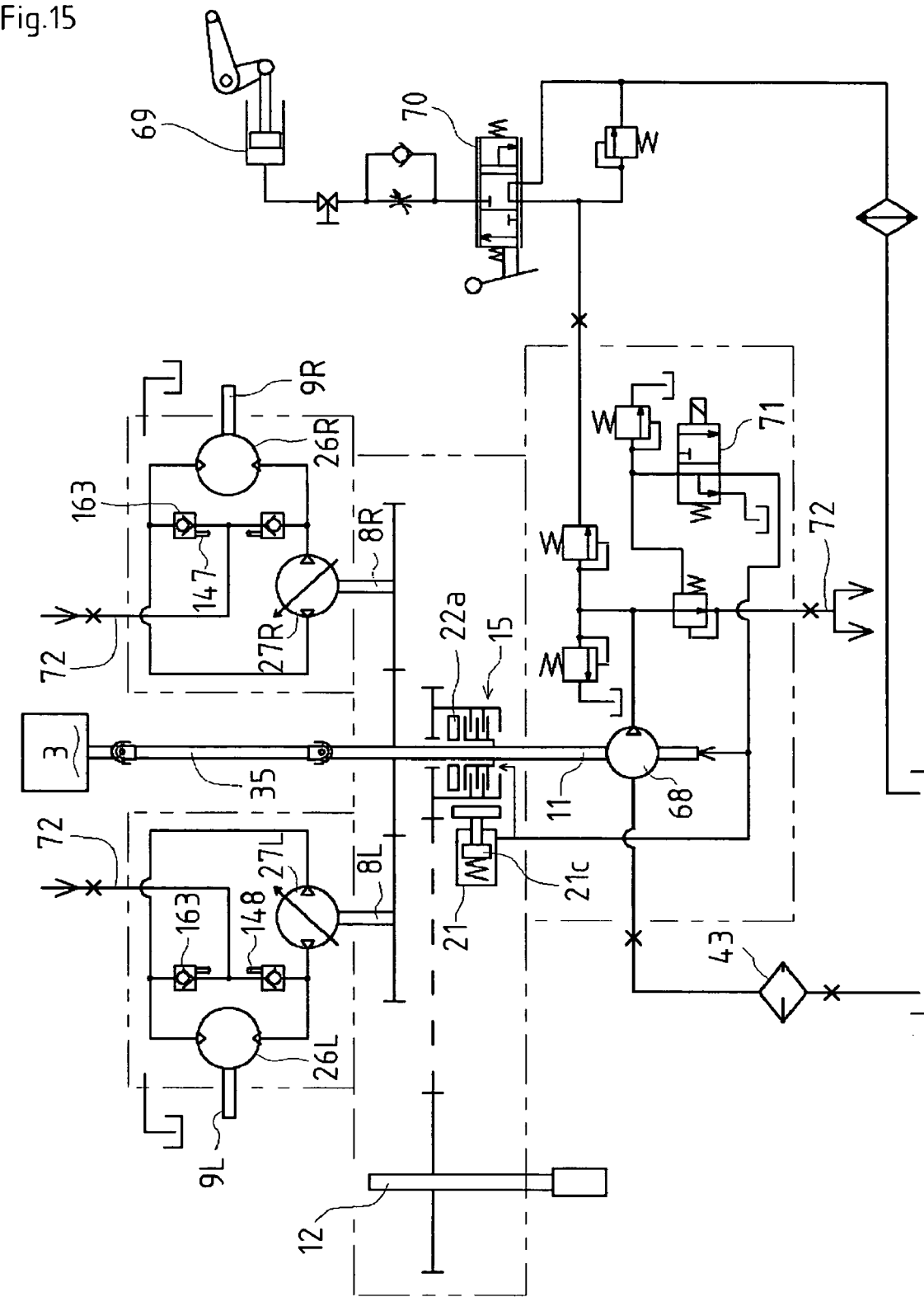
FIG. 15 is a hydraulic circuit diagram of the transmission according to the second embodiment.

Referring to the hydraulic circuit of transmission 120 shown in FIG. 15, the oil delivered from charge pump 68 is supplied to the axle driving system including HSTs 90L and 90R, and to the PTO driving system including PTO clutch 15 and PTO brake 21 via switching valve 71. Additionally, pressure oil from charge pump 68 is supplied to lift cylinder 69 for vertically moving mower unit 17 via directive control valve 70.

Figure 16:
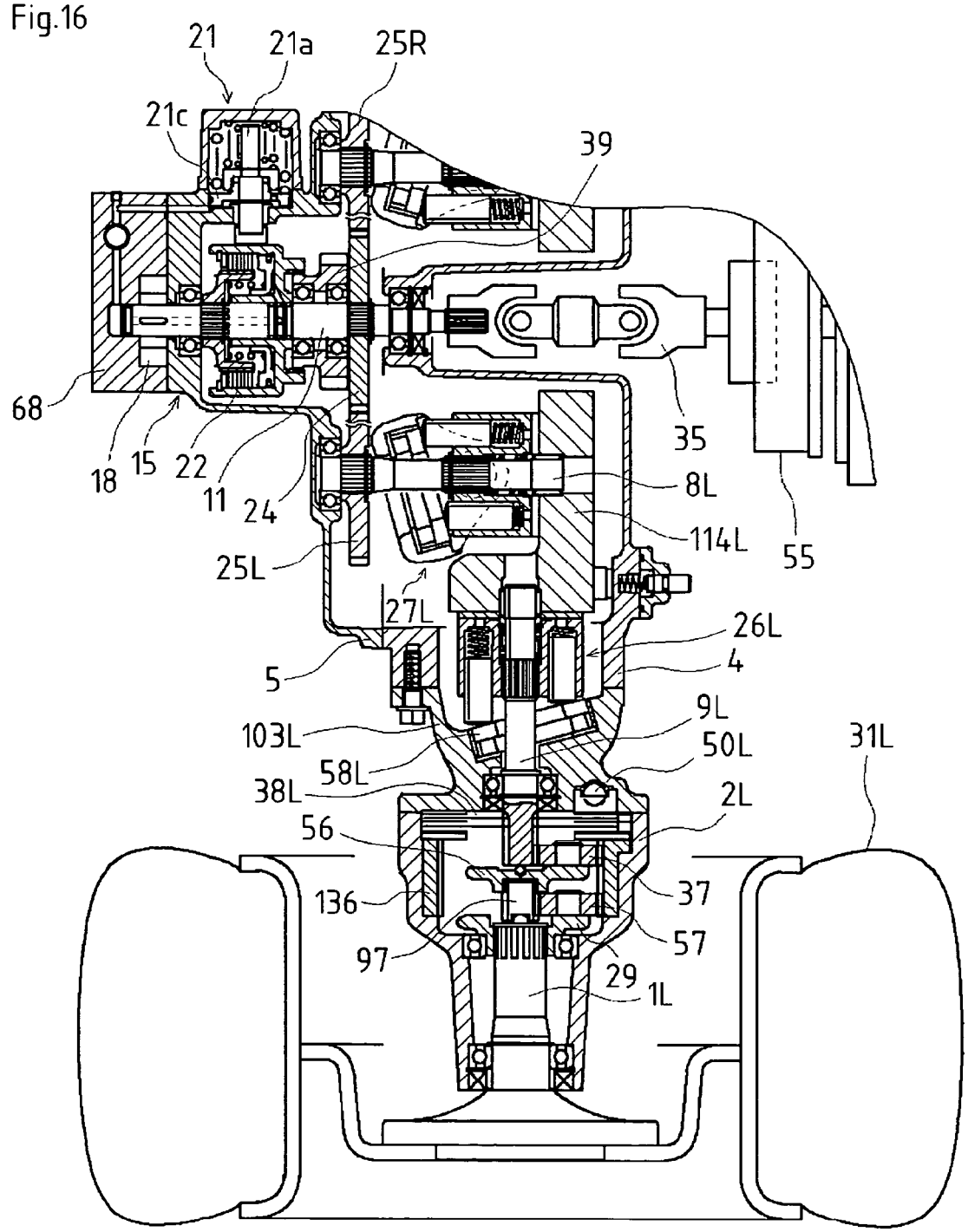
FIG. 16 is an enlarged plan view of a deceleration gear train of the transmission according to the second embodiment.

As shown in FIGS. 10 and 16, a deceleration planetary gear train is configured in each of deceleration gear casings 2L and 2R. Alternatively, a parallel gear train shown in FIG. 17 may be configured in each of deceleration gear casings 2L and 2R.

Referring to the deceleration planetary gear train shown in FIGS. 10 and 16, motor shafts 9L and 9R project outward from respective motor casings 103L and 103R into deceleration gear casings 2L and 2R journaling respective axles 1L and 1R disposed coaxially to motor shafts 9L and 9R. In deceleration gear casings 2L and 2R, motor shafts 9L and 9R are formed so as to serve as first sun gears. A second sun gear shaft 97 is coaxially fixed onto the proximal end of each of axles 1L and 1R. First planetary carriers 56 are disposed between axle 1L and motor shaft 9L and between axle 1R and motor shaft 9R and fixed onto the proximal ends of respective second sun gear shafts 97. A first planetary gear 37 is pivoted onto each of first planetary carrier 56 and meshes with the first sun gear formed on each of motor shafts 9L and 9R. A ring gear 136 is slidably rotatably fitted onto the inner peripheral surface of each of deceleration gear casings 2L and 2R and meshes with each of first planetary gears 37.

A second planetary carrier 29 is spline-fitted on the proximal end of each of axles 1L and 1R. Second planetary gears 57 are pivoted onto respective second planetary carriers 29 and mesh with the respective second sun gears formed on second sun gear shafts 97. Second planetary gears 57 also mesh with respective ring gears 136.

The planetary gear train is able to have a large deceleration ratio while each of deceleration gear casings 2L and 2R are small. Such small deceleration gear casings 2L and 2R can be disposed together with axles 1L and 1R within rims of wheels 3L and 3R, respectively. Therefore, drive wheels 31L and 31R can be prevented from expanding the distance therebetween while motor shafts 9L and 9R are laterally extended coaxially to axles 1L and 1R.

In each of deceleration gear casings 2L and 2R, a multi-disk brake is disposed between ring gear 136 and the distal end of each of motor casings 103L and 103R. Brake cams 50L and 5OR for operating the brakes are disposed in the distal end portions of motor casings 103L and 103R adjacent to the brake disks on respective motor shafts 9L and 9R in deceleration gear casings 2L and 2R, respectively.

Figure 17:
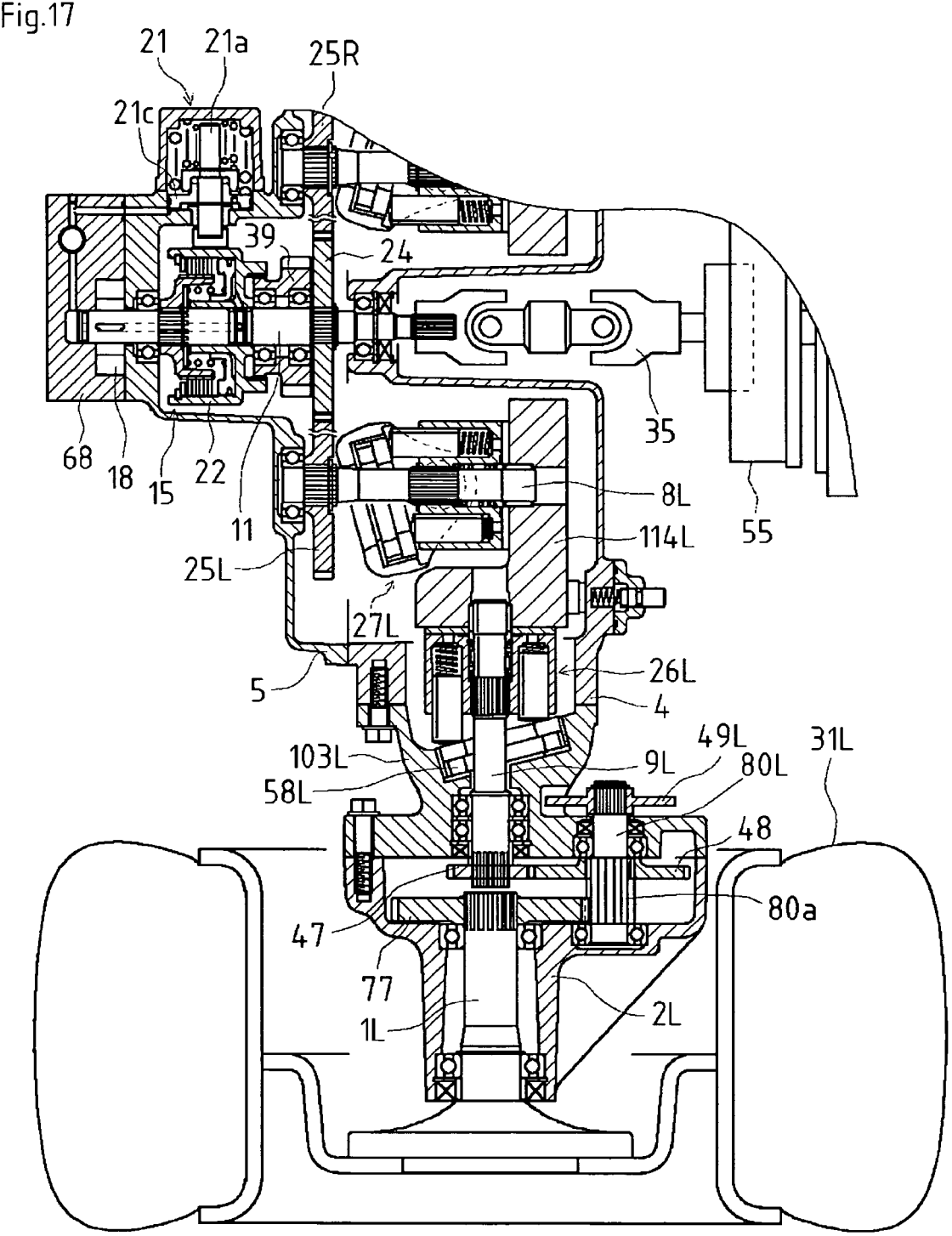
FIG. 17 is an enlarged plan view of a reshaped deceleration gear train of the transmission according to the second embodiment.

FIG. 17 illustrates transmission 120 having other deceleration gear trains in deceleration gear casings 2L and 2R (FIG. 17 actually illustrates the gear train in left deceleration gear casing 2L, which represents left and right symmetric deceleration gear trains in casings 2L and 2R). In fact, in each of deceleration gear casings 2L and 2R, a small first gear 47 spline-fitted on each of motor shafts 9L and 9R, and each of deceleration shafts 80L and 80R, is journalled in parallel to corresponding motor shaft 9L or 9R and is formed on its peripheral surface with a small third gear 80a. Deceleration shafts 80L and 80R behind respective motor shafts 9L and 9R may alternatively be disposed above or below motor shafts 9L and 9R. A large second gear 48 is fixedly fitted on a portion of third gear 80a and meshes with first gear 47. A portion of each third gear 80a out of second gear 48 meshes with a large fourth gear 77 spline-fitted on each of axles 1L and 1R disposed coaxially to corresponding motor shaft 9L or 9R. Deceleration shafts 80L and 80R project proximally inward from deceleration gear casings 2L and 2R and are fixedly provided thereon with respective brake disks 49L and 49R.

The deceleration gear casings 2L and 2R shown in FIG. 17 are also so compact as to be disposed in the respective rims of drive wheels 31L and 31R while they have deceleration shafts 80L and 80R in parallel to motor shafts 9L and 9R and axles 1L and 1R.

Transmission 120 can be arranged to suit a vertical crankshaft engine. In this case, transmission 120 is so arranged that input shaft 11 is disposed vertically to be drivingly coupled to the vertical crankshaft via pulleys and a belt or so on. Transmission 20 may be also disposed in this way to suit a vertical crankshaft engine. However, in comparison with transmission 20 having motor shafts 9L and 9R perpendicular to axles 1L and 1R, transmission 120 having motor shafts 9L and 9R coaxial to axles 1L and 1R is advantageous in that the position of motor shafts 9L and 9R relative to axles 1L and 1R is constant whether it is set for a horizontal crankshaft engine or a vertical crankshaft engine. More specifically, if transmission 120 must suit a vertical crankshaft engine, its front end (the front end of PTO shaft 12) and rear end (the rear end of input shaft 11) arranged for horizontal crankshaft engine 3 must be located to top and bottom ends, however, while transmission 120 is rotated around motor shafts 9L and 9R and axles 1L and 1R, deceleration gear casings 2L and 2R are rotated in the rims of drive wheels 31L and 31R, whereby the newly bottom end does not hit the ground.

Figure 18:
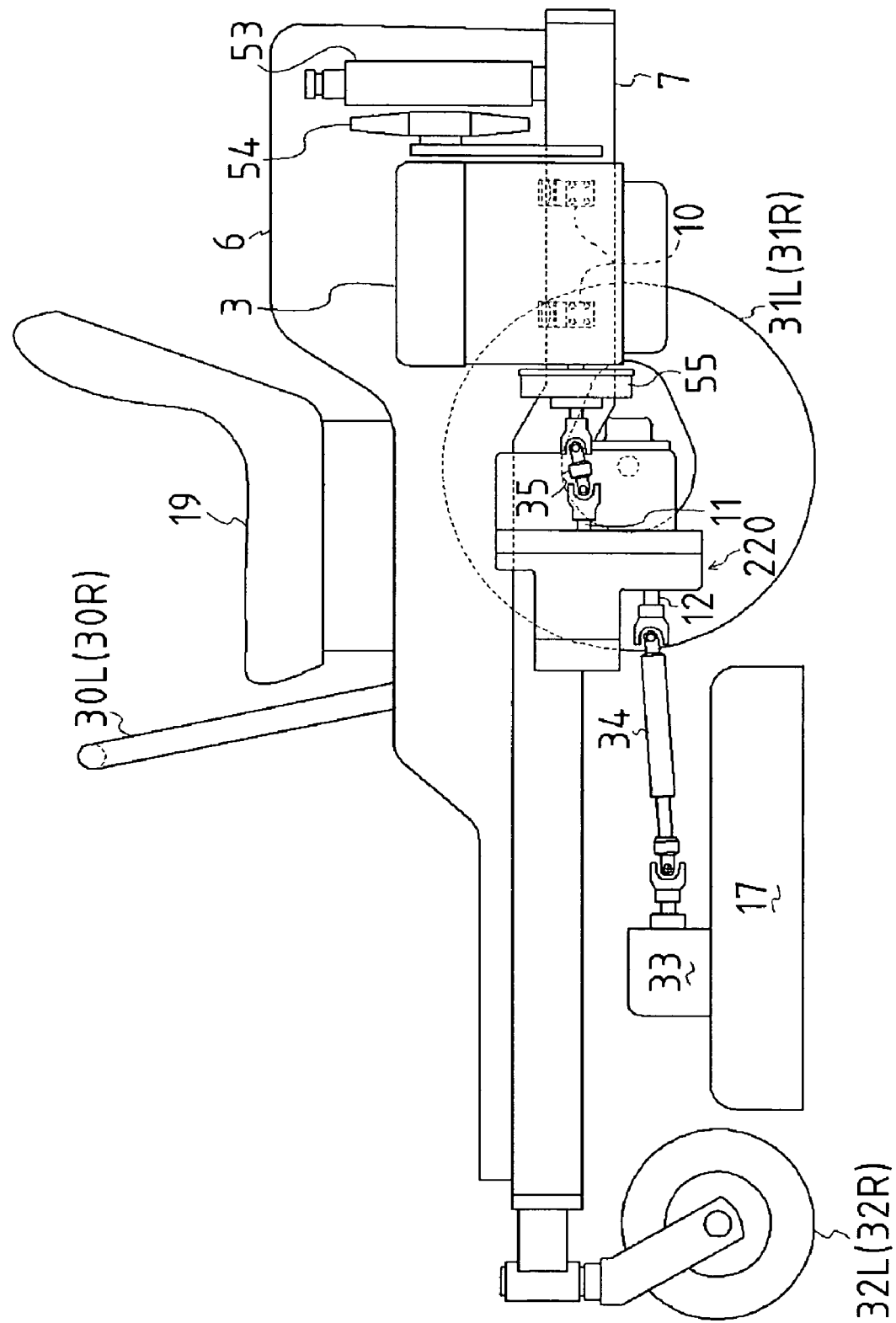
FIG. 18 is a side view of a riding lawn mower equipped with a transmission according to a third embodiment of the present invention.

FIG. 18 illustrates a riding lawn mower equipped with a transmission 220 according to a third embodiment. The riding lawn mower is the same as that of FIG. 1 except for transmission 220. A configuration of transmission 220 will now be described with reference to FIGS. 18 to 25.

Figure 19:
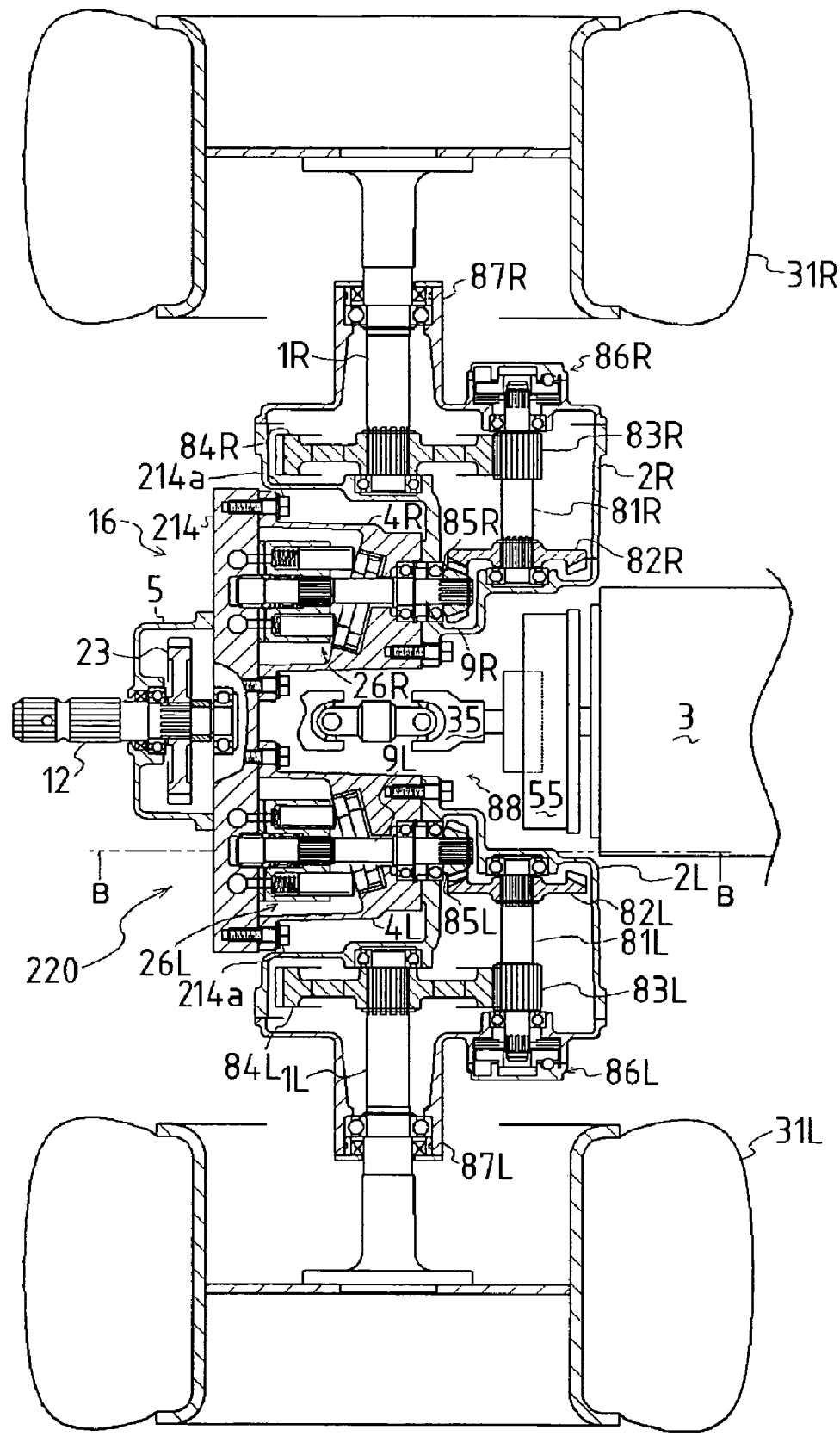
FIG. 19 is a sectional plan view of the transmission according to the third embodiment.
Figure 20:
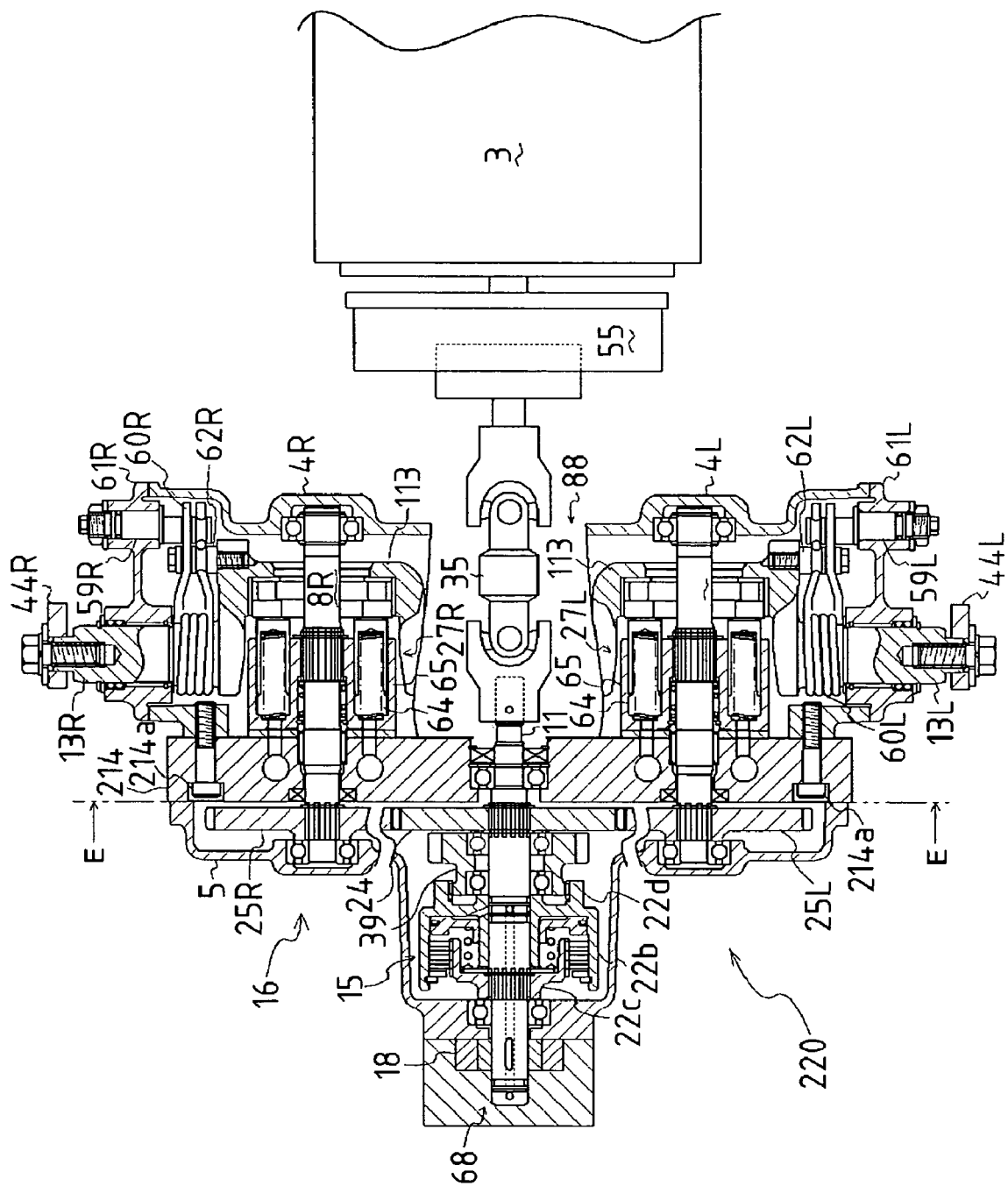
FIG. 20 is a cross-sectional view taken in C-C line of FIG. 22.
Figure 21:
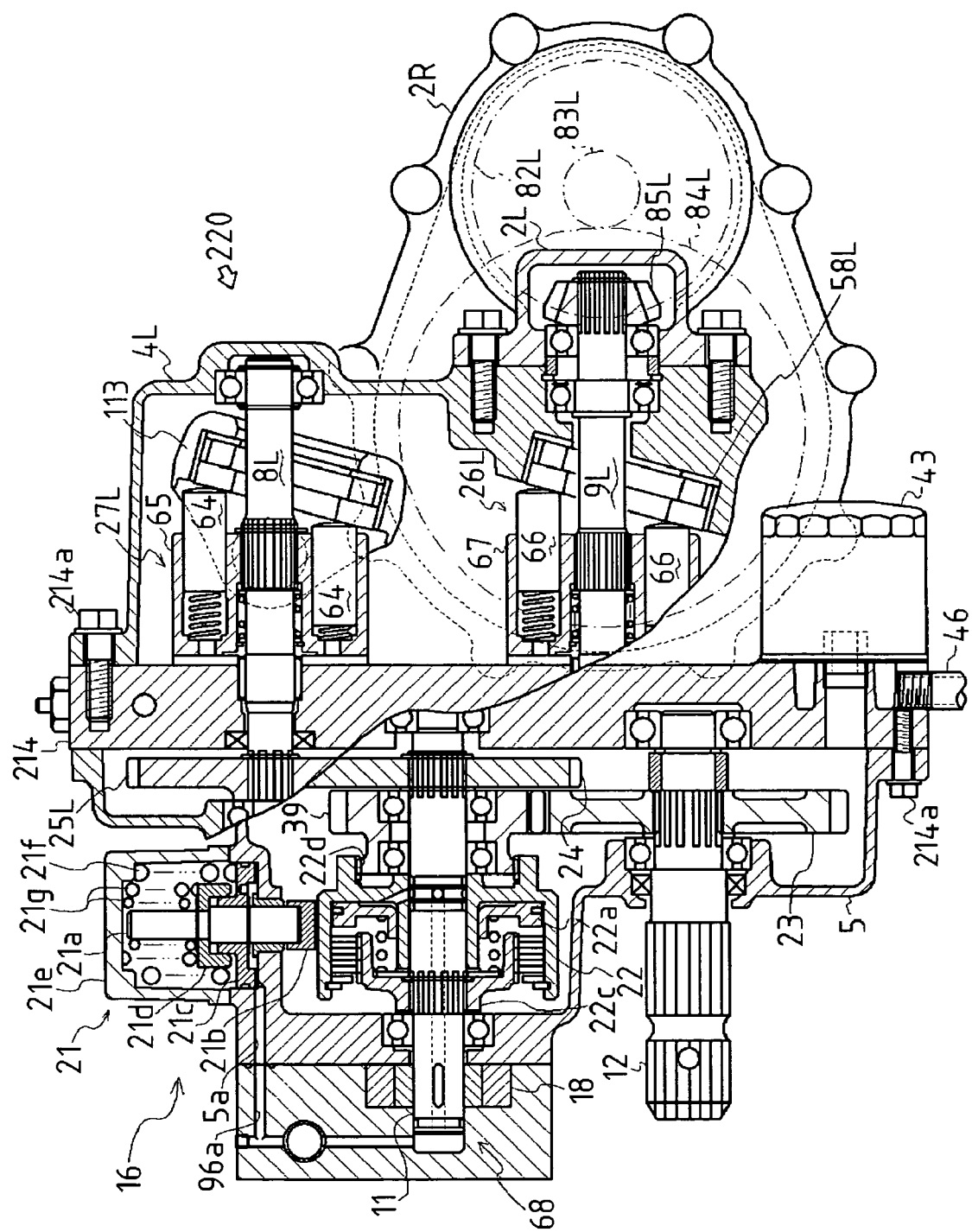
FIG. 21 is a cross-sectional view taken in B-B line of FIG. 19.

As shown in FIGS. 19 to 21, transmission 120 of the present embodiment is provided with center casing 16 constituting front casing part 5, left and right rear HST casing parts 4L and 4R, and an oil duct plate 214 sandwiched between front casing part 5 and the pair of HST casing parts 4L and 4R, which are joined to one another through respective vertical joint surfaces. Deceleration gear casings 2L and 2R are joined at their laterally proximal front surfaces to respective rear end surfaces of rear HST casing parts 4L and 4R and extend laterally outward from center casing 16 to respective drive wheels 31L and 31R. Charge pump 68 involving charge pump gear 18 is mounted forward onto the lateral middle front end of front casing part 5, as shown in FIG. 20.

Figure 22:
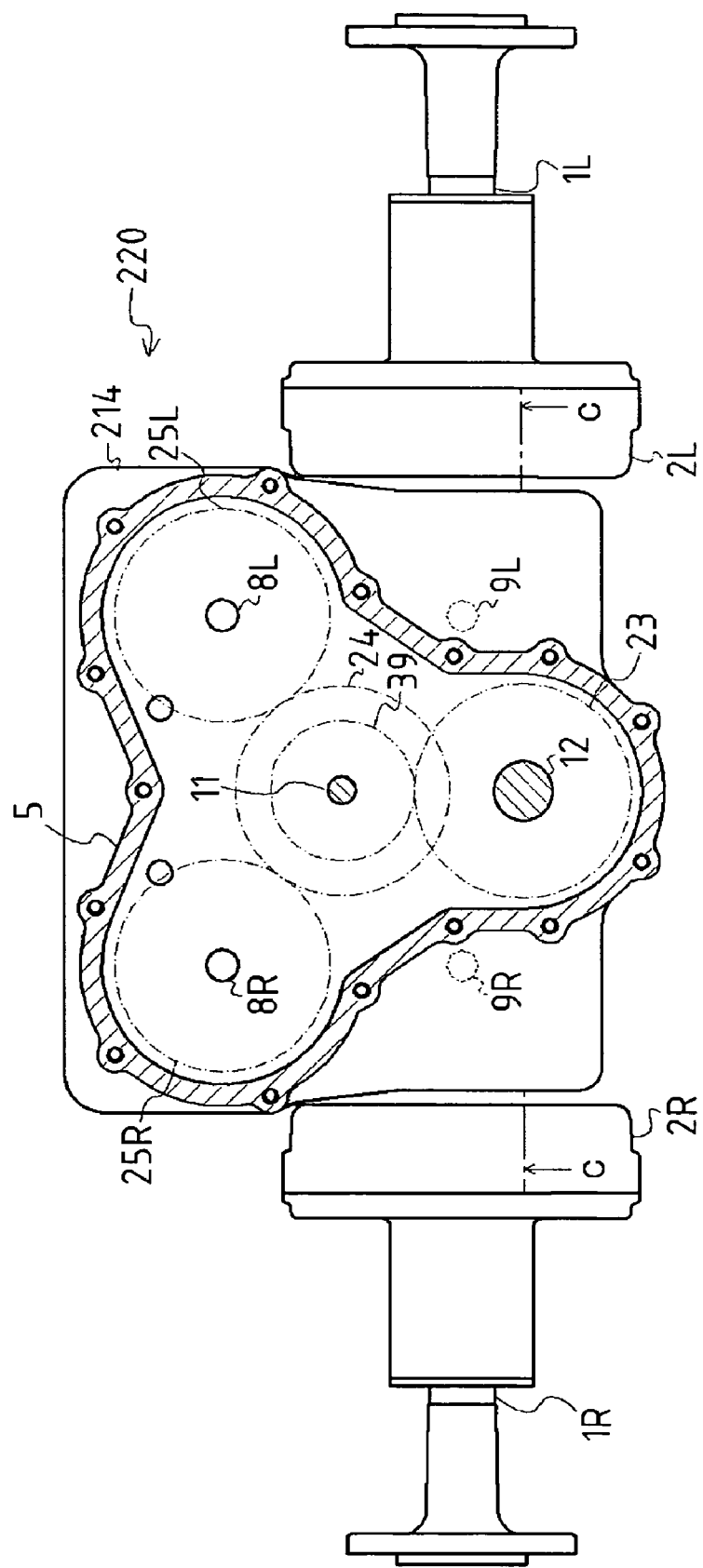
FIG. 22 is a front view of the transmission according to the third embodiment.

As shown in FIG. 22, when viewed in front, front casing part 5, which is substantially regular triangular, supports horizontal input shaft 11 in the fore-and-aft direction of transmission 220 at its center position. Distributing gear 24 fixed on input shaft 11 along the front surface of oil duct plate 214. PTO clutch gear 39 is relatively rotatably provided via bearings on input shaft 11 just before gear 24. PTO clutch 15 is provided around input shaft 11 between the front end wall of gear casing part 5 and gear 39. As shown in FIG. 20 and 21, oil duct plate 214 is penetrated at its center position by a horizontal hole, in which a rear portion of input shaft 11 is journalled at via a bearing pump. Input shaft 11 projects rearward from oil duct plate 214 between HST casing parts 4L and 4R so as to be drivingly connected to the forwardly projecting horizontal output shaft of engine 3 (provided thereon with flywheel 55) via universal joint coupling 35. Input shaft 11 is rotatably inserted into the housing of charge pump 68 so as to serve as the driving shaft of charge pump gear 18.

Left and right pump shafts 8L and 8R of respective HSTs 90L and 90R are rotatably supported at their front portions by oil duct plate 214, and journalled at their rear ends by the rear end walls of HST casing parts 4L and 4R, respectively. Pump shafts 8L and 8R project forward from oil duct plate 214 into front casing part 5 so as to be fixedly provided thereon with respective pump gears 25L and 25R meshing with distributing gear 24 therebetween.

PTO shaft 12 is disposed just below input shaft 11 in front casing part 5 and drivingly coupled to input shaft 11 via PTO clutch 15. PTO shaft 12 is journalled at its rear end by oil duct plate 214 via a bearing and is journalled at its intermediate portion by a front wall of gear casing part 5. In gear casing part 5, PTO driving gear 23 is fixed on PTO shaft 12 and meshes with PTO clutch gear 39 thereabove. PTO shaft 12 projects forward from gear casing part 5 so as to be drivingly coupled to gearbox 33 of mower unit 17 via universal joint coupling 34, as shown in FIG. 18. Consequently, when viewed in front, pump shafts 8L and 8R and input shaft 12 are arranged in a vertically reversed triangle having a central axis serving as input shaft 11, as shown in FIG. 22. Such arrangement of the shafts minimizes transmission 220 while locating PTO shaft 12 at a low position suitable for efficiently drivingly coupling to mower unit 17 via universal joint coupling 34.

Oil duct plate 214 is laterally vertically extended and fastened to front casing part 5 and left and right HST casing parts 4L and 4R via bolts 214a, as shown in FIG. 21. As show in FIG. 23, oil duct plate 214 is formed therein with vertical parallel oil ducts 14Lc, 14Ld, 14Rc and 14Rd, and in its upper portion with a horizontal oil duct 214b intersecting all vertical oil dusts 14Lc, 14Ld, 14Rc and 14Rd. Horizontal oil duct 214b is open outward at one left or right side end of oil duct plate 214.

Figure 24:
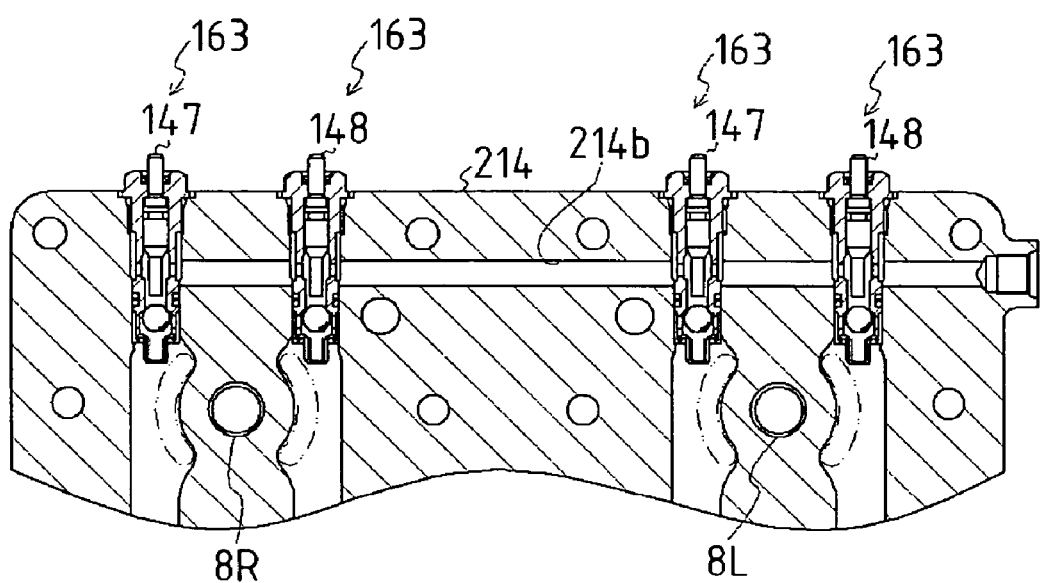
FIG. 24 is a cross-sectional view taken in E-E line of FIG. 20.

As shown in FIG. 24, oil duct plate 214 is square when viewed in front. Oil duct plate 214 has left and right rear pump mounting surfaces, onto which respective cylinder blocks 65 of hydraulic pumps 27L and 27R are slidably rotatably mounted. Oil duct plate 214 also has left and right rear motor mounting surfaces just below respective pump mounting surfaces, onto which respective cylinder blocks 67 of hydraulic motors 26L and 26R are slidably rotatably mounted. A pair of kidney ports are open at each of the left and right pump mounting surfaces and motor mounting surfaces. Left hydraulic pump 27L and motor 26L mounted rearward on the left area of oil duct plate 214 are fluidly connected to each other via vertical oil ducts 14Lc and 14Ld so as to constitute left HST 90L and are disposed in left HST casing part 4L. Right hydraulic pump 27R and motor 26R mounted rearward on the right area of oil duct plate 214 are fluidly connected to each other via vertical oil ducts 14Rc and 14Rd so as to constitute right HST 90R and are disposed in right HST casing part 4R. Each of left and right HST casing parts 4L and 4R can be easily removed from oil duct plate 214 by loosing bolts 214a so as to expose corresponding hydraulic pump and motor 27L and 26L or 27R and 26R, thereby facilitating for maintenance of each of HSTs 90L and 90R.

Also, front casing part 5 can be easily removed from oil duct plate 214 by loosing bolts 214a so as to expose PTO clutch 15 and the distributing gear train between input shaft 11 and pump shafts 8L and 8R and PTO shaft 12, thereby facilitating their maintenance. Further, charge pump 68 can be easily removed from the front end of front casing part 5 so as to facilitate its maintenance.

Figure 23:
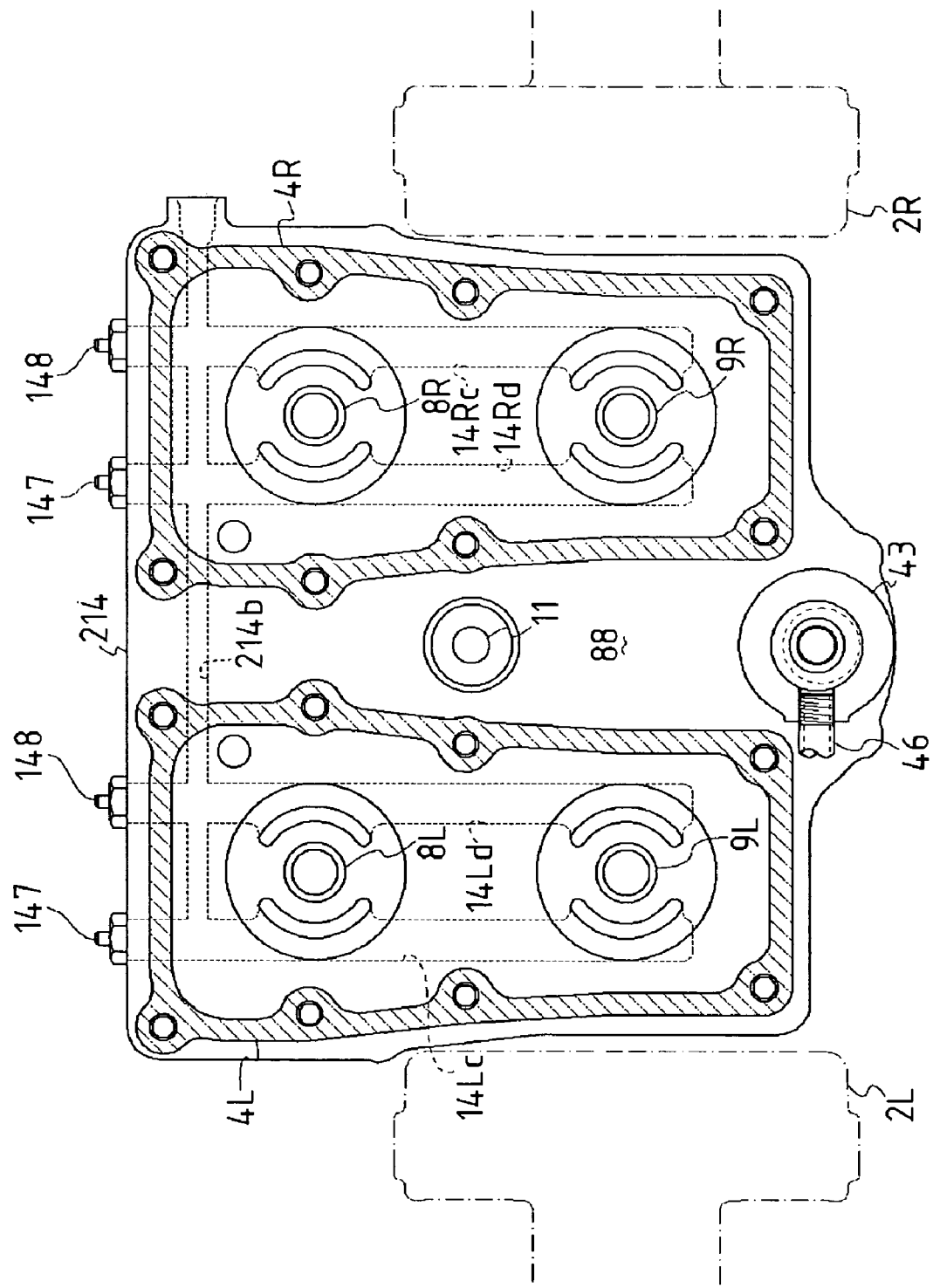
FIG. 23 is a rear view of the transmission according to the third embodiment.

A vertically elongated and forwardly recessed space 88 is provided between left and right rear HST casing parts 4L and 4R in rear of oil duct plate 214, as shown in FIGS. 19 and 23. Universal joint coupling 35 is disposed in a vertically intermediate area of space 88, and oil filter 43 is disposed the bottom area of space 88 (between the bottom ends of casing parts 4L and 4R). Such a dead space between HSTs 90L and 90R is utilized for arranging universal joint coupling 35, so that transmission 220 and drive wheels 31L and 31R can desirably approach engine 3, i.e., the center of gravity of the vehicle, and that the front portion (front casing part 5) in front of oil duct plate 214 can be reduced in the fore-and-aft direction so as to expand the space for arranging and vertically moving mower unit 17. Further, in each of HSTs 90L and 90R, its hydraulic pump and motor are vertically aligned so as to reduce the lateral width of transmission 220.

Suction oil pipe 46 is extended from oil filter 43 on the rear end of center casing 16 (oil duct plate 214) to charge pump 68 on the front end of center casing 16 (front casing part 5). Only one pipe is extended from charge pump 68 to an outward opening of oil dust 214b in oil duct plate 214 so as to supply all vertical oil ducts 14Lc, 14Ld, 14Rc and 14Rd, as shown in FIGS. 23 and 24. Due to such common oil duct plate 214 and the oil duct structure therein, transmission 220 reduces its parts count and is simplified in its hydraulic circuit. Incidentally, pressure-reducing valve 73 is interposed between oil duct 214b and charge pump 68, as show in FIG. 25.

As shown in FIG. 24, vertical oil ducts 14Lc, 14Ld, 14Rc and 14Rd are provided at their portions below their junctions to horizontal oil duct 214b with check valves 163, respectively. Each check valve 163 allows oil from horizontal oil duct 214b to be charged into corresponding vertical oil duct 14Lc, 14Ld, 14Rc or 14Rd.

Pushpins 147 are provided in the respective top portions of vertical oil ducts 14Lc and 14Rc, and pushpins 148 in the respective top portions of vertical oil ducts 14Ld and 14Rd. Pushpins 147 and 148 project upward from oil duct plate 214 so as to be pushed down for forcibly opening respective check valves 163, so that horizontal oil duct 214b serves as a short-cut between oil ducts 14Lc and 14Ld bypassing hydraulic pump 27L and between oil ducts 14Rc and 14Rd bypassing hydraulic pump 27R, thereby allowing hydraulic motors 26L and 26R, i.e., wheels 31L and 31R to rotate freely from hydraulic pumps 27L and 27R.

PTO clutch 15 and PTO brake 21 will be detained with reference to FIG. 11. PTO clutch 15 comprises clutch casing 22, which is relatively rotatably provided on input shaft 11 and integrally provided with toothed rear end 22d integrally rotatably engaging with the toothed front end of PTO clutch gear 39. PTO clutch gear 39 is relatively rotatably provided on input shaft 11 and meshes with gear 23 fixed on PTO shaft 12 so as to drivingly couple clutch casing 22 to PTO shaft 12. Secondary friction disks are slidably and not-relatively rotatably fitted onto the inner periphery of clutch casing 22. PTO clutch 15 further comprises friction disk retainer 22c, which is (integrally rotatably) spline-fitted on input shaft 11 and slidably and not-relatively rotatably provided thereon with primary friction disks. The primary friction disks and the secondary friction disks are alternately aligned between clutch casing 22 and retainer 22c. Clutch piston 22a is axially slidably disposed around input shaft 11 in clutch casing 22 behind retainer 22c and is biased rearward by a spring disposed between clutch piston 22a and the front end of retainer 22c. Input shaft 11 is formed therein with an oil duct communicating with charge pump 68, which is open to the chamber between clutch piston 22a and the rear end of clutch casing 22.

PTO brake 21 comprises a vertically cylindrical brake casing 21e disposed above PTO clutch 15. Brake casing 21e is mounted upright on the PTO clutch housing portion of front casing part 5, however, its top end is lower than the tops of front casing part 5 and oil duct plate 214 so as to hinder other parts. In brake casing 21e, thrust pin 21a is disposed perpendicular to input shaft 11 (vertically) and extends from brake casing 21e into front casing part 5 toward the peripheral surface of clutch casing 22 therebelow. In brake casing 21e, thrust pin 21a is fixedly provided thereon with brake piston 21c and a pressure member 21d diametrically smaller than brake piston 21c. A spring 21f is disposed between the ceiling of brake casing 21e and brake piston 21c, and springs 21g are disposed between the ceiling of brake casing 21e and pressure member 21d, thereby biasing brake piston 21c and pressure member 21d and thrust pin 21a downward toward clutch casing 22. Pad 21b is provided on the bottom end of pushpin 21a toward clutch casing 22.

In brake casing 21e, an oil chamber is disposed between brake piston 21c and the wall of front casing part 5 therebelow so as to be supplied with oil from charge pump 68 via an oil duct 96a formed in the housing of charge pump 68 and an oil duct 5a formed in the wall of front casing part 5 continuously from oil duct 96a. Oil duct 96a is extended from PTO clutch switching valve 71 (shown in FIG. 25) disposed in the housing of charge pump 68.

When engine 3 drives input shaft 22, charge pump 68 is driven to supply oil into the chamber between clutch piston 22a and clutch casing 22 so as to move clutch piston 22a forward against the spring and press the friction disks against one another, thereby engaging PTO clutch 15 for fixing PTO clutch 12 to input shaft 11. Simultaneously, oil from charge pump 68 is supplied into the oil chamber between brake piston 21c and front casing part 5 so as to hydraulically pushed brake piston 21c upward against spring 21f, thereby separating pad 21b on thrust pin 21a from clutch casing 22 and allowing clutch casing 22 to rotate integrally with input shaft 11.

When engine 3 is stopped, charge pump 68 is not driven. At this time, oil is released from the oil chamber between clutch casing 22 and clutch piston 22a, so that clutch piston 22a biased by the spring is separated from the friction disks and the friction disks are separated from one another, thereby disengaging PTO clutch 15 for separating PTO shaft 12 from input shaft 11. Simultaneously, oil is released from the oil chamber between brake piston 21c and front casing part 5, whereby brake pistons 21c and pressure member 21d are pushed down by biasing force of springs 21f and 21g so as to press thrust pin 21a with pad 21b against clutch casing 22, thereby braking clutch casing 22 and preventing inertial rotation of PTO shaft 12, i.e., inertial rotation of the rotary blade in mower unit 17.

HSTs 90L and 90R will be further described. Referring to hydraulic pumps 27L and 27R, pump shafts 8L and 8R with pump gears 25L and 25R are arranged as mentioned above. Cylinder blocks 65 are fixed on respective axial pump shafts 8L and 8R, and pistons 64 are axially reciprocally fitted in cylinder block 65 around each of pump shafts 8L and 8R and abut at their rear ends against each of movable swash plates 113 freely disposed around each of pump shafts 8L and 8R between corresponding cylinder block 65 and the rear wall of corresponding HST casing part 4L or 4R. Movable swash plates 113 are provided with laterally horizontal trunnion shafts 13L and 13R, respectively. Each of trunnion shafts 13L and 13R consists of left and right (laterally proximal and distal) coaxial portions, which have swash plate 113 therebetween and are supported by respective left and right side walls of each of rear HST casing parts 4L and 4R. Each of rear HST casing parts 4L and 4R is open at its laterally distal side and covered with each of lids 61L and 61R, and the laterally distal portion of each of trunnion shafts 13L and 13R (the left portion of trunnion shafts 13L of left hydraulic pump 27L, and the right portion of trunnion shafts 13R of right hydraulic pump 27R) projects laterally distally from each of lids 61L and 61R to be fixedly provided thereon with respective speed control arms 44L and 44R, as show in FIG. 20.

Each of springs 60L and 60R for returning swash plate 113 to the neutral position is extends around respective trunnion shafts 13L and 13R, twisted at its both ends so as to cross each other, and extends rearward so as to have corresponding eccentric bolt 59L or 59R and pin 62L or 62R. Eccentric bolts 59L and 59R are screwed for adjusting the neutral positions of swash plates 113, respectively. Pins 62L and 62R are extended from respective swash plates 113. Each of pins 62L and 62R is rotated together with swash plate 113 by rotating corresponding speed control arm 44L or 44R and trunnion shaft 13L or 13R so as to push one end of corresponding spring 60L or 60R, thereby biasing swash plate 113 to the neutral position.

Referring to hydraulic motors 26L and 26R, motor shafts 9L and 9R are extended in the fore-and-aft direction of the vehicle and are journalled at their front ends by oil duct plate 214 and at their rear ends by the respective rear walls of HST casing parts 4L and 4R. Cylinder blocks 67 are fixed on respective axial motor shafts 9L and 9R, and pistons 66 are axially reciprocally fitted in cylinder block 67 around each of motor shafts 9L and 9R and abut at their rear ends against each of fixed swash plates 58L and 58R freely disposed around each of motor shafts 9L and 9R between corresponding cylinder block 67 and the rear wall of corresponding HST casing part 4L or 4R. Swash plates 113 are fixedly fitted onto the forwardly expanded rear walls of HST casing parts 4L and 4T, respectively.

Motor shafts 9L and 9R project rearward from respective HST casing parts 4L and 4R into respective deceleration gear casings 2L and 2R fixed to the rear ends of respective HST casing parts 4L and 4R, and they are fixedly provided thereon with respective bevel gears 85L and 85R in respective deceleration gear casings 2L and 2R.

Deceleration gear trains in deceleration gear casings 2L and 2R will be described with reference to FIGS. 19, 21 and others. As mentioned above, the laterally proximal front surface of each of deceleration gear casings 2L and 2R is fixed to the rear surface of corresponding rear casing part 4L or 4R. When viewed in plan, deceleration gear casings 2L and 2R are laterally symmetrically L-like shaped so that they are laterally extended behind center casing 16 (HST casing parts 4L and 4R) and extended in the fore-and-aft direction on left and right outward sides of center casing 16 along the laterally outward side surfaces of rear HST casing parts 4L and 4R, thereby narrowing the distance therebetween and reducing their length in the fore-and-aft direction.

The rear ends of motor shafts 9L and 9R project from respective rear HST casing parts 4L and 4R into respective deceleration casing parts 2L and 2R to be fixedly provided thereon with respective bevel gears 85L and 85R. Behind respective rear HST casing parts 4L and 4R, counter shafts 81L and 81R extend laterally perpendicular to motor shafts 9L and 9R, and are journalled at their laterally proximal ends in respective deceleration gear casings 2L and 2R. Bevel gears 82L and 82R diametrically larger than bevel gears 85L and 85R are fixed on the laterally proximal ends of respective counter shafts 81L and 81R and mesh with respective bevel gears 85L and 85R. Brakes 86L and 86R are provided on the laterally distal ends of respective counter shafts 81L and 81R. Diametrically small pinions 83L and 83R are fixedly provided on the laterally distal portions of respective counter shafts 81L and 81R.

On the left and right outward sides of center casing 16 (respective rear HST casing parts 4L and 4R), axles 1L and 1R are extend laterally parallel to counter shafts 81L and 81R and are journalled at their laterally proximal ends in respective deceleration gear casings 2L and 2R. Deceleration gear casings 2L and 2R are open laterally outward and covered with respective axle casings 87L and 87R fastened to deceleration gear casings 2L and 2R. Axle casings 87L and 87R journal intermediate portions of respective axles 1L and 1R and laterally distal ends of respective counter shafts 81L and 81R. Brakes 86L and 86R are provided on the laterally distal ends of respective counter shafts 81L and 81R in respective axle casings 87L and 87R. Spur gears 84L and 84R diametrically larger than pinions 83L and 83R are fixed on respective axles 1L and 1R in respective deceleration gear casings 2L and 2R to mesh with respective pinions 83L and 83R.

Space 88 is ensured between the rear portions of deceleration gear casings 2L and 2R behind respective rear HST casing parts 4L and 4R so as to incorporate universal coupling 35, flywheel 55 and the front end portion of engine 3. The portions of deceleration casings 2L and 2R facing space 88 are stepped along bevel gears 85L and 82L and bevel gears 85R and 82R so as to widen space 88 suitably for flywheel 55. Therefore, engine 3 can be shifted forward close to transmission 220 so to reduce the length of combination of transmission 220 and engine 3, and to improve the balance of the vehicle in the fore-and-aft direction.

Figure 25:
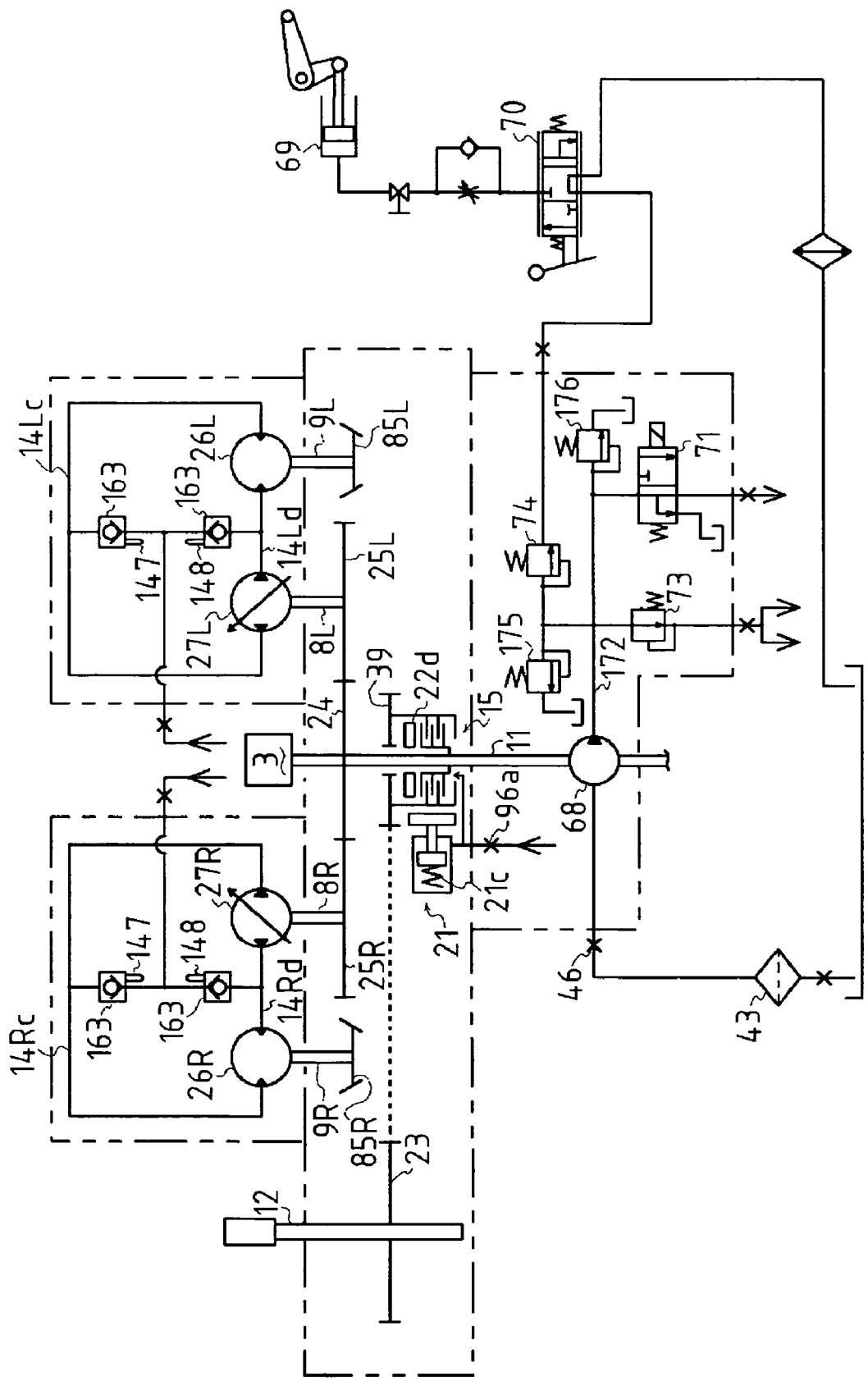
FIG. 25 is a hydraulic circuit diagram of the transmission according to the third embodiment.
Figure 26:
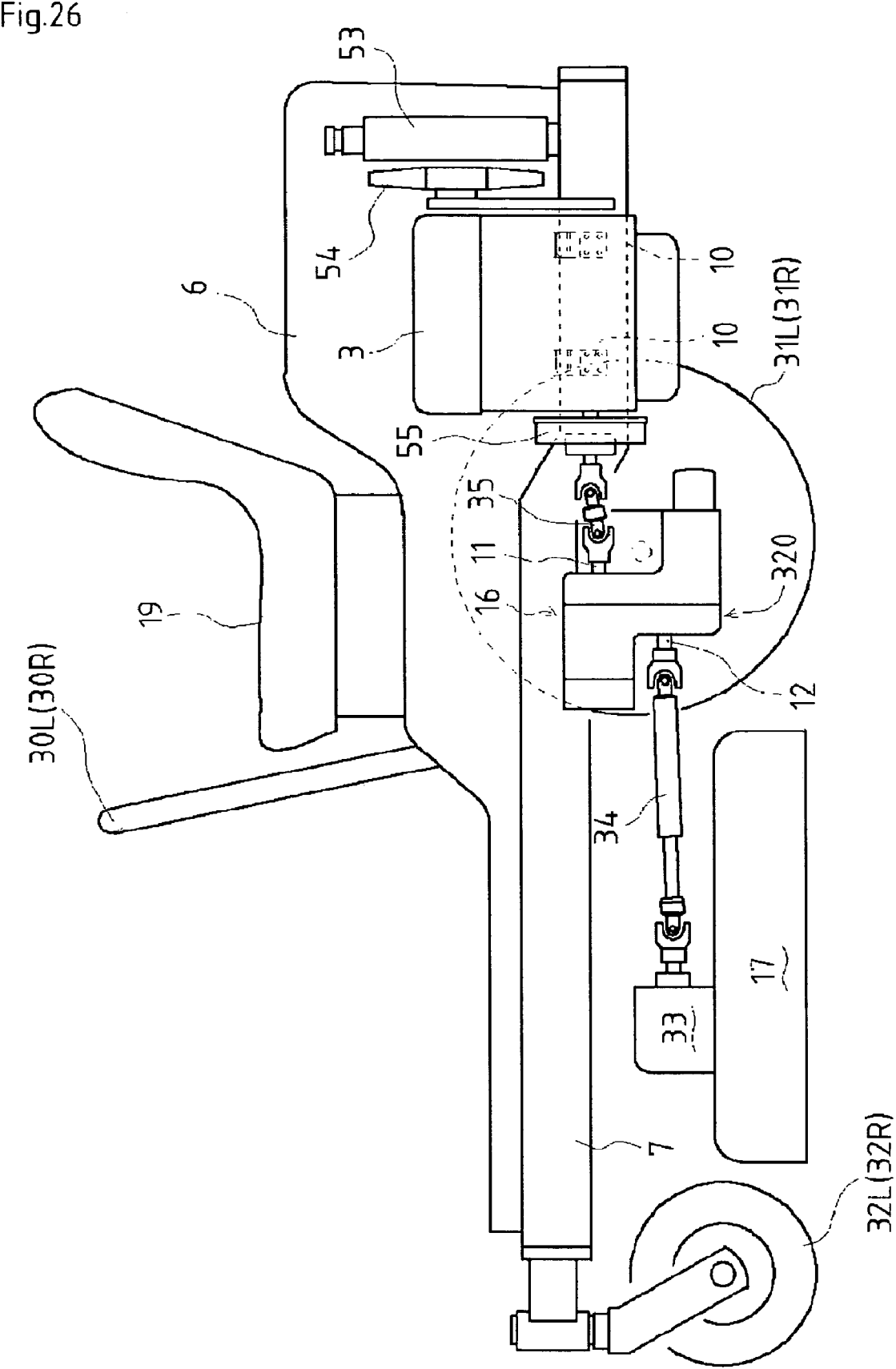
FIG. 26 is a side view of a riding lawn mower equipped with a transmission according to a fourth embodiment of the present invention.

Referring to the hydraulic circuit of transmission 220 shown in FIG. 25, a part of oil from charge pump 68 driven by engine 8 is supplied to oil passages 14Lc and 14Ld between hydraulic pump 27L and motor 26L and to oil passages 14Rc and 14Rd between hydraulic pump 27R and 26R via pressure-reducing valve 73, an oil passage 214b and respective check valves 163, so as to drive motor shafts 9L and 9R for driving wheels 31L and 31R. Another part of the oil is supplied to the oil chamber for operating piston 22a of PTO clutch 15 and to the oil chamber of PTO brake 21 via oil passage 172, PTO clutch switching valve 71 and port 96. The other part of the oil is supplied to lift cylinder 69 via oil passage 172, resistance valve 74 and valve 70 so as to mover mower unit 17 vertically. Reference numerals 75 and 76 designate relief valves for adjusting hydraulic pressure.

Next, a transmission 320 according to a fourth embodiment of the present invention will be described with reference to FIGS. 26 to 36.

Figure 27:
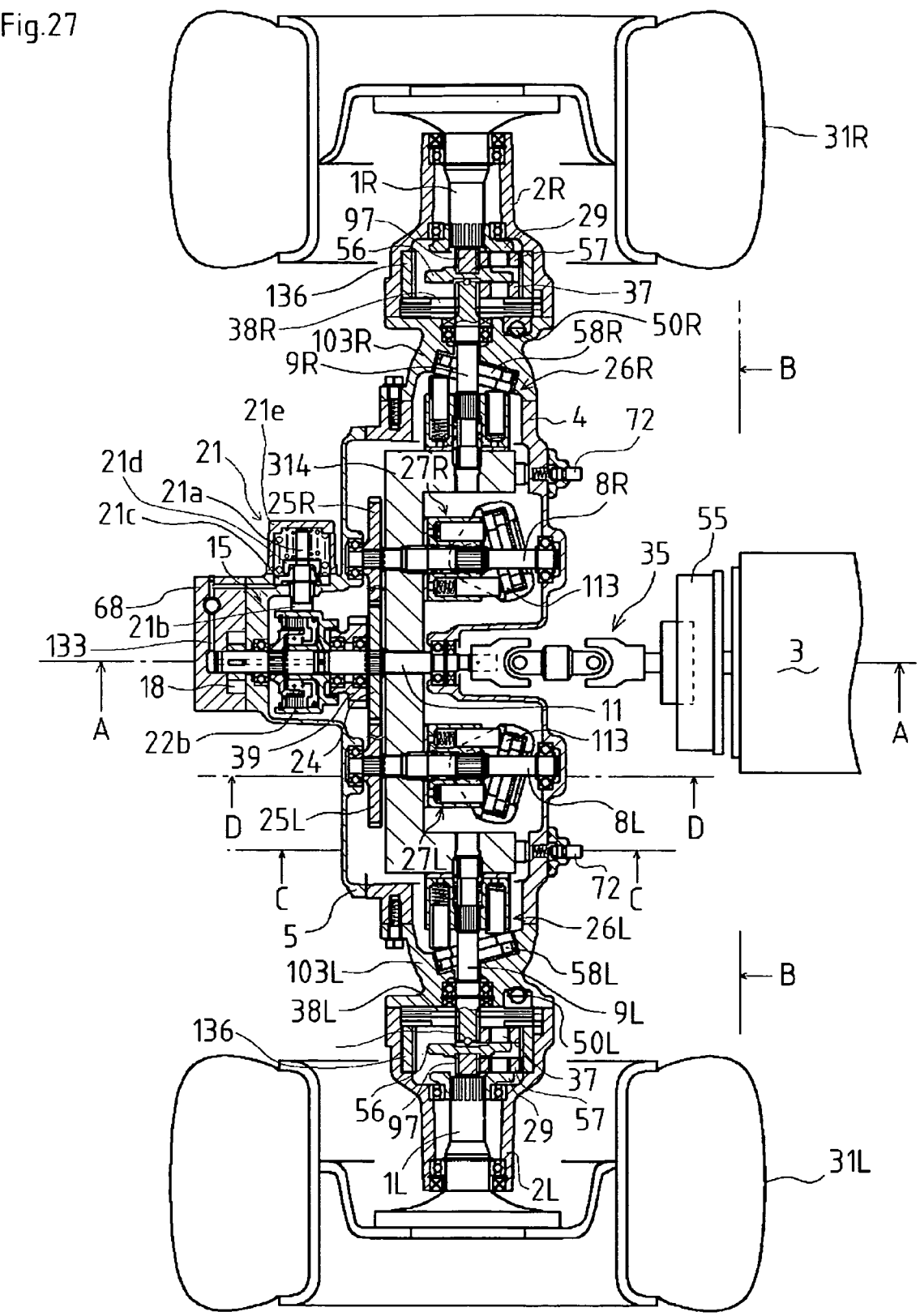
FIG. 27 is a sectional plan view of the transmission according to the fourth embodiment.

Transmission 320 has front casing part 5 and rear casing part 4 joined to each other through a vertical joint surface so as to constitute center casing 16, which is cranked when viewed in plan as shown in FIG. 27 so as to have a laterally middle forward extending portion and left and right rearward extending portions. The forward extending portion is constituted by front casing part 5 so as to house PTO clutch 15 and PTO brake 21, and to support PTO shaft 12 therebelow. Charge pump 68 is mounted forward onto the front end of the forward extending portion of front casing part 5. The left and right laterally extending portions are constituted by rear casing part 4 so as to house respective left and right hydraulic pumps 27L and 27R, and to have input shaft 11 therebetween.

Left and right laterally outward extending motor casings 103L and 103R are mounted onto the respective left and right rearward extending portions of center casing 16 so as to house respective left and right hydraulic motors 26L and 26R. Left and right laterally outward extending decelerating gear casings 2L and 2R are mounted onto respective motor casings 103L and 103R so as to house respective axles 1L and 1R and planetary deceleration gears. Drive wheels 31L and 31R are disposed on the lateral outside of respective deceleration gear casings 2L and 2R.

Figure 28:
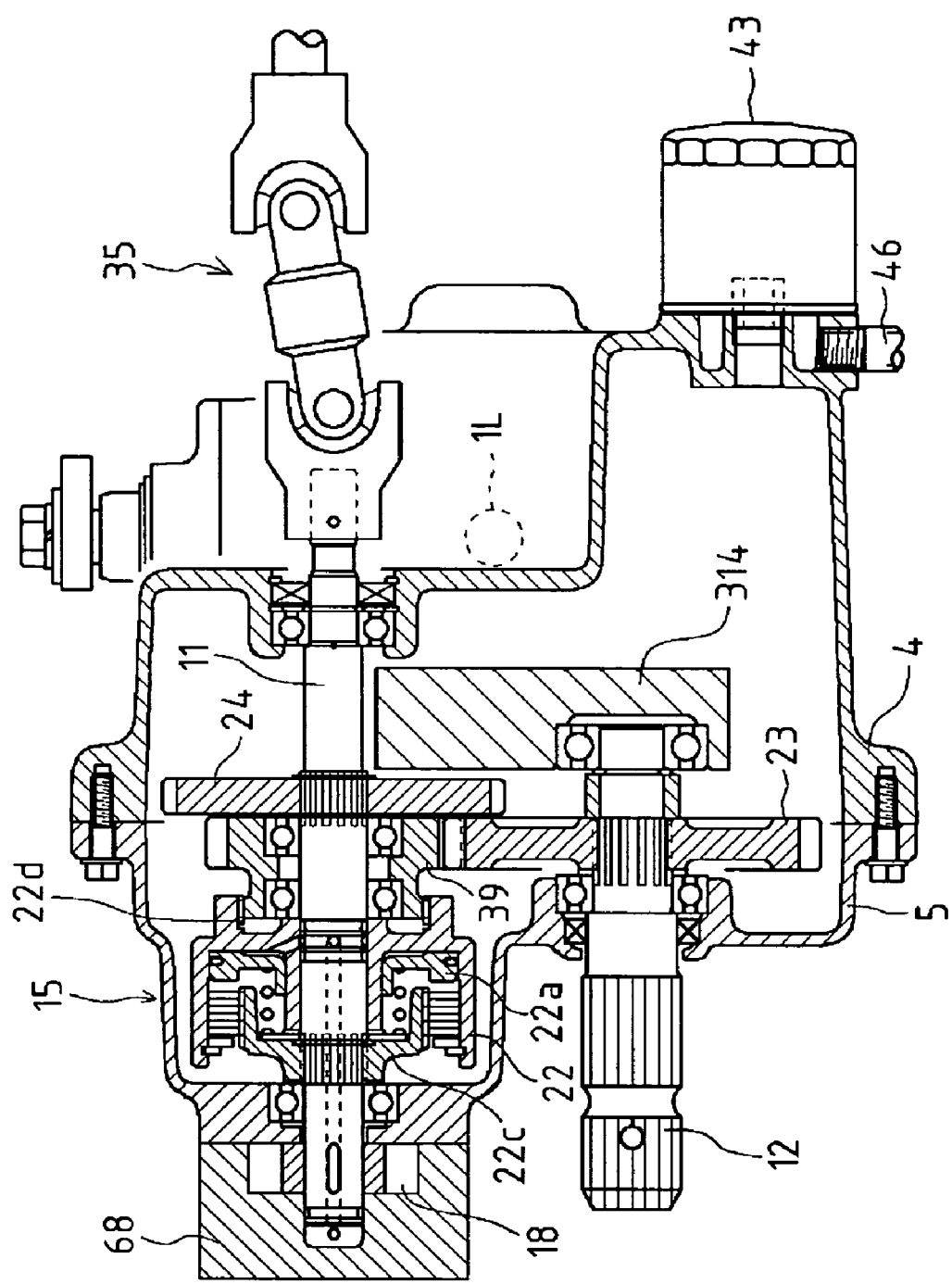
FIG. 28 is a cross-sectional view taken in A-A line of FIG. 27.
Figure 29:
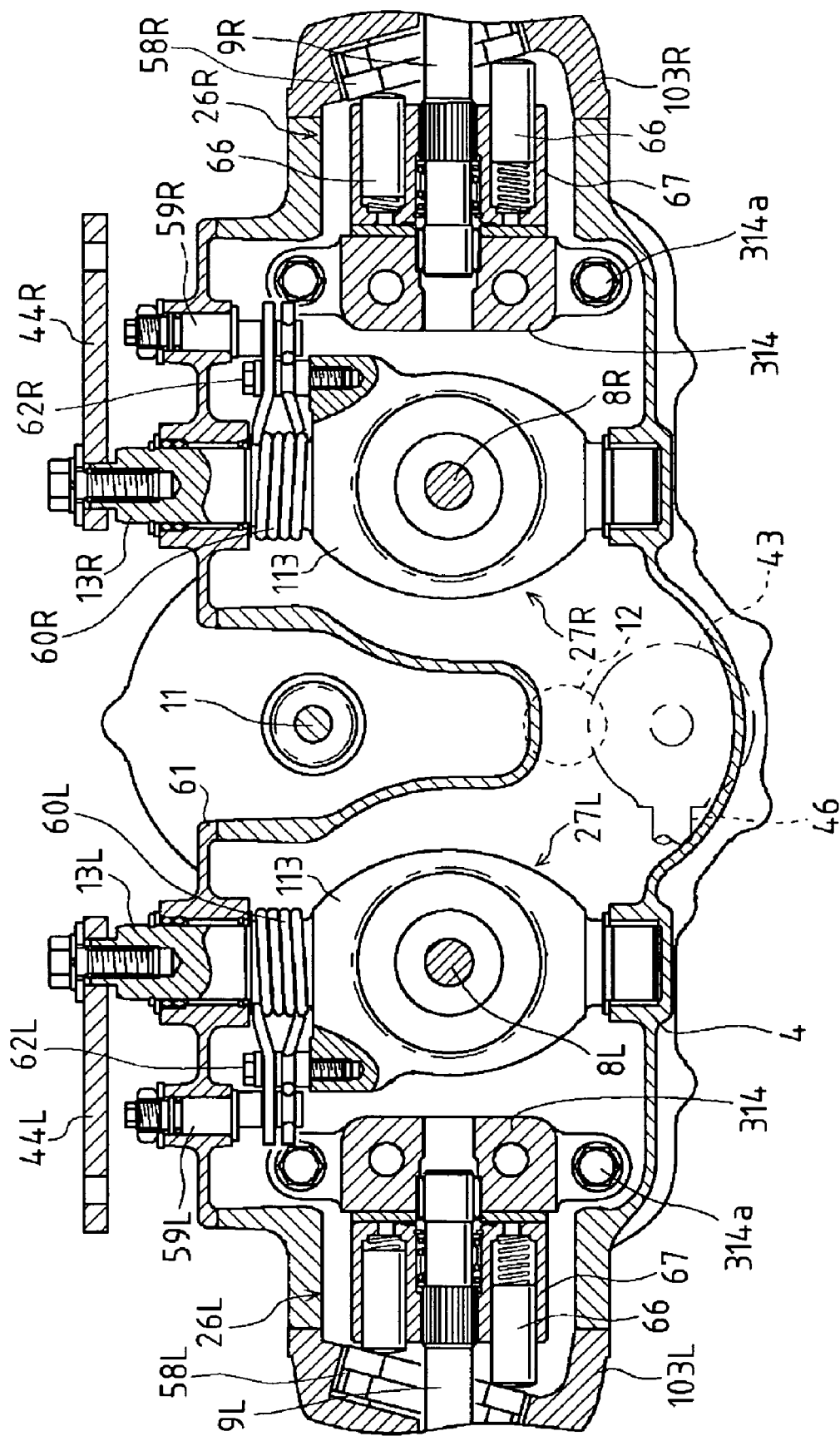
FIG. 29 is a cross-sectional view taken in B-B line of FIG. 27.

As shown in FIGS. 27 to 29, the laterally middle rear portion of rear casing part 5 is recessed forward and downward so as to make a space, in which horizontal input shaft 11 projecting rearward from center casing 16 and the front end portion of universal joint coupling 35 for drivingly coupling input shaft 11 to horizontal crankshaft engine 3 are disposed so as to shorten the distance between the rear end of transmission 320 and the front end of engine 3, that is, to shift the position of engine 3 forward, thereby balancing the vehicle well in the fore-and-aft direction.

As best shown in FIG. 28, the lateral middle portion of rear casing part 4 is extended downward and rearward so as to have a rear surface onto which oil filter 43 is externally fitted. Lube in center casing 16 is introduced from the left and right portions of center casing 16 to oil filter 43 on the lateral middle portion of center casing 16, and to charge pump 68 from oil filter 43 via oil suction pipe 46.

As shown in FIG. 27, horizontal input shaft 11 extended in the fore-and-aft direction penetrates the forward projecting lateral middle portion of front casing part 5 and projects into charge pump 68 to serve as the driving gear of the charge pump gear 18. The rear portion of front casing part 5 is laterally extended so as to journal the front ends of horizontal pump shafts 8L and 8R extended in the fore-and-aft direction with input shaft 11 therebetween. The front portion of rear casing part 4 is joined to the rear end of front casing part 5 and incorporates left and right pump gears 25L and 25R fixed on respective pump shafts 8L and 8R and distributing gear 24 fixed on input shaft 11 meshing with both pump gears 25L and 25R. In rear casing part 4, a vertical oil duct plate 314 is laterally extended just behind gears 24, 25L and 25R. Input shaft 11 and pump shafts 8L and 8R rotatably penetrate oil duct plate 314.

The forwardly recessed laterally middle rear end portion of rear casing part 4 journals input shaft 11 just behind oil duct plate 314. The left and right rearwardly expanded portions of rear casing part 4 having the projecting rear end of input shaft 11 therebetween incorporate respective left and right hydraulic pumps 27L and 27R having axial pump shafts 9L and 9R fitted onto the vertical and lateral rear end surfaces of oil duct plate 314. The rear end walls of left and right rearwardly expanded portions of rear casing part 4 journal the rear ends of pump shafts 8L and 8R via bearings.

Figure 32:
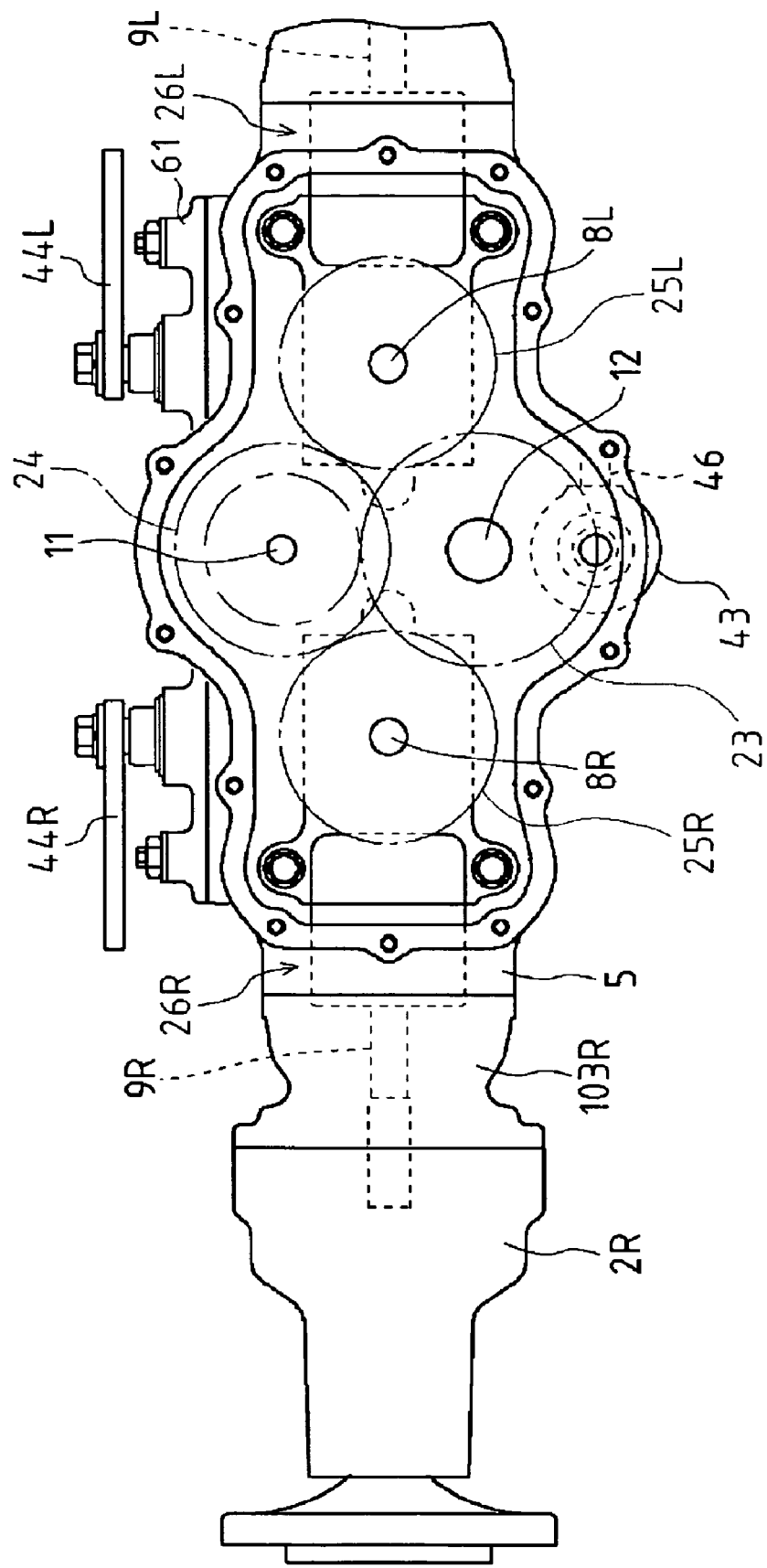
FIG. 32 is a front view of the transmission according to the fourth embodiment.
Figure 33:
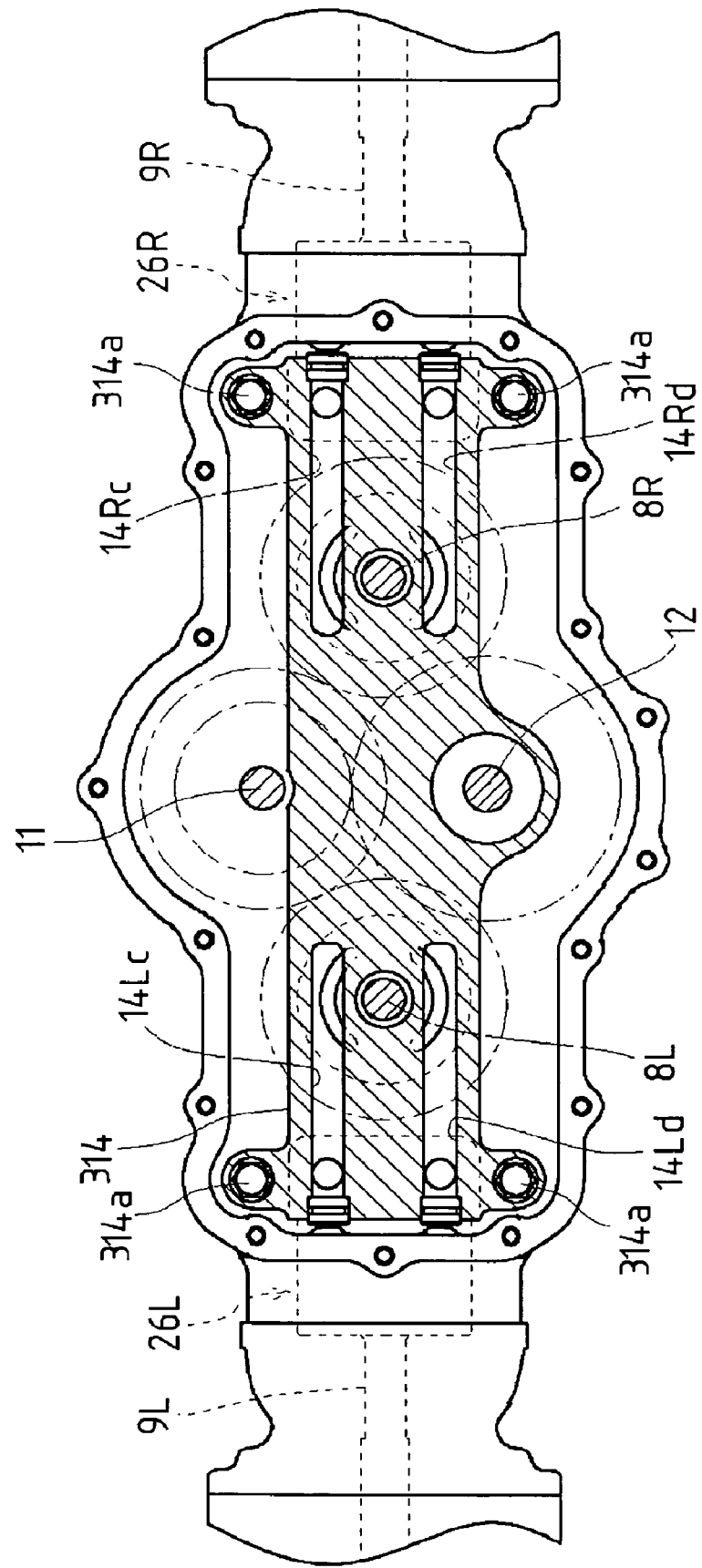
FIG. 33 is a rear view of the transmission according to the fourth embodiment.

PTO shaft 12 is extended in the fore-and-aft direction below input shaft 11 and journalled by front casing part 5 and oil duct plate 314. When viewed in front (or rear) as shown in FIGS. 29, 32 and 33, upper input shaft 11, lower PTO shaft 12 and left and right pump shafts 8L and 8R are arranged lozengewise.

The left and right end portions of oil duct plate 314 are extended rearward so as to have vertical left and right outward surfaces onto which respective hydraulic motors 26L and 26R are fitted. Motor casings 103L and 103R fixed onto the left and right ends of rear casing part 4 incorporate respective hydraulic motors 26L and 26R fitted onto oil duct plate 314. Hydraulic motors 26L and 26R have respective axial horizontal motor shafts 9L and 9R which are extended laterally and are rotatably fitted at their proximal ends into the rearwardly extended left and right end portions of oil duct plate 314. Lateral motor shafts 9L and 9R penetrate respective motor casings 103L and 103R and project into respective deceleration gear casings 2L and 2R so as to be disposed coaxially to respective lateral axles 1L and 1R.

Due to the above construction, left and right hydraulic pumps 27L and 27R are disposed between left and right hydraulic motors 26L and 26R through the left and right portions of oil duct plate 314, input shaft 11 is disposed between hydraulic pumps 27L and 27R, and deceleration gear casings 2L and 2R supporting axles 1L and 1R are disposed on the laterally outward sides of hydraulic motors 26L and 26R, thereby shortening transmission 320 in the vertical and fore-and-aft directions.

HSTs 90L and 90R are substantially laterally symmetric, each of which comprises corresponding hydraulic pump 27L or 27R and motor 26L and 26R fluidly connected through a corresponding closed fluid circuit formed in oil duct plate 314.

HSTs 90L and 90R will be described with reference to representing left HST 90L. Oil duct plate 314, rectangular and laterally elongated when viewed in front, has the vertical rear surface whose left and right areas serve as pump mounting surfaces onto which respective cylinder blocks 65 of hydraulic pumps 27L and 27R is fitted. As shown in FIG. 33, oil duct plate 314 is formed therein with upper and lower laterally horizontal oil ducts 14Lc and 14Ld, and 14Rc and 14Rd, serving as the closed fluid circuits for respective left and right HSTs 90L and 90R. Kidney ports communicating respective oil ducts 14Lc, 14Ld, 14Rc and 14Rd are open rearward at the respective left and right pump mounting surfaces for hydraulic pumps 27L and 27R.

Figure 30:
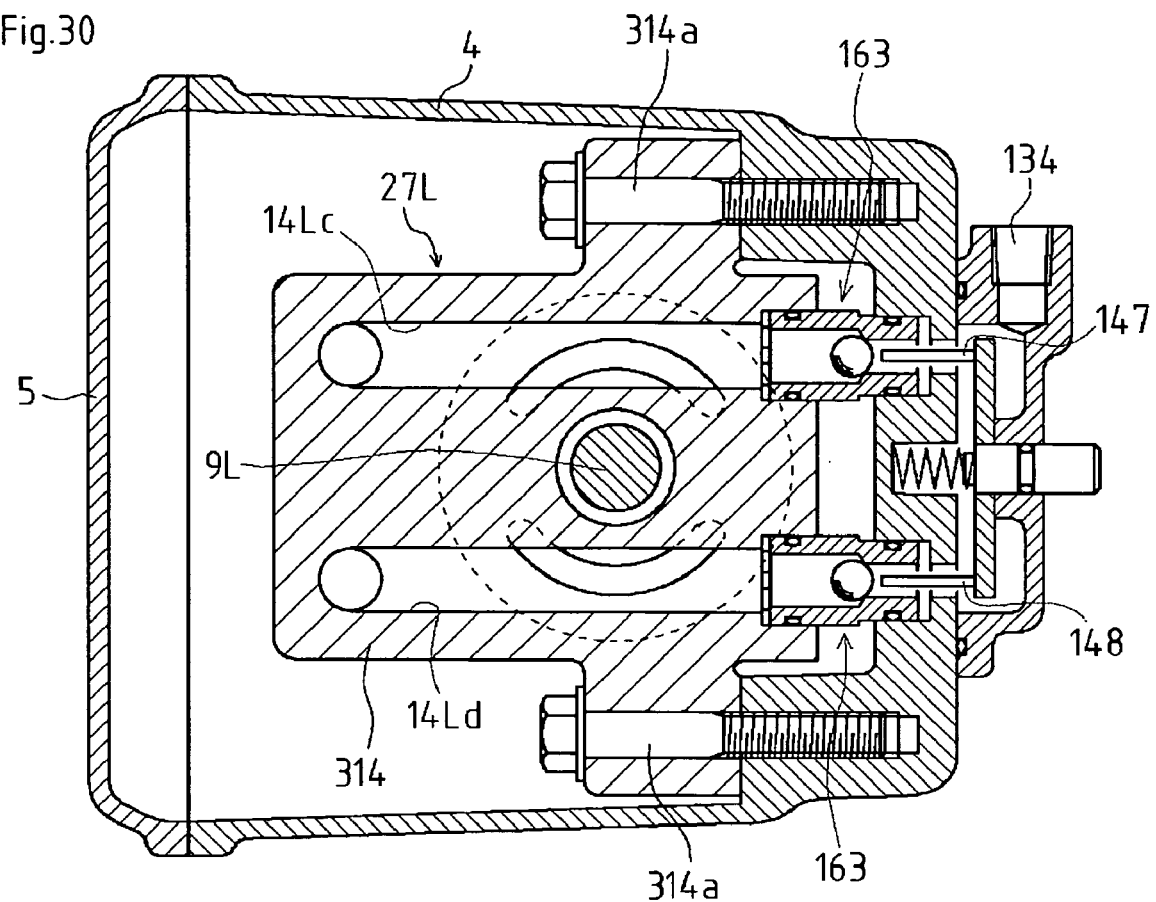
FIG. 30 is a cross-sectional view taken in C-C line of FIG. 27.

The left and right end portions of oil duct plate 314 are squared and extended rearwardly so that their laterally distal vertical surfaces serve as motor mounting surfaces onto which respective cylinder blocks 67 of hydraulic motors 26L and 26R. As shown in FIG. 30, oil ducts 14Lc, 14Ld, 14Rc and 14Rd are bent rearward in the left and right end portions of oil duct plate 314 so as to serve as the closed fluid circuits for respective left and right hydraulic motors 26L and 26R. Kidney ports communicating respective oil ducts 14Lc, 14Ld, 14Rc and 14Rd are open laterally outward at the respective left and right motor mounting surfaces. As best shown in FIG. 30, the rearwardly extended left and right end portions of oil duct plate 314 are fastened through upper and lower bolts 314a to the left and right rear end walls of rear casing part 4.

Figure 31:
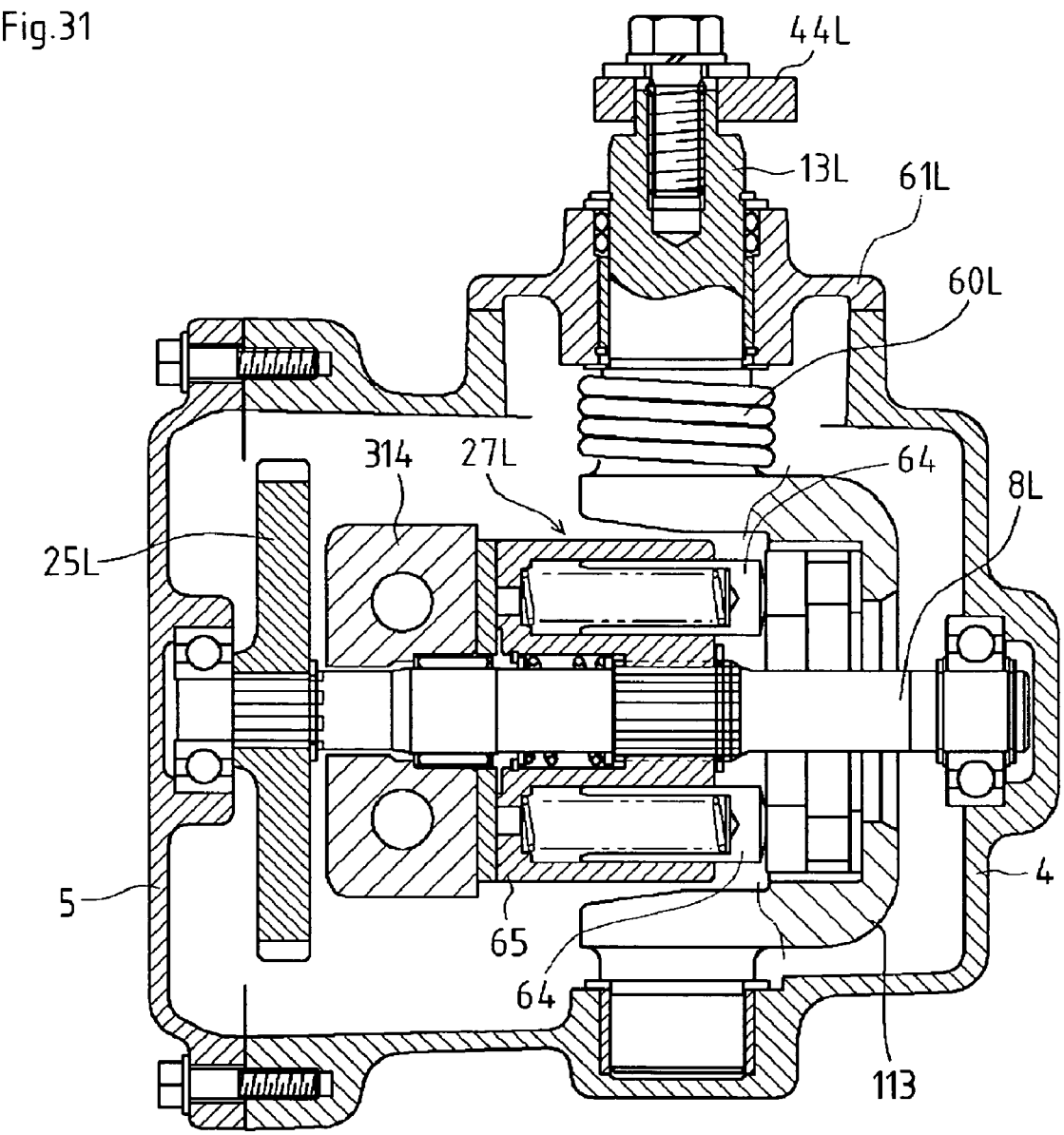
FIG. 31 is a cross-sectional view taken in D-D line of FIG. 27.

Referring to FIGS. 27, 29 and 31, each of hydraulic pumps 27L and 27R has cylinder block 65 slidably rotatably fitted onto the respective left and right pump mounting surfaces of oil duct plate 314, and are spline-fitted on corresponding axial pump shaft 8L or 8R extended horizontally in the fore-and-aft direction. Pistons 64 are reciprocally fitted into each cylinder block 65 and biased rearward so as to project rearward therefrom and abut against each movable swash plate 113 disposed around pump shaft 8L or 8R behind cylinder block 65.

As shown in FIG. 29, each movable swash plate 113 has vertical upper and lower trunnion shafts 13L or 13R. Rear casing part 4 has left and right upwardly openings covered with respective lids 61. Upper trunnion shafts 13L and 13R of movable swash plates 113 penetrate respective lids 61 and project upward therefrom so as to be fixedly provided thereon with respective horizontal speed control arms 44L and 44R. Each of neutral-returning springs 60L and 60R is wound around each of upper trunnion shafts 60L and 60R in center casing 16. Both end portions of each of springs 60L and 60R are twisted so as to cross each other. Vertical bolts 59L and 59R are screwed into respective lids 61. Each of bolts 59L and 59R is cranked in rear casing part 4 and pinched between the end portions of corresponding spring 60L or 60R. Bolts 59L and 59R are rotated so as to adjust the respective neutral positions of speed control arms 44L and 44R corresponding to the respective neutral positions of movable swash plates 113. In rear casing part 4, each swash plate 113 has pin 62L or 62R pinched between the end portions of corresponding spring 60L or 60R.

Referring to FIGS. 27 and 29, in rear casing part 4, hydraulic motors 26L and 26R have respective cylinder blocks 67 slidably rotatably fitted onto the respective left and right motor mounting surfaces of oil duct plate 314, and are spline-fitted on respective lateral axial motor shafts 8L and 8R. Pistons 66 are reciprocally fitted into each cylinder block 67 and biased so as to project laterally outward therefrom and abut against each of swash plates 58L and 58R fixedly supported by each of motor casings 103L and 103R and disposed around each of motor shafts 9L and 9R.

As best shown in FIG. 30, rear casing part 4 is provided at its left and right rear ends with respective left and right outwardly (upwardly) open ports 134. The rearwardly horizontal portions of upper and lower oil ducts 14Lc and 14Ld for left HST 90L are open rearward at the left rear end of oil duct plate 314 so as to be connected through respective check valves 163 to left common port 134. Similarly, the rearwardly horizontal portions of upper and lower oil ducts 14Rc and 14Rd for right HST 90R are open rearward at the right rear end of oil duct plate 314 so as to be connected through respective check valves 163 to right common port 134.

Left and right ports 134 are connected to charge valve 68 via later-discussed pressure-reducing valve 73. Check valves 163 allow oil from charge pump 68 to be introduced into respective oil ducts 14Lc, 14Ld, 14Rc and 14Rd, and prevent oil leak from the respective oil ducts. Upper check valves 163 are provided with respective horizontal pushpins 147, and lower check valves 163 with respective horizontal pushpins 148. Upper and lower pushpins 147 and 148 for each of HSTs 90L and 90R are coupled together by a manipulator projecting rearward from the rear end of rear casing part 4 through port 134. The manipulator is pushed forward together with upper and lower pushpins 147 and 148 so as to forcibly open upper and lower check valves 163, whereby oil is drained from oil ducts 14Lc and 14Ld or oil ducts 14Rc and 14Rd so as to enable corresponding hydraulic motor 26L or 26R to be freely rotated following corresponding drive wheel 31L or 31R, thereby facilitating for hauling of the vehicle.

Figure 34:
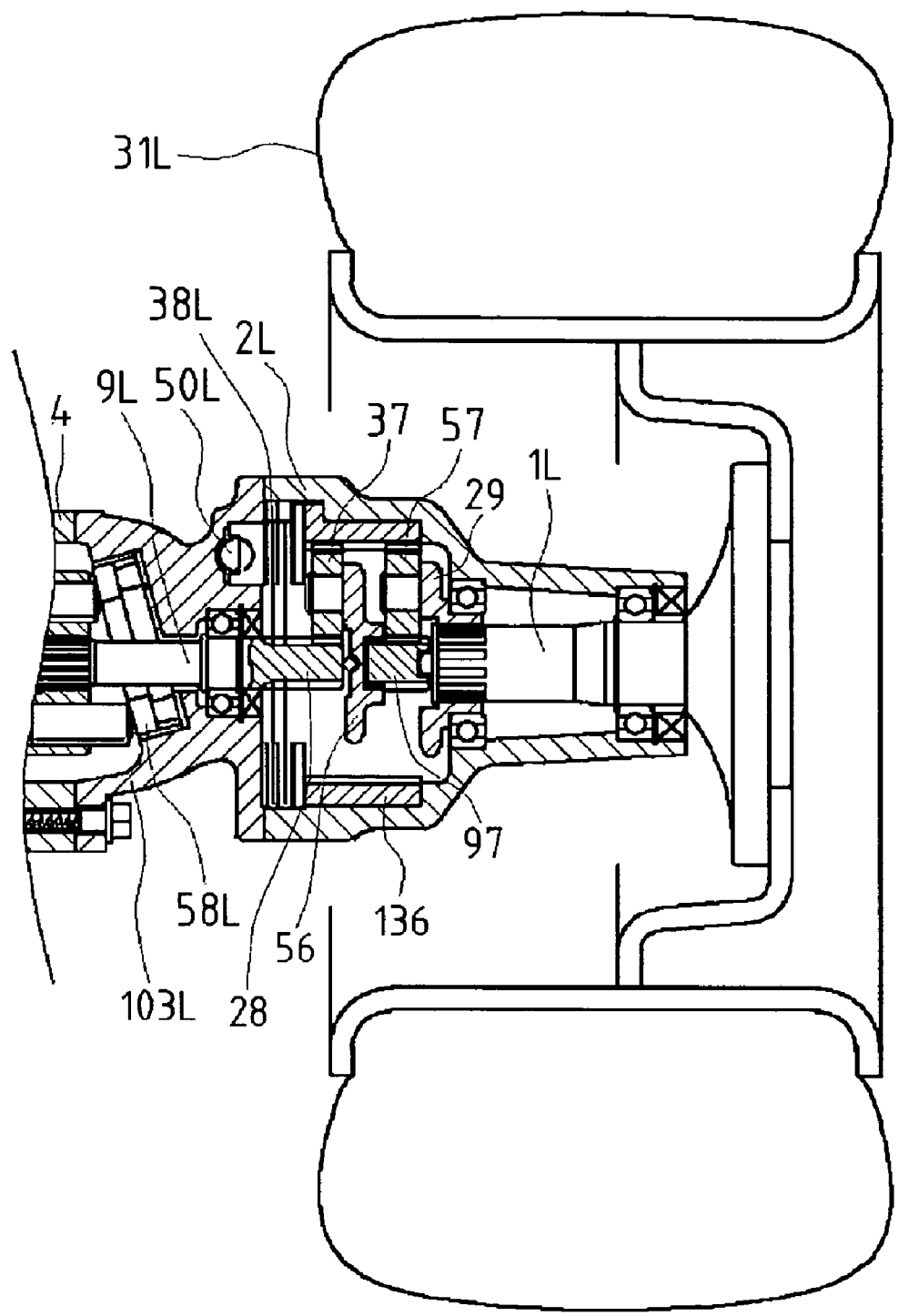
FIG. 34 is an enlarged plan view of a deceleration gear train of the transmission according to the fourth embodiment.

Left and right symmetrical deceleration gear trains in deceleration gear casings 2L and 2R will be described mainly with reference to the left deceleration gear train. As best shown in FIGS. 27 and 34, in each of deceleration gear casings 2L and 2R, first sun gear 28 is formed on the distal end of motor shaft 9L or 9R, and first planetary gears 37 pivoted on first carrier 56 are disposed around motor shaft 9L or 8R and mesh with first sun gear 28. Ring gear 136 fixedly fitted onto the inner peripheral surface of each of deceleration gear casings 2L and 2R has an internal gear meshing with first planetary gears 37.

Each of axles 1L and 1R are disposed laterally horizontally and coaxially to corresponding motor shaft 9L or 9R, and journalled in each of deceleration gear casings 2L and 2R. Second sun gear shaft 97 forming the second sun gear thereon coaxially projects from the proximal end of each of axles 1L and 1R toward corresponding motor shaft 9L or 9R. First carrier 56 pivoting first planetary gears 37 is fixed (spline-fitted) on the proximal end of second sun gear shaft 97. Second carrier 29 is fixed on the proximal end of each of axles 1L and 1R so as to pivot second planetary gears 57, which are disposed on the lateral outside of first carrier 56 around second sun gear shaft 97, and mesh with the second sun gear formed on second sun gear shaft 97. Second planetary gears 57 also mesh with ring gear 136.

The radial size of each of deceleration gear casings 2L and 2R can be shortened due to the above-mentioned deceleration planetary gear train therein interposed between coaxial motor shaft 9L and axle 1L or coaxial motor shaft 9R and axle 1R, thereby being compactly disposed in the rim of each of drive wheels 31L and 31R. Therefore, the distance between left and right drive wheels 31L and 31R can be reduced, and the ground clearance can be reduced so as to stably lower the center of gravity of the vehicle.

In the proximal end portion of each of deceleration gears 2L and 2R between the distal end of corresponding motor casing 103L or 103R and corresponding ring gear 136, frictional brake disks 38L or 38R are aligned around motor shaft 9L or 9R so as to serve as a parking brake for braking each of axles 1L and 1R. Frictional brake disks 38L or 38R fitted onto corresponding deceleration gear casing 2L or 2R and frictional brake disks 38L or 38R fitted onto corresponding motor shaft 9L or 9R are alternately aligned. Each of brake cams 50L and 50R operatively connected to the brake pedal via a link or wire is disposed in the distal end portion of motor casing 103L or 103R adjacent to the nearest brake disk 38L or 38R so as to be operated to press brake disks 38L or 38R against one another, thereby braking motor shaft 9L or 9R. Such laterally short spaces are used for the parking brakes, thereby restricting the lateral expansion of transmission 320. Further, the volume of the parking brakes can be small because they are disposed on respective motor shafts 9L and 9R on the upstream of the respective deceleration gear trains in deceleration gear casings 2L and 2R trains.

Figure 35:
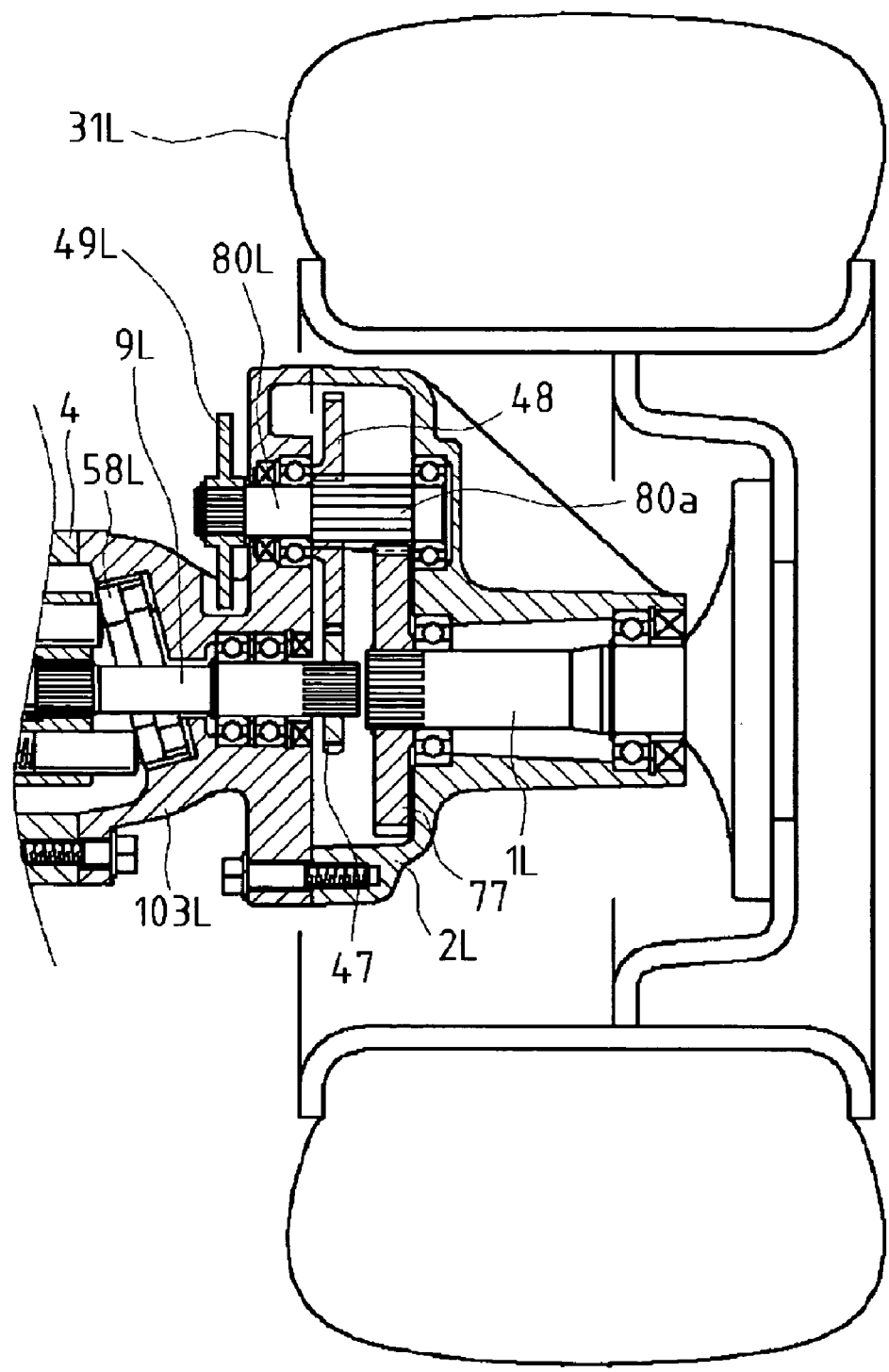
FIG. 35 is an enlarged plan view of a reshaped deceleration gear train of the transmission according to the fourth embodiment.

Alternatively, the deceleration gear trains may be comprised of spur gears as shown in FIG. 35. In each of deceleration gear casings 2L and 2R, first gear 47 is spline-fitted onto the distal end of motor shaft 9L or 9R, and each of deceleration shafts 80L and 80R is journalled in parallel to motor shaft 9L or 9R. Second gear 48 larger than first gear 47 is spline-fitted onto third gear 80a formed on each of horizontal deceleration shafts 80L and 80R so as to mesh with first gear 47. Fourth gear 77 larger than third gear 80a of deceleration shaft 80L or 80R is fixed on the proximal end of each of axles 1L or 1R and meshes with third gear 80a.

Deceleration gear casings 2L and 2R for the embodiment of FIG. 35 are expanded so as to cover respective deceleration shafts 80L and 80R disposed in parallel to motor shafts 9L and 9R, however, they can be disposed in the respective rims of drive wheels 31L and 31R so as to reduce the distance between driven wheels 31L and 31R.

Deceleration shafts 80L and 80R may be disposed behind, above, or at optimal positions relative to motor shafts 9L and 9R and axles 1L and 1R. The proximal ends of deceleration shafts 80L and 80R project outward from deceleration gear casings 2L and 2R and fixedly provided thereon with respective brake disks 49L and 49R.

The PTO drive system will be described with reference to FIGS. 27 and 28. PTO clutch gear 39 is relatively rotatably disposed on input shaft 11 between distributing gear 24 and clutch casing 22. In front casing part 5, PTO shaft 12 is fixedly provided thereon with PTO drive gear 23 meshing with PTO clutch gear 39 thereabove. PTO shaft 12 is journalled at its intermediate portion via a bearing by the front wall of front casing part 5 below the forward projecting portion of front casing part 5, and journalled at its rear end via a bearing by oil duct plate 314.

PTO clutch 15 interposed between input shaft 11 and PTO clutch gear 39 will be described. Friction disk retainer 22c is fixed (spline-fitted) on input shaft 11, and clutch casing 22 is relatively rotatably provided on input shaft 11 behind retainer 22c and forwardly extended so as to cover retainer 22c. Internal toothed portion 22d of clutch casing 22 engages with the front end of PTO clutch gear 39.

Friction disks fitted to retainer 22c and friction disks fitted to clutch casing 22 are alternately aligned along input shaft 11. Clutch piston 22a is disposed in clutch casing 22 behind the friction disks and biased rearward by a spring apart from the friction disks. An oil chamber between clutch piston 22a and the rear end of clutch casing 22 communicates with charge pump 68 via an oil dust formed in input shaft 11.

PTO brake 21 will be described. As shown in FIG. 27, the forward projecting portion of front casing part 5 is expanded laterally on one of left and right sides of PTO clutch 15 so as to form PTO brake casing 21e for incorporating PTO brake 21 at such a height as to prevent its top portion from projecting upward from the top end of center casing 16, thereby being prevented from hindering another part when it is assembled or so on.

In PTO brake casing 21e, thrust pin 21a is disposed perpendicular to input shaft 11 (laterally) and extended from PTO brake casing 21e into front casing part 5 toward the peripheral surface of clutch casing 22. In brake casing 21e, thrust pin 21a is fixedly provided thereon with brake piston 21c and pressure member 21d diametrically smaller than brake piston 21c. Springs are disposed between the end of brake casing 21e and brake pistons 21c and 21g so as to bias brake piston 21c and pressure member 21d and thrust pin 21a toward clutch casing 22. Pad 21b is provided on the tip of thrust pin 21a toward clutch casing 22.

In brake casing 21e, an oil chamber is disposed between brake piston 21c and the wall of front casing part 5 facing brake casing 21e so as to be supplied with oil from charge pump 68 via an oil duct 133 formed within the housing of charge pump 68 and the wall of front casing part 5. PTO clutch switching valve 71 (shown in FIG. 36) is interposed between charge pump 68 and oil duct 133.

While engine 3 is driven to drive input shaft 11, charge pump 68 driven together with input shaft 11 supplies oil into the oil chamber in clutch casing 22 so as to push clutch piston 22a forward against the spring and press the friction disks against one another, thereby engaging PTO clutch 15, i.e., fixing input shaft 11 to PTO clutch gear 39. Simultaneously, charge pump 68 supplies oil into the oil chamber in PTO brake casing 21e so as to push brake piston 21c and pressure member 21d and thrust pin 21a away from clutch casing 22 against the spring, thereby separating pad 21b from the peripheral surface of clutch casing 22 and allowing clutch casing 22 to be rotated together with input shaft 11.

If engine 3 is stopped, charge pump 68 stops supplying oil to the oil chambers in clutch casing 22 and brake casing 21 e, whereby clutch piston 22a and brake piston 21c are returned to their initial positions by the respective spring. That is, clutch piston 22a is pushed away from the friction disks by the spring so as to separate the friction disks from one another, thereby disengaging PTO clutch 15, i.e., drivingly separating PTO shaft 12 from input shaft 11. Brake piston 21c is pressed onto the wall of front casing part 5 by the springs so as to press pad 21b against the peripheral surface of clutch casing 22, thereby braking clutch casing 22 interlocking with PTO shaft 12 and preventing inertial rotation of PTO shaft 12.

Figure 36:
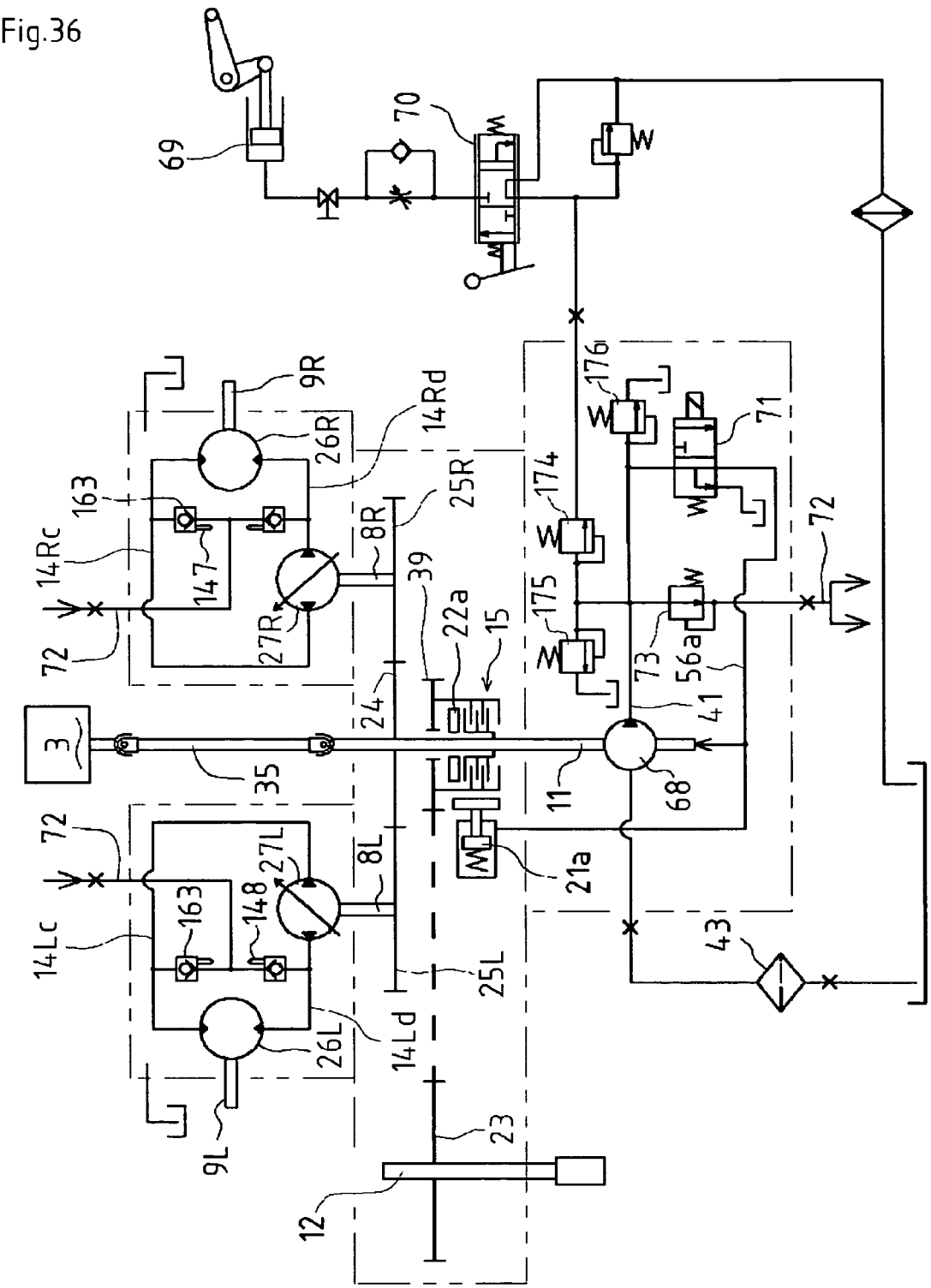
FIG. 36 is a hydraulic circuit diagram of the transmission according to the fourth embodiment.

Referring to the hydraulic circuit of transmission 320 shown in FIG. 36, a part of oil from charge pump 68 driven by engine 8 is supplied to oil passages 14Lc and 14Ld between hydraulic pump 27L and motor 26L, and to oil passages 14Rc and 14Rd between hydraulic pump 27R and 26R via pressure-reducing valve 73, oil ports 134, and respective check valves 163, so as to drive motor shafts 9L and 9R for driving wheels 31L and 31R. Another part of the oil is supplied to the oil chamber for operating piston 22a of PTO clutch 15 and to the oil chamber of PTO brake 21 via oil delivery passage 172, PTO clutch switching valve 71 and oil duct 133. The other part of the oil is supplied to lift cylinder 69 via oil delivery passage 172, resistance valve 74 and valve 70 so as to mover mower unit 17 vertically. Reference numerals 175 and 176 designate relief valves for adjusting hydraulic pressure.

Each of the described transmissions 20, 120, 220 and 320 according to the present invention is convenient to a working vehicle such as a riding lawn mower. If a lawn mower is equipped with any of the transmissions between a horizontal crankshaft engine and a mower unit, a universal joint coupling is interposed between the input shaft of the transmission and the output shaft which have different heights so as to ensure a sufficient range of vertical movement of the mower unit. However, the transmission has a space for the input shaft and the universal joint coupling between its left and right HSTs while facing ends of the transmission and engine approach each other as much as possible. Alternatively, the transmission has a space for the PTO shaft and the universal joint coupling between its left and right HSTs while facing ends of the transmission and mower unit approach each other as much as possible. Therefore, the riding lawn mower is balanced well in the fore-and-aft direction, and the universal joint coupling can be disposed so as to moderate its inclination and to thereby ensure sufficient efficiency for transmitting power.

It is further understood by those skilled in the art that the foregoing description is a preferred embodiment of the disclosed device and that various changes and modifications may be made in the invention without departing from the spirit and scope thereof.

What is claimed is:

1. A vehicle transmission, comprising:
    a transmission casing incorporating a distributing drive train;
    an input shaft of said distributing drive train in said transmission casing, said input shaft being disposed in the substantially laterally middle portion of said transmission casing so as to project from said transmission casing toward a prime mover in the fore-and-aft direction of the vehicle;
    a pair of left and right lateral axles;
    a pair of left and right HSTs, each of said HSTs drivingly interposed between said distributing drive train in said transmission casing and each of said axles, each of said HSTs including:
        a hydraulic pump having an axial pump shaft, wherein said pump shafts of both said left and right HSTs are drivingly connected to said distributing drive train so as to receive power from said distributing drive train,
        a hydraulic motor having an axial motor shaft perpendicular to said pump shaft, wherein said motor shaft of said left HST is extended coaxially to said left axle and is drivingly connected to said left axle so as to transmit power from said left HST to said left axle, and said motor shaft of said right HST is extended coaxially to said right axle and is drivingly connected to said right axle so as to transmit power from said right HST to said right axle, and
        an oil duct plate disposed in said transmission casing, wherein said hydraulic pump and motor are mounted onto said oil duct plate to be fluidly connected to each other; and
    a PTO shaft for taking off power from said distributing drive train disposed in a substantially lateral middle portion of said transmission casing and projecting from said transmission casing opposite to said prime mover in the fore-and-aft direction of the vehicle.

2. The vehicle transmission as set forth in claim 1, further comprising:
    a PTO clutch disposed in a portion of said transmission casing opposite to said prime mover in the fore-and-aft direction of the vehicle, said PTO clutch being drivingly interposed between said distributing drive train and said PTO shaft.

3. The vehicle transmission as set forth in claim 1, further comprising:
    a pair of motor casings incorporating said respective hydraulic motors, said motor casings being mounted on respective left and right sides of said transmission casing.

4. The vehicle transmission as set forth in claim 1, further comprising:
    a pair of deceleration drive trains, each of which is drivingly interposed between said corresponding motor shaft and said corresponding axle, wherein each of said deceleration drive trains has a pinion coaxial to said corresponding motor shaft.

5. The vehicle transmission as set forth in claim 4, wherein said motor shafts are supported by said respective motor casings, and wherein each of said pinions is disposed between said corresponding motor shaft and said corresponding axle.

6. The vehicle transmission as set forth in claim 1, wherein said transmission casing is constituted by a front casing part and a rear casing part joined to each other.

7. The vehicle transmission as set forth in claim 1, wherein said hydraulic pumps are mounted onto vertical surfaces of laterally extended portions of said oil duct plate so as to extend said pump shafts in the fore-and-aft direction, and wherein said hydraulic motors are mounted onto laterally outward vertical surfaces of portions of said oil duct plate extended in the fore-and-aft direction so as to extend said motor shafts laterally outward.

8. A vehicle transmission, comprising:
    a transmission casing including a pair of left and right HST chambers, a distributing drive train chamber interposed between said left and right HST chambers, and a PTO drive train chamber, wherein:
        left and right portions of said transmission casing constituting said respective left and right HST chambers are extended toward a prime mover in the fore-and-aft direction of a vehicle,
        a portion of said transmission casing constituting said PTO drive train chamber is extended opposite to said prime mover in the fore-and-aft direction of the vehicle, and
        said transmission casing is provided with an outside space recessed toward a portion of said transmission casing constituting said distributing drive train chamber between said left and right portions of said transmission casing constituting said respective left and right HST chambers;
    a distributing drive train disposed in said distributing drive train chamber of said transmission casing;
    an input shaft of said distributing drive train projecting from said portion of said transmission casing constituting said distributing drive train chamber into said recessed outside space toward said prime mover in the fore-and-aft direction of the vehicle;
    a pair of left and right lateral axles supported by laterally distal ends of said left and right portions of said transmission casing constituting said respective HST chambers;
    a pair of left and right HSTs disposed in said respective HST chambers, each of said HSTs drivingly interposed between said distributing drive train and each of said axles, each of said HSTs including:
        a hydraulic pump having an axial pump shaft, wherein said pump shafts of both said left and right HSTs are drivingly connected to said distributing drive train so as to receive power from said distributing drive train,
        a hydraulic motor having an axial motor shaft perpendicular to said pump shaft, wherein said motor shaft of said left HST is drivingly connected to said left axle so as to transmit power from said left HST to said left axle, and said motor shaft of said right HST is drivingly connected to said right axle so as to transmit power from said right HST to said right axle, and an oil duct plate disposed in said transmission casing, wherein said hydraulic pump and motor are mounted onto said oil duct plate to be fluidly connected to each other; and a PTO shaft for taking off power from said distributing drive train disposed in said portion of said transmission casing constituting said PTO drive train chamber, and projecting from said transmission casing opposite to said prime mover in the fore-and-aft direction of the vehicle.

9. The vehicle transmission as set forth in claim 8, further comprising:
a PTO clutch disposed in said PTO drive train chamber of said transmission casing opposite to said prime mover in the fore-and-aft direction of the vehicle, said PTO clutch being drivingly interposed between said distributing drive train and said PTO shaft.

10. The vehicle transmission as set forth in claim 8, further comprising:
a pair of motor casings serving as said left and right portions of said transmission casing constituting said respective left and right HST chambers, and incorporating said respective hydraulic motors, said motor casings being mounted on respective left and right sides of said portion of said transmission casing constituting said distributing drive train chamber.

11. The vehicle transmission as set forth in claim 10, wherein said motor shafts are supported by said respective motor casings so as to be disposed coaxially to said respective axles.

12. The vehicle transmission as set forth in claim 8, further comprising:
a pair of deceleration drive trains, each of which is drivingly interposed between said corresponding motor shaft and said corresponding axle, wherein each of said deceleration drive trains has a pinion coaxial to said corresponding motor shaft.

13. The vehicle transmission as set forth in claim 12, wherein said motor shafts are supported by said respective motor casings so as to be disposed coaxially to said respective axles, and wherein each of said pinions is disposed between said corresponding motor shaft and said corresponding axle.

14. The vehicle transmission as set forth in claim 8, wherein said transmission casing is constituted by a front casing part and a rear casing part joined to each other.

15. The vehicle transmission as set forth in claim 8, wherein said hydraulic pumps are mounted onto vertical surfaces of laterally extended portions of said oil duct plate so as to extend said pump shafts in the fore-and-aft direction, and wherein said hydraulic motors are mounted onto laterally outward vertical surfaces of portions of said oil duct plate extended in the fore-and-aft direction so as to extend said motor shafts laterally outward.

16. A vehicle transmission, comprising:
a transmission casing incorporating a distributing drive train;
an input shaft of said distributing drive train in said transmission casing, said input shaft being disposed in the substantially laterally middle portion of said transmission casing so as to project from said transmission casing toward a prime mover in the fore-and-aft direction of the vehicle;
a pair of left and right lateral axles;
a pair of left and right HSTs, each of said HSTs drivingly interposed between said distributing drive train in said transmission casing and each of said axles, each of said HSTs including:

a hydraulic pump having an axial pump shaft, wherein said pump shafts of both said left and right HSTs are drivingly connected to said distributing drive train so as to receive power from said distributing drive train,
a hydraulic motor having an axial motor shaft perpendicular to said pump shaft, wherein said motor shaft of said left HST is drivingly connected to said left axle so as to transmit power from said left HST to said left axle, and said motor shaft of said right HST is drivingly connected to said right axle so as to transmit power from said right HST to said right axle, and
an oil duct plate disposed in said transmission casing, wherein said hydraulic pump and motor are mounted onto said oil duct plate to be fluidly connected to each other; and
a PTO shaft for taking off power from said distributing drive train disposed in a substantially lateral middle portion of said transmission casing and projecting from said transmission casing opposite to said prime mover in the fore-and-aft direction of the vehicle;
wherein said hydraulic pump of each of said HSTs is located between said prime mover and said distributing drive train in the fore-and-aft direction of the vehicle.

17. The vehicle transmission as set forth in claim 16, further comprising:
a PTO clutch disposed in a portion of said transmission casing opposite to said prime mover in the fore-and-aft direction of the vehicle, said PTO clutch being drivingly interposed between said distributing drive train and said PTO shaft.

18. The vehicle transmission as set forth in claim 16, further comprising:
a pair of motor casings incorporating said respective hydraulic motors, said motor casings being mounted on respective left and right sides of said transmission casing.

19. The vehicle transmission as set forth in claim 18, wherein said motor shafts are supported by said respective motor casings so as to be disposed coaxially to said respective axles.

20. The vehicle transmission as set forth in claim 16, further comprising:
a pair of deceleration drive trains, each of which is drivingly interposed between said corresponding motor shaft and said corresponding axle, wherein each of said deceleration drive trains has a pinion coaxial to said corresponding motor shaft.

21. The vehicle transmission as set forth in claim 20, wherein said motor shafts are supported by said respective motor casings so as to be disposed coaxially to said respective axles, and wherein each of said pinions is disposed between said corresponding motor shaft and said corresponding axle.

22. The vehicle transmission as set forth in claim 16, wherein said transmission casing is constituted by a front casing part and a rear casing part joined to each other.

23. The vehicle transmission as set forth in claim 16, wherein said hydraulic pumps are mounted onto vertical surfaces of laterally extended portions of said oil duct plate so as to extend said pump shafts in the fore-and-aft direction, and wherein said hydraulic motors are mounted onto laterally outward vertical surfaces of portions of said oil duct plate extended in the fore-and-aft direction so as to extend said motor shafts laterally outward.

* * * * *